United States Patent
Gray et al.

(10) Patent No.: US 11,966,548 B2
(45) Date of Patent: Apr. 23, 2024

(54) DEVICE AND HOST COMMUNICATIONS FOR INPUT/OUTPUT (I/O) OPERATIVE TOUCH SENSOR DEVICE (TSD)

(71) Applicant: SIGMASENSE, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US); Kevin Joseph Derichs, Buda, TX (US); Shayne X. Short, College Station, TX (US); Timothy W. Markison, Mesa, AZ (US)

(73) Assignee: SIGMASENSE, LLC., Austin, TX (US)

( * ) Notice: Subject to any disclaimer, the term of this patent is extended or adjusted under 35 U.S.C. 154(b) by 83 days.

(21) Appl. No.: 17/828,282

(22) Filed: May 31, 2022

(65) Prior Publication Data

US 2022/0291777 A1 Sep. 15, 2022
US 2023/0297194 A9 Sep. 21, 2023

Related U.S. Application Data

(63) Continuation-in-part of application No. 17/731,612, filed on Apr. 28, 2022, now Pat. No. 11,703,975, (Continued)

(51) Int. Cl.
  *G06F 3/044* (2006.01)
  *G01V 3/08* (2006.01)

(52) U.S. Cl.
  CPC .............. *G06F 3/0443* (2019.05); *G01V 3/08* (2013.01); *G06F 2203/04108* (2013.01)

(58) Field of Classification Search
  CPC ........ G06F 3/0443; G06F 2203/04108; G01V 3/08
  See application file for complete search history.

(56) References Cited

U.S. PATENT DOCUMENTS 6,218,972 B1  4/2001  Groshong
6,665,013 B1  12/2003 Fossum et al.
(Continued)

FOREIGN PATENT DOCUMENTS

CN  102455838 A  5/2012
CN  103995626 A  8/2014
(Continued)

OTHER PUBLICATIONS

Physical Layer, available at https://en.wikipedia.org/wiki/Physical_layer on Mar. 23, 2019 (Year: 2019).*
(Continued)

*Primary Examiner* — Daniel R Miller
(74) *Attorney, Agent, or Firm* — Garlick & Markison; Timothy W. Markison; Shayne X. Short

(57) ABSTRACT

A touch sensor device (TSD) includes TSD electrodes associated with a surface of the TSD. Also, an overlay that includes marker electrode(s) is also associated with at least a portion of the surface of the TSD. The TSD also includes drive-sense circuits (DSCs) operably coupled to the plurality of TSD electrodes. A DSC is configured to provide a TSD electrode signal to a TSD electrode and simultaneously to sense a change of the TSD electrode signal based on a change of impedance of the TSD electrode caused by capacitive coupling between the TSD electrode and the marker electrode(s) of the overlay. Processing module(s) is configured to process a digital signal generated by the DSC to determine characteristic(s) of the overlay that is associated with the at least a portion of the surface of the TSD.

12 Claims, 60 Drawing Sheets

Related U.S. Application Data which is a continuation of application No. 17/184,031, filed on Feb. 24, 2021, now Pat. No. 11,340,727, which is a continuation of application No. 16/857,600, filed on Apr. 24, 2020, now Pat. No. 10,963,093, application No. 17/828,282 is a continuation of application No. 16/793,043, filed on Feb. 18, 2020, now abandoned, said application No. 16/857,600 is a continuation of application No. 16/253,717, filed on Jan. 22, 2019, now Pat. No. 10,664,098, which is a continuation-in-part of application No. 16/109,600, filed on Aug. 22, 2018, now Pat. No. 10,678,372, which is a continuation of application No. 15/506,097, filed as application No. PCT/US2016/038497 on Jun. 21, 2016, now Pat. No. 10,120,498.

(60) Provisional application No. 62/630,595, filed on Feb. 14, 2018, provisional application No. 62/620,812, filed on Jan. 23, 2018, provisional application No. 62/183,062, filed on Jun. 22, 2015.

(56) References Cited

U.S. PATENT DOCUMENTS

| | | | |
|---|---|---|---|
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,982,097 | B1 | 3/2015 | Kuzo et al. |
| 9,052,815 | B2 | 6/2015 | Hung et al. |
| 9,081,437 | B2 | 7/2015 | Oda |
| 9,201,547 | B2 | 12/2015 | Elias |
| 10,007,335 | B2 | 6/2018 | Lee |
| 2003/0235452 | A1* | 12/2003 | Kraus ............ G06F 3/0224 400/472 |
| 2010/0079403 | A1* | 4/2010 | Lynch ............ G06F 3/04886 345/173 |
| 2010/0302168 | A1* | 12/2010 | Giancarlo ......... G06F 3/0393 345/169 |
| 2011/0063154 | A1 | 3/2011 | Hotelling et al. |
| 2011/0273383 | A1 | 11/2011 | Jeon |
| 2011/0298745 | A1 | 12/2011 | Souchkov |
| 2012/0256870 | A1 | 10/2012 | Klein et al. |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0268724 | A1 | 9/2015 | Levesque |
| 2015/0346889 | A1 | 12/2015 | Chen |
| 2016/0188049 | A1 | 6/2016 | Yang et al. |
| 2017/0115798 | A1 | 4/2017 | Ho |
| 2017/0242534 | A1* | 8/2017 | Gray ............ G06F 3/041662 |
| 2018/0173355 | A9 | 6/2018 | Rosenberg |
| 2018/0275824 | A1 | 9/2018 | Li |
| 2019/0042040 | A1 | 2/2019 | Kumar |
| 2019/0171325 | A1 | 6/2019 | Rosenberg et al. |
| 2020/0026392 | A1 | 1/2020 | Pavageau et al. |
| 2020/0125194 | A1 | 4/2020 | Jiang |
| 2020/0312081 | A1 | 10/2020 | Perrow |

FOREIGN PATENT DOCUMENTS

| | | |
|---|---|---|
| CN | 104182105 A | 12/2014 |
| EP | 3019942 B1 | 12/2019 |
| JP | 2000165774 A | 6/2000 |
| KR | 20130050458 A | 5/2013 |
| KR | 1020150055019 | 5/2015 |
| WO | 2014046711 A1 | 3/2014 |

OTHER PUBLICATIONS

System on a chip, available at https://en.wikipedia.org/wiki/System_on_a_chip on Feb. 24, 2019 (Year: 2019).*
Analog Devices AD7147A Datasheet, 2009 (Year: 2009).
Atmel AT42QT2120 Datasheet, 2012 (Year: 2012).
Baker; How delta-sigma ADCs work, Part 1; Analog Applications Journal; Oct. 1, 2011; 6 pgs.
Brian Pisani, "Digital Filter Types in Delta-Sigma ADCs", Application Report SBAA230, May 2017, pp. 1-8, Texas Instruments Incorporated, Dallas, Texas.
International Searching Authority; International Search Report and Written Opinion; International Application No. PCT/US2021/018139; dated Jun. 9, 2021; 10 pgs.
Richard Comerford, Proximity Sensing Solutions, Part 1: Capacitive Sensors, Sep. 2013, available at https://www.digikey.com/en/articles/proximity-sensing-solutions-part-1-capacitive-sensors (Year: 2013).
China National Intellectual Property Administration; Search Report; CN Application No. 201680002799.5; dated Aug. 5, 2019; 2 pgs.
European Patent Office; Extended European Search Report; EP Application No. 16815134.8; dated Aug. 7, 2018; 12 pgs.
International Search Authority; International Search Report and Written Opinion; PCT/US2016/038497; dated Oct. 18, 2016; 14 pgs.

* cited by examiner computing device 12 computing device 14 computing device 18

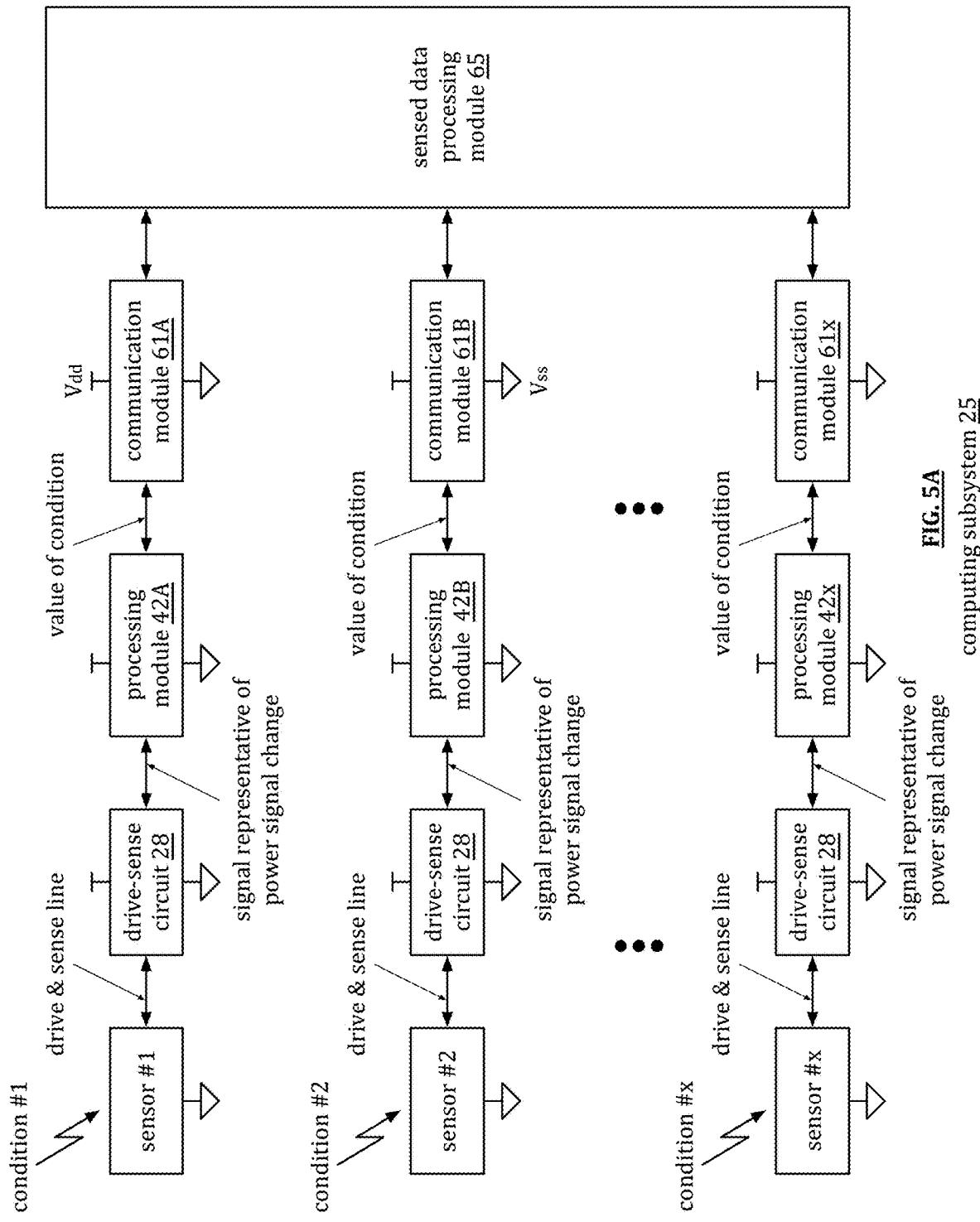

computing subsystem 25

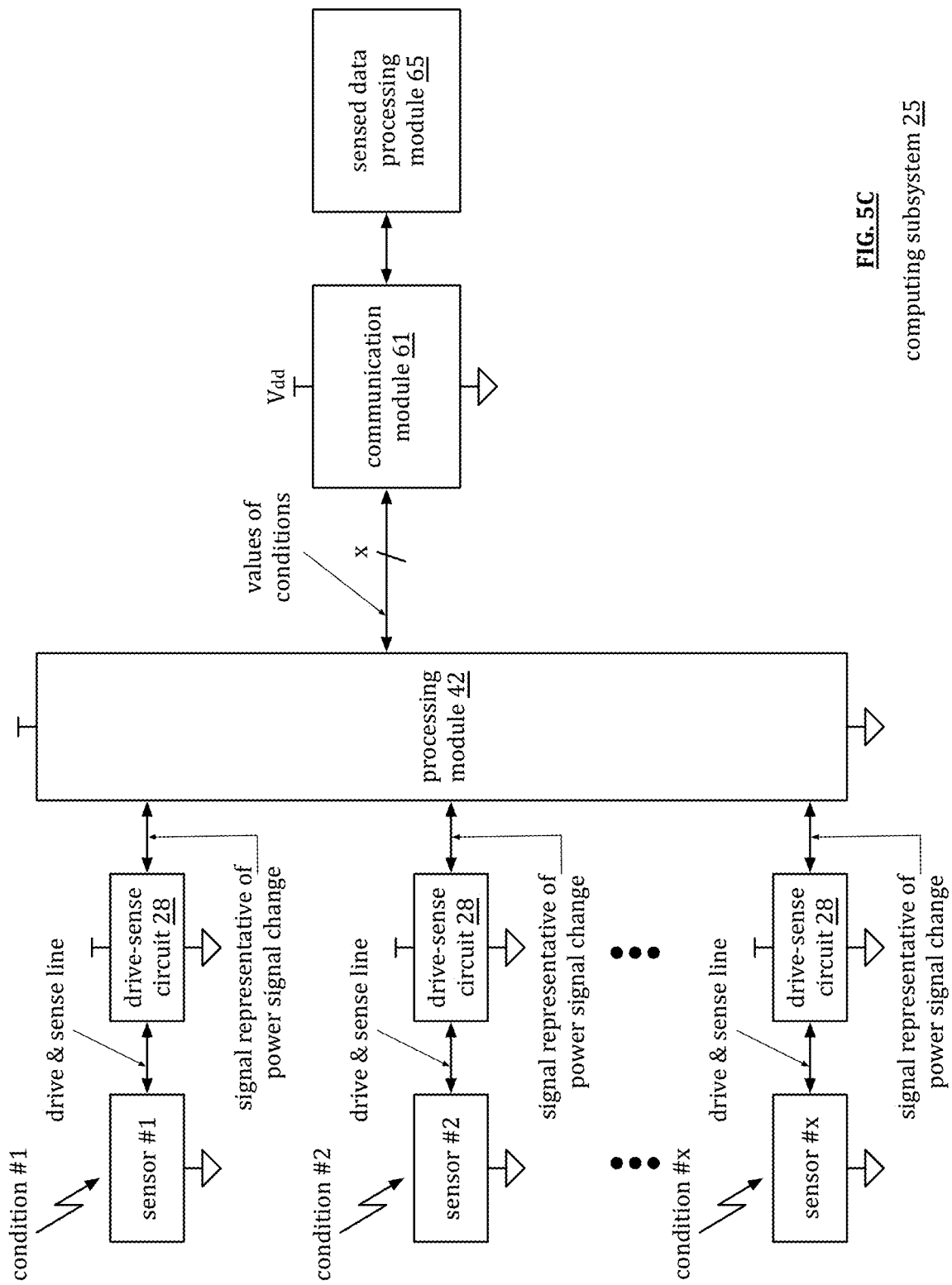

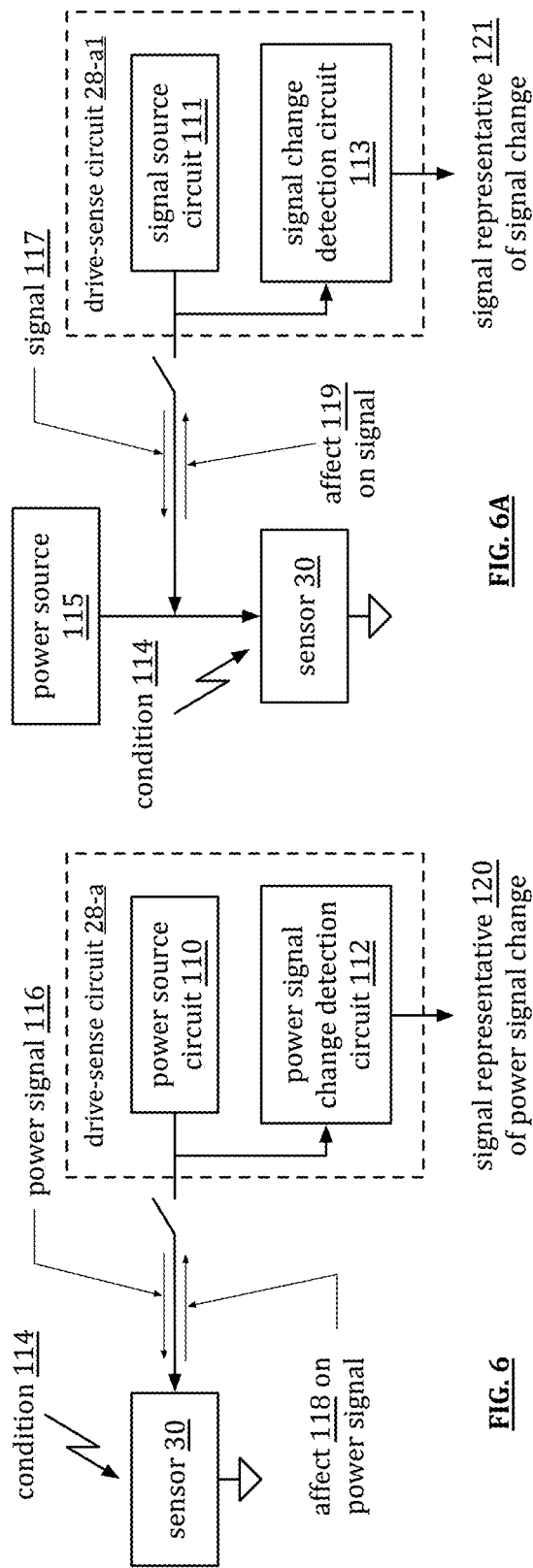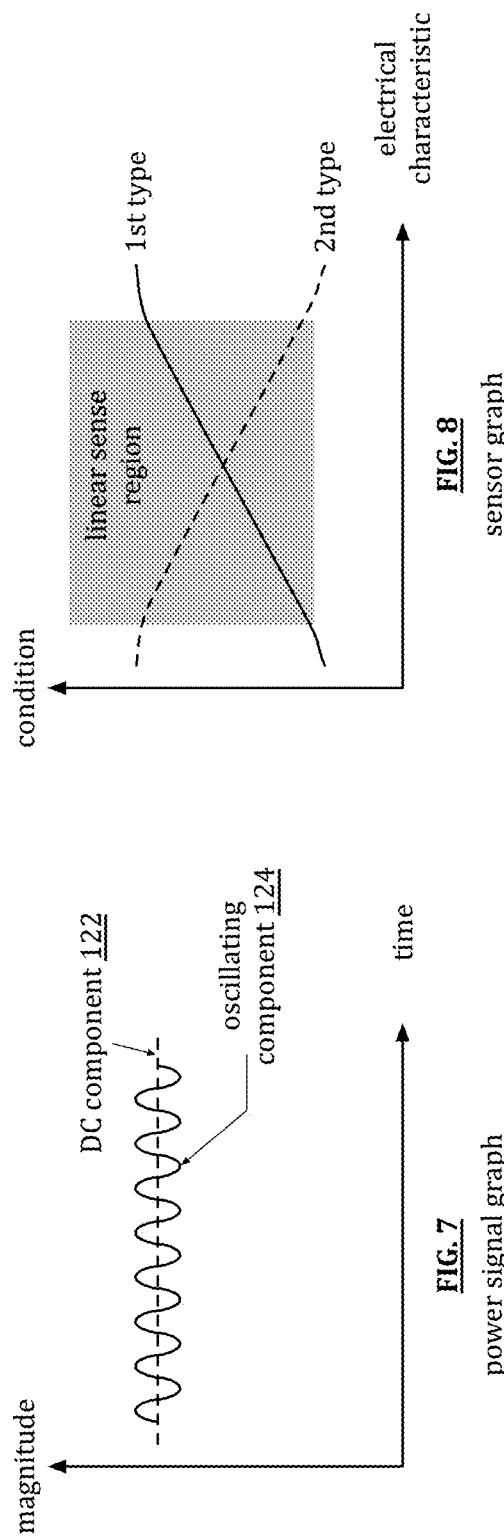

power signal graph power signal graph power signal graph power signal graph

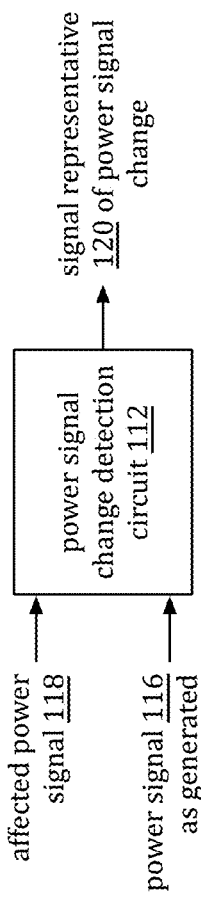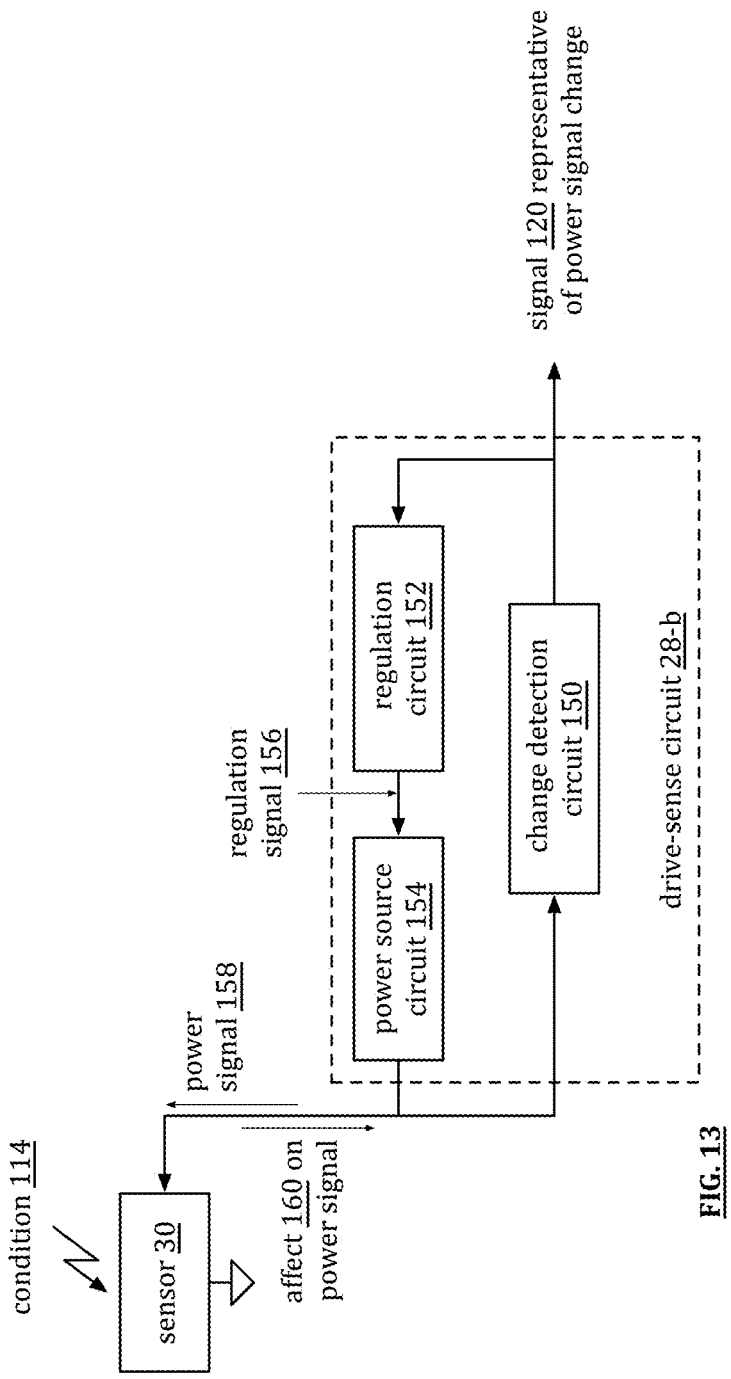

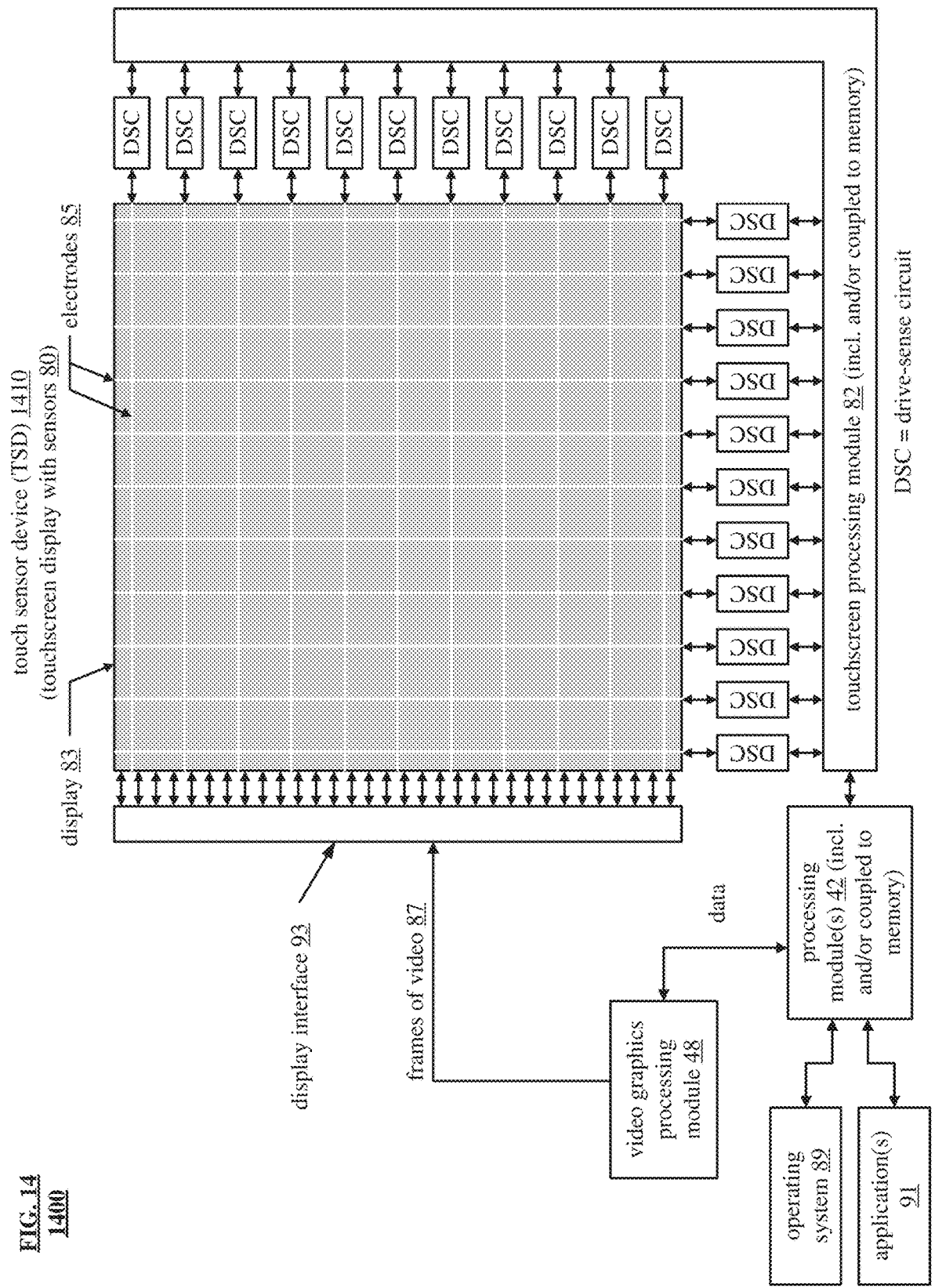

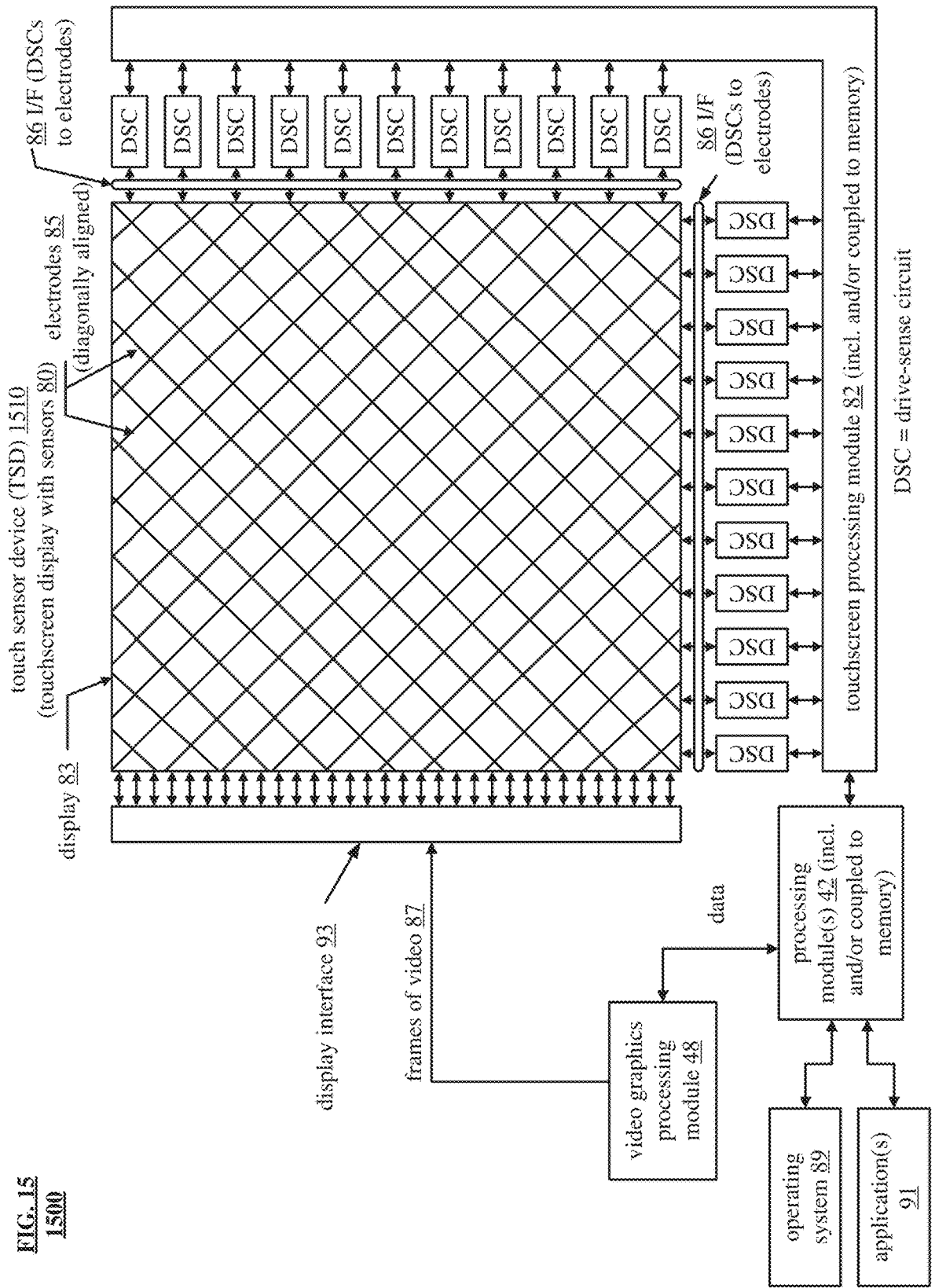

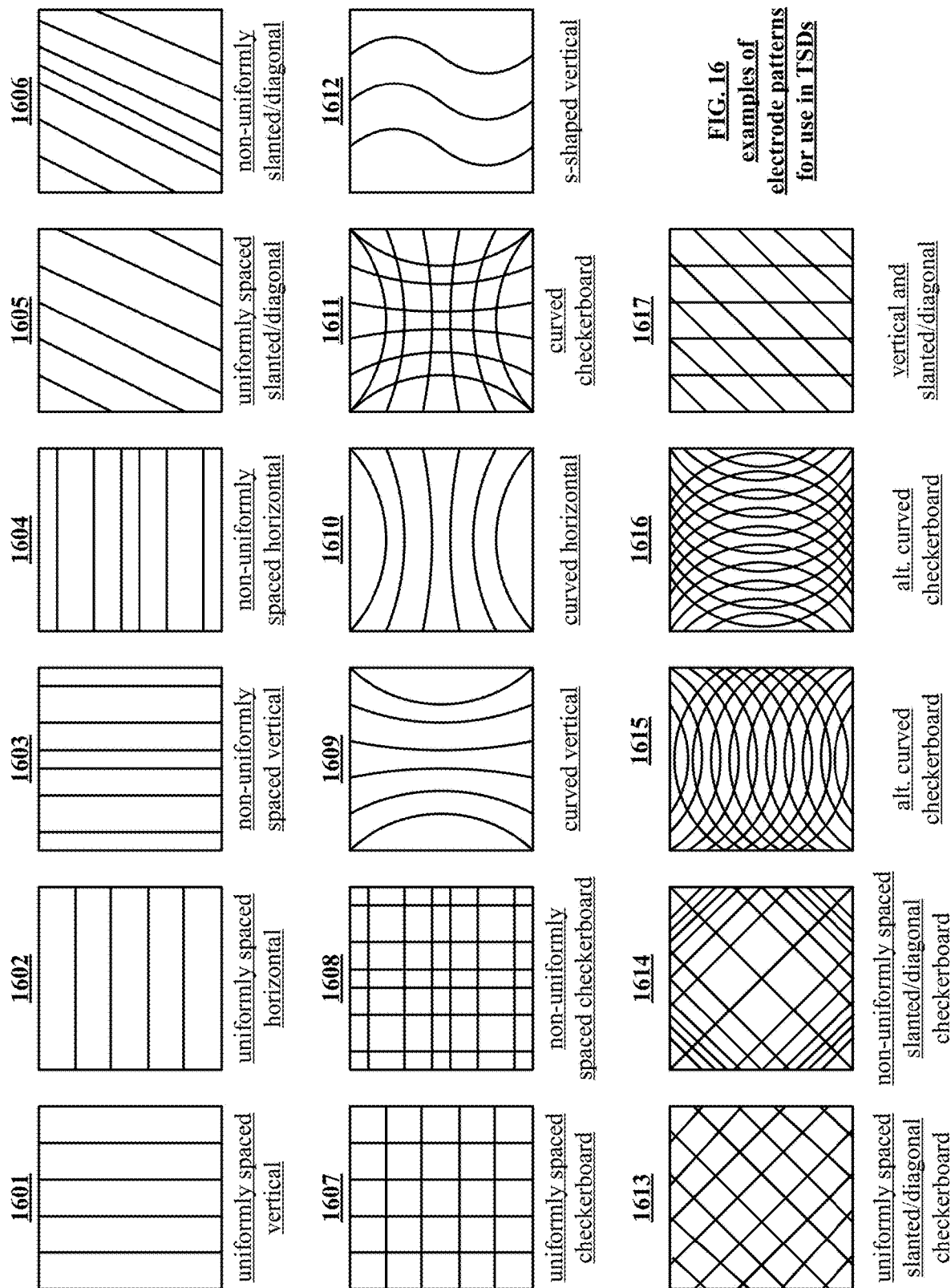

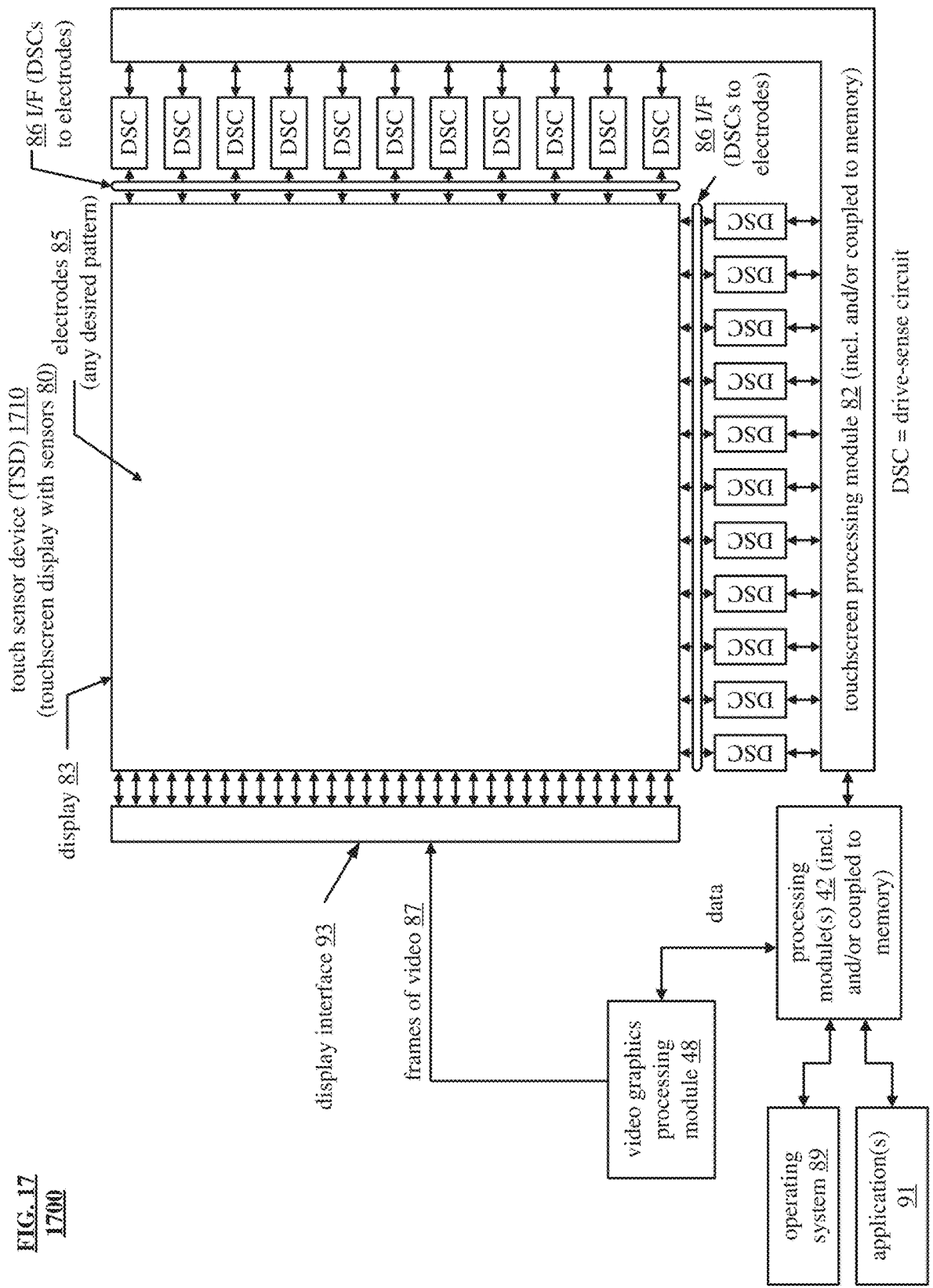

1800

2100

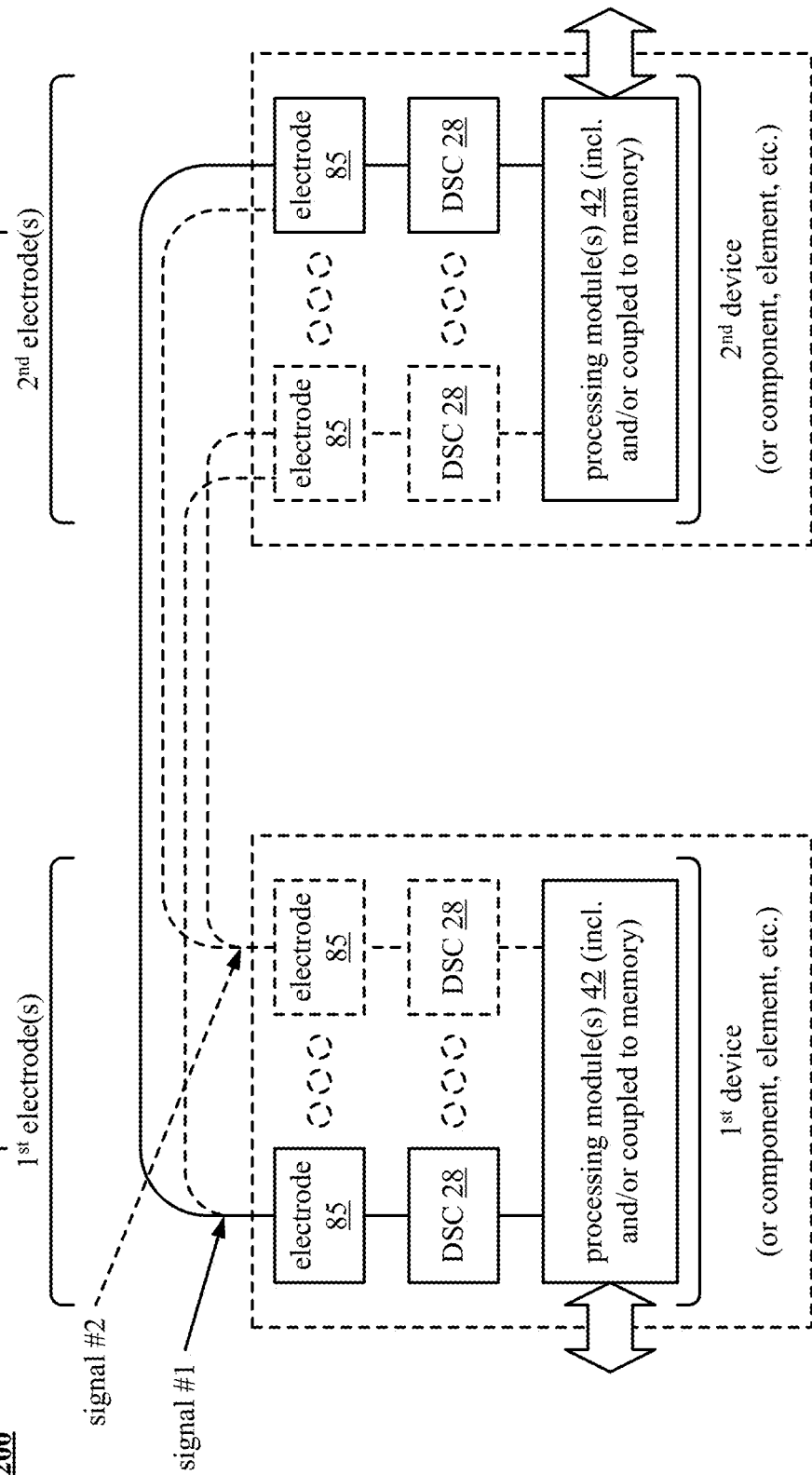

2301

2302

2400 drive-sense circuit 28-24

FIG. 25
2500 electrode 85 power signal 116
effect 118 on power signal single line drive & sense

DSC 28-a2 current reference 134 with DC and/or oscillating references current source 110-1 power source reference circuit 130 comparator 132 power signal change detection circuit 112-a1 signal 120 representative of power signal change ref. signal, power input, comm., I/F, control, digital information from DSC, etc.

processing module(s) 42 (incl. and/or coupled to memory)

2600

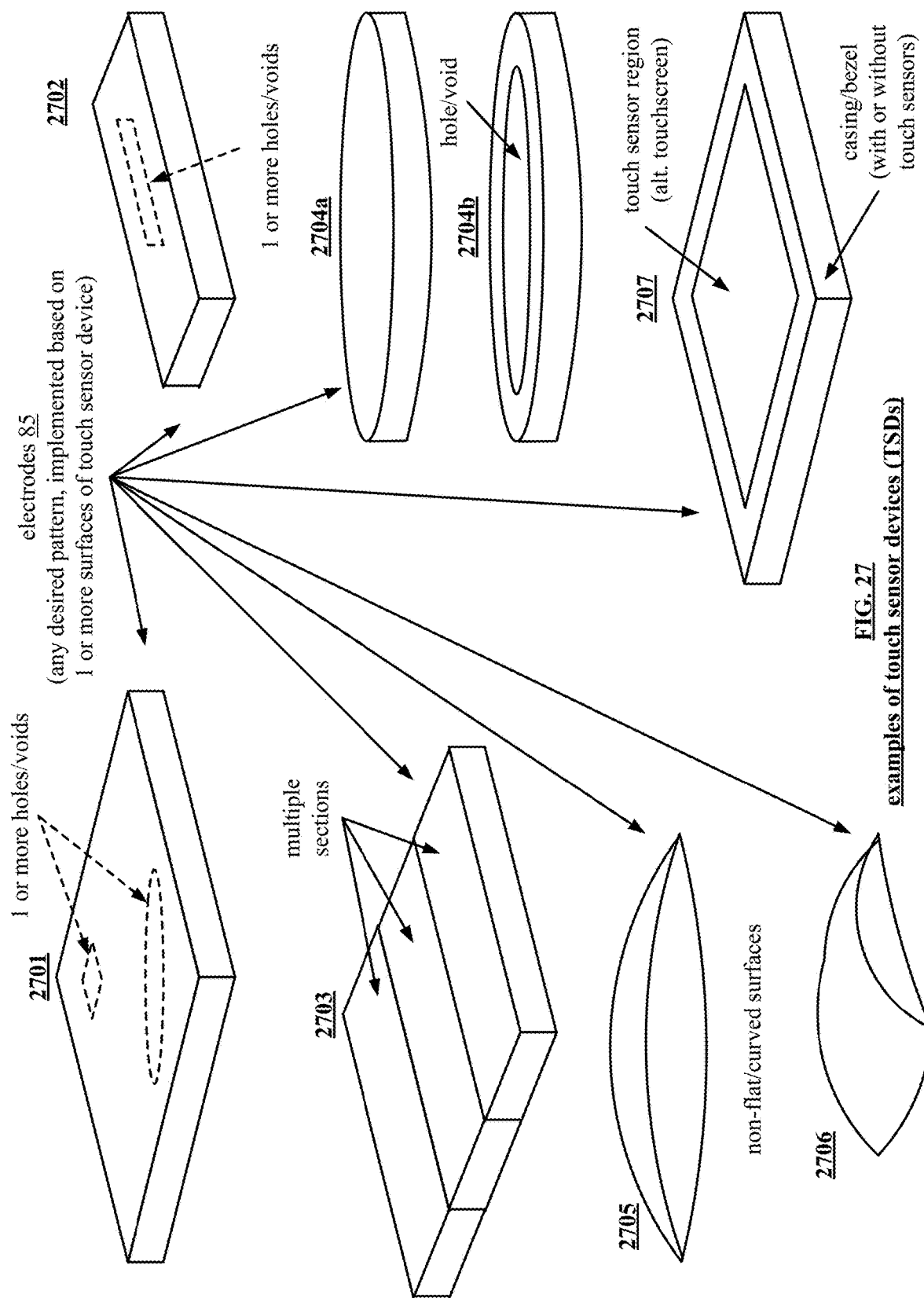

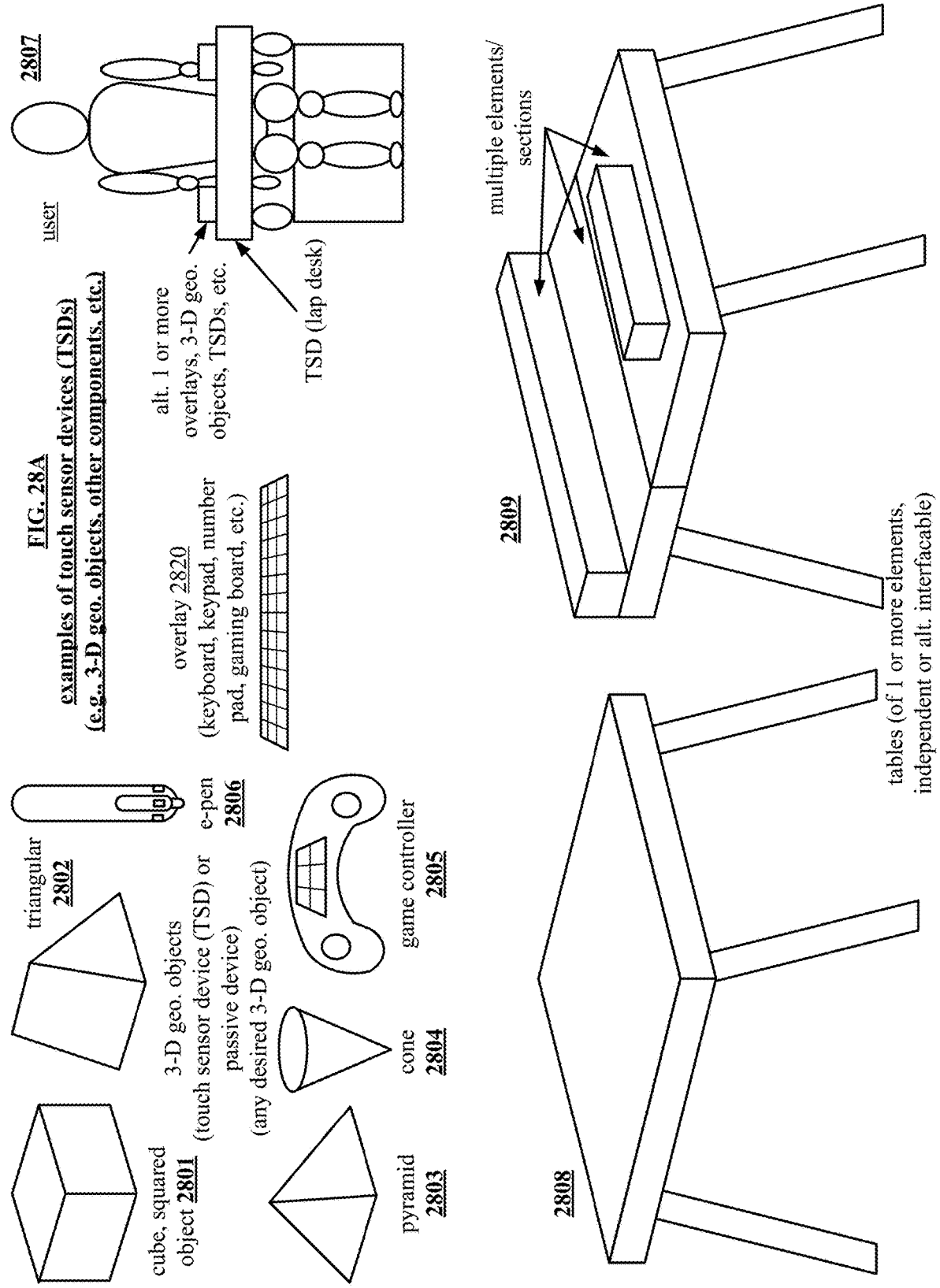

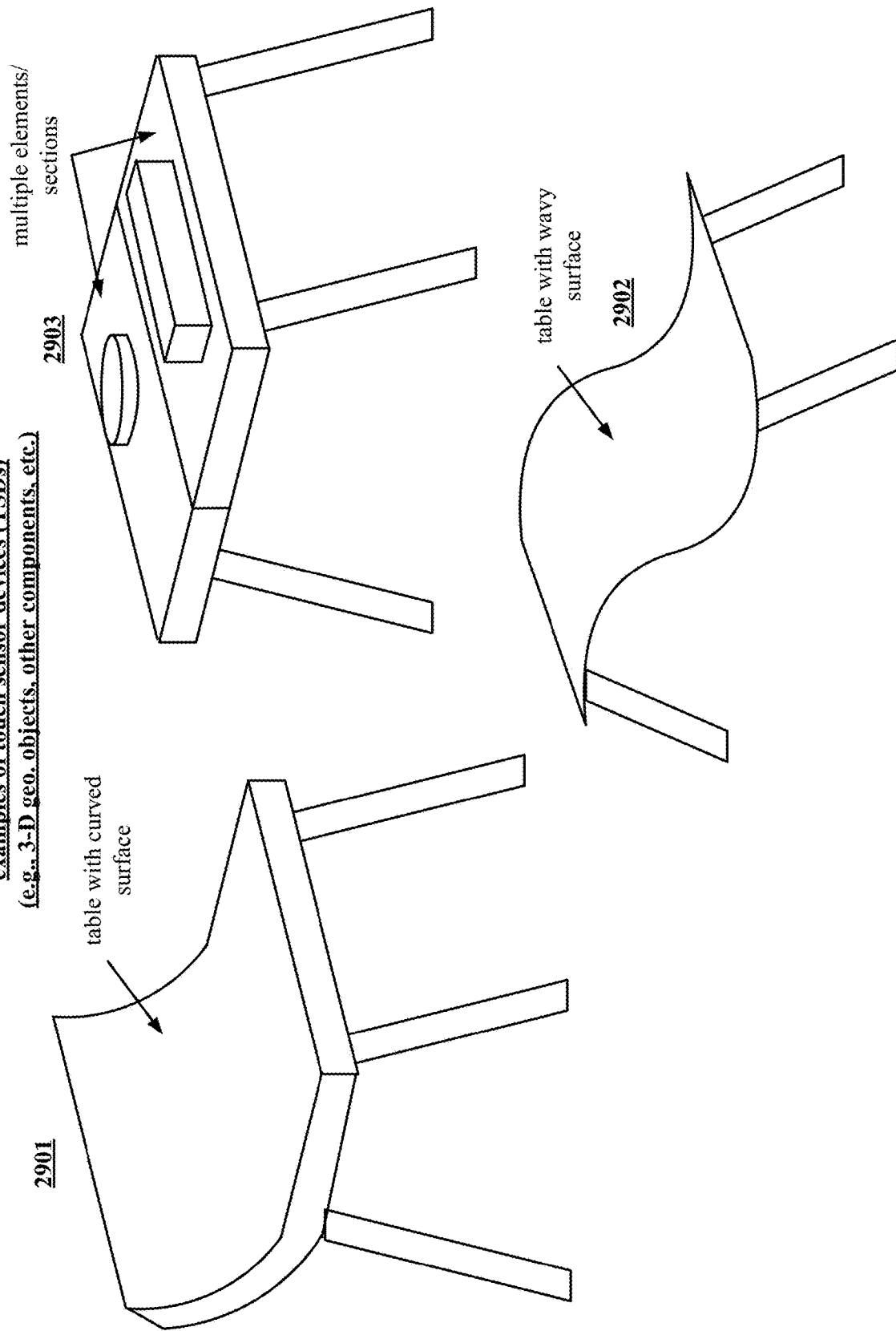

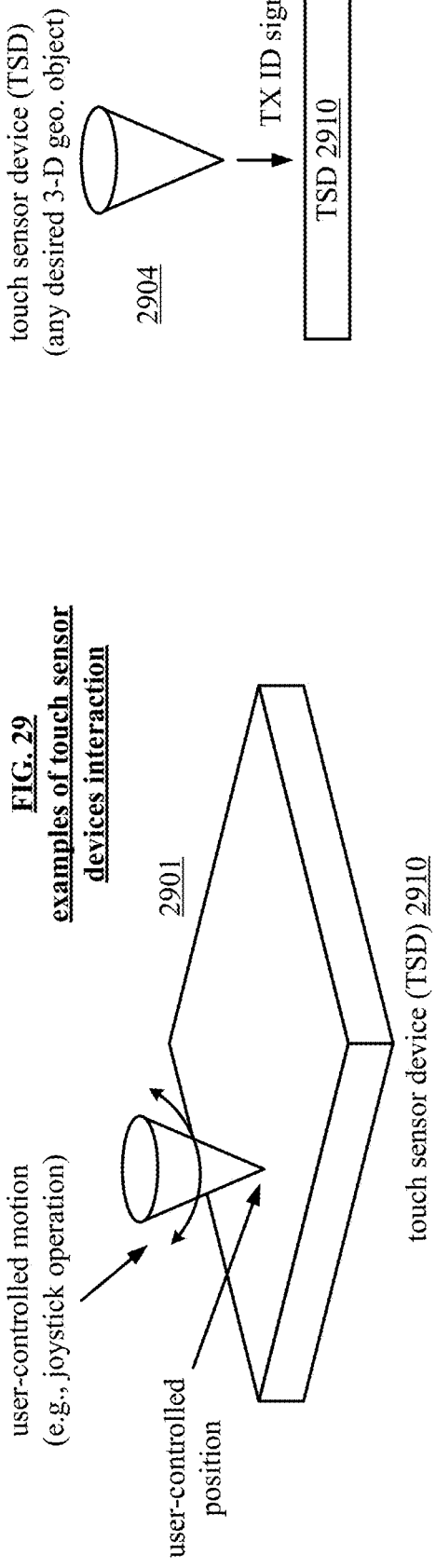
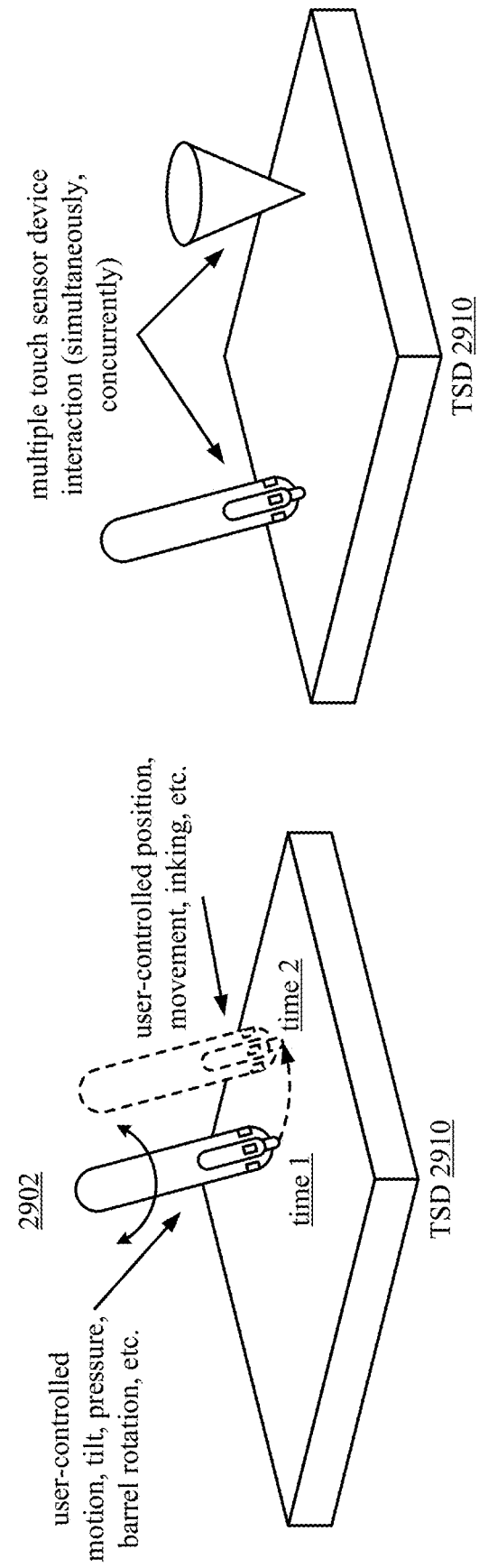
FIG. 29
examples of touch sensor devices interaction

3000

3200

FIG. 33
- examples of overlays or surface of a 3-D geo. object
  (marker electrodes of any desired size, object, location, etc.)
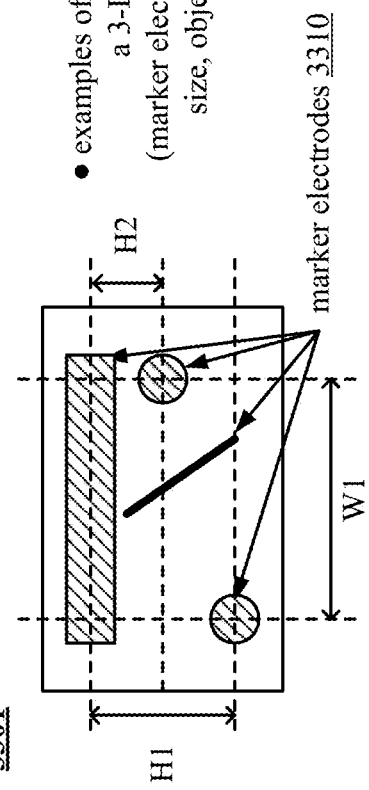
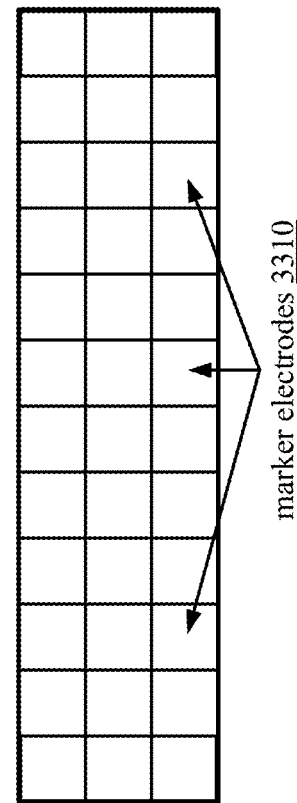
- touch sensor device (TSD) detects overlay based on marker electrode(s)
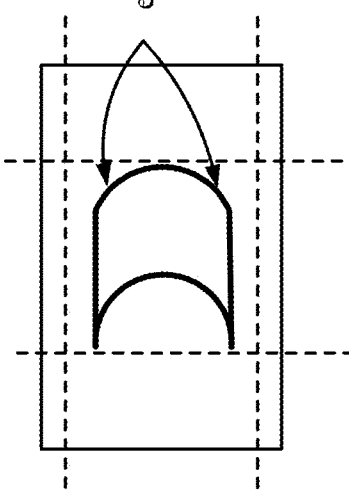

FIG. 34

- examples of 3-D geo. objects
- touch sensor device (TSD) detects based on marker electrode(s)

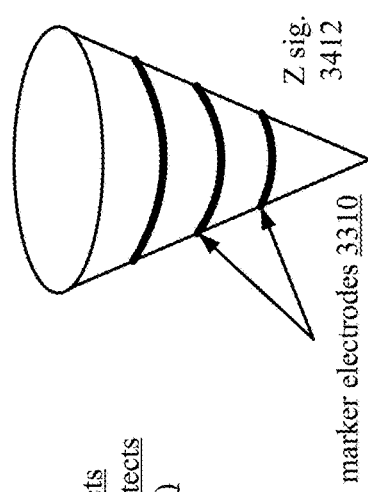

3401 impedance (Z) signature 3411 marker electrodes 3310

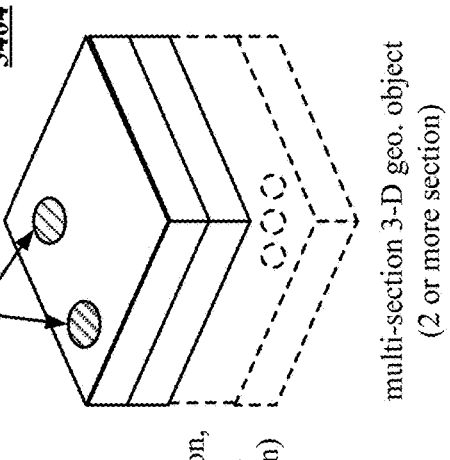

3402

Z sig. 3412 marker electrodes 3310

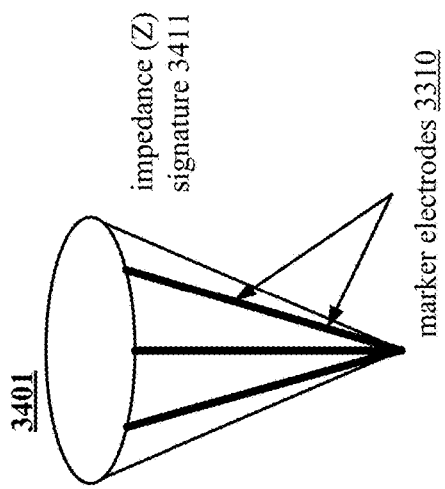

3403 marker electrodes 3310

Z sig. 3413a when upright, Z sig. 3413b when upside down (orientation based Z sig.)

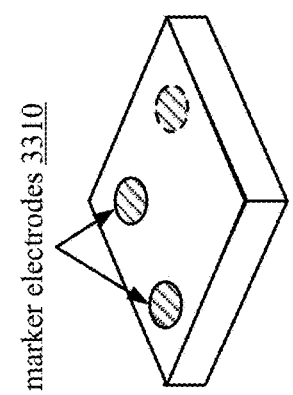

3404 marker electrodes 3310

Z sig. 3414 (based on marker electrodes per section, different Z sig. in different orientation)

multi-section 3-D geo. object (2 or more section)

FIG. 35B
- examples of overlay (keyboard, keypad, number pad, etc.)
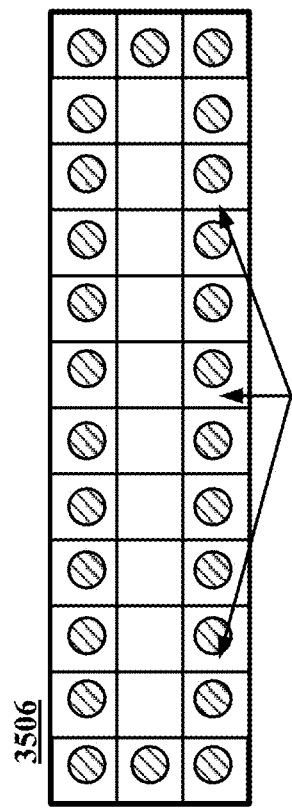
3505 — marker electrodes 3310 (other pattern 2)
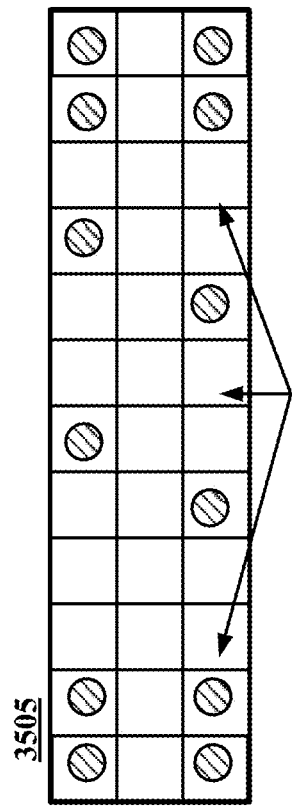
3506 — marker electrodes 3310 (perimeter)
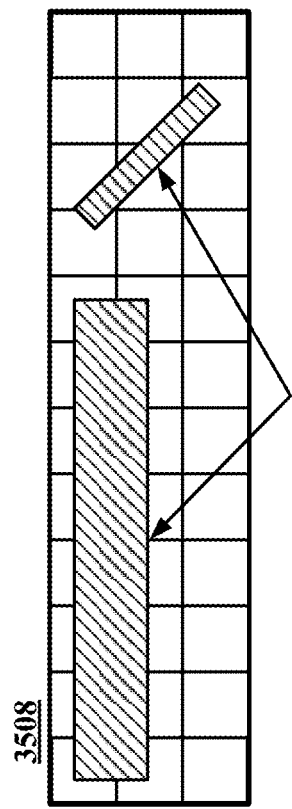
3508 — marker electrodes 3310 (corners)
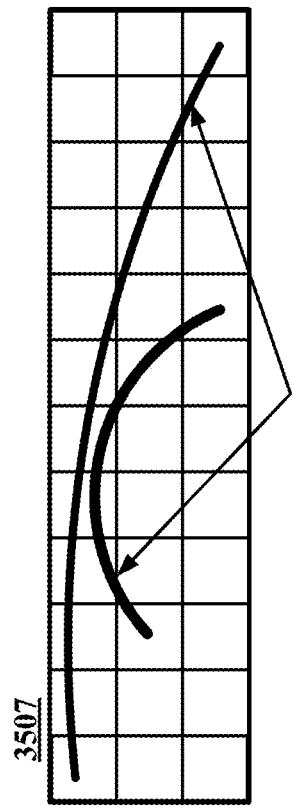
3507 — marker electrodes 3310 (curves electrodes)

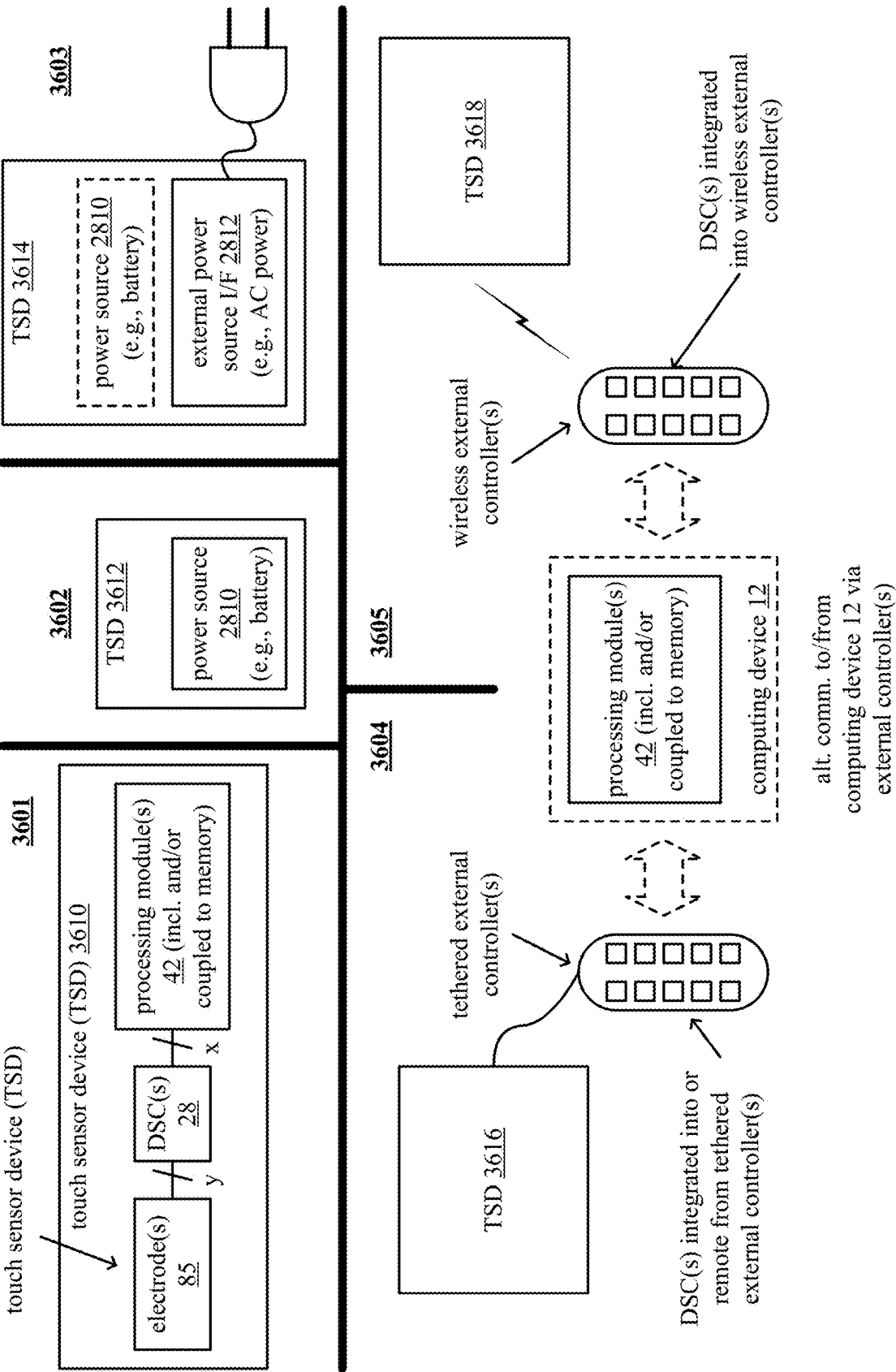

3800

3901

3902

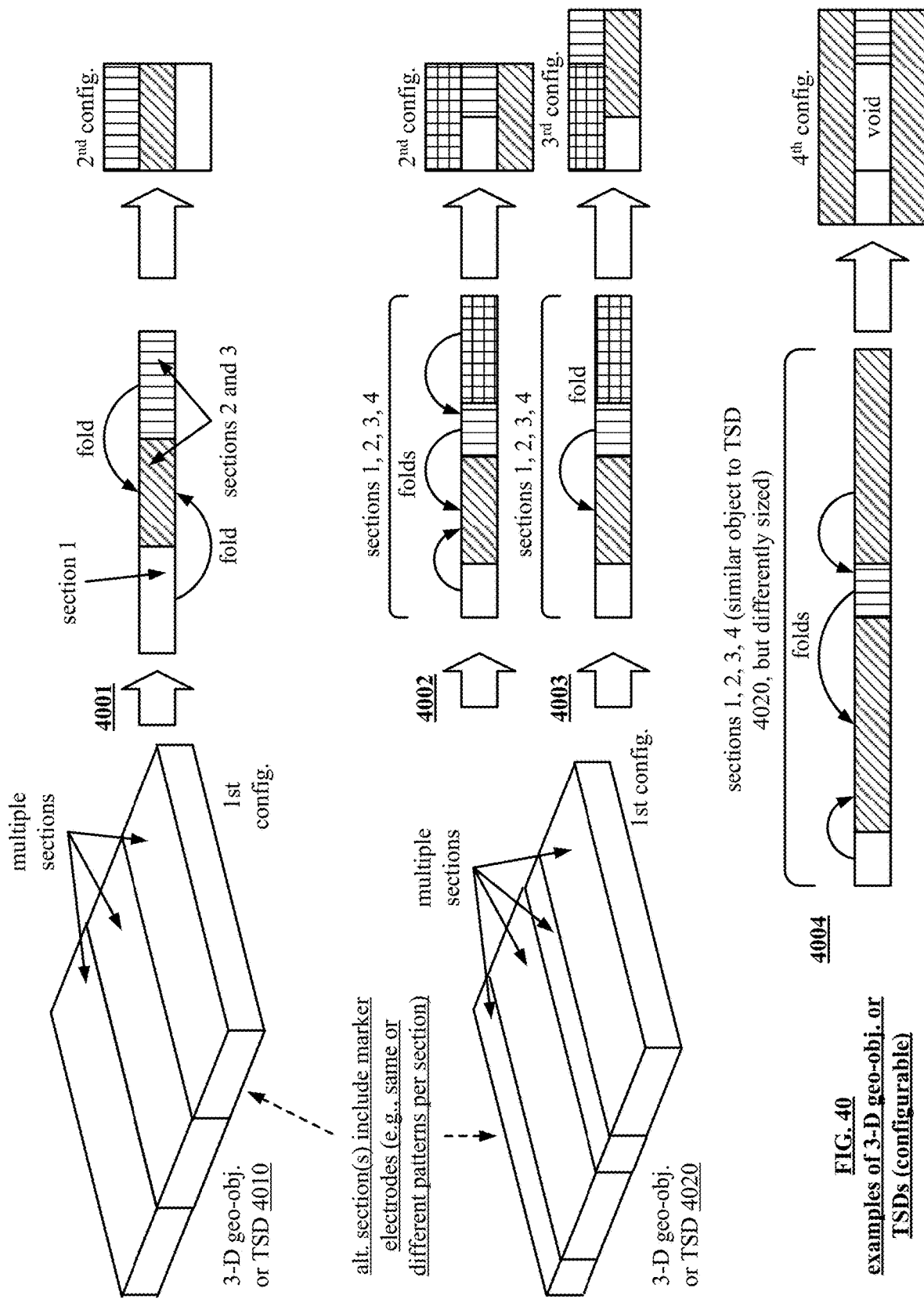
FIG. 40 examples of 3-D geo-obj. or TSDs (configurable)

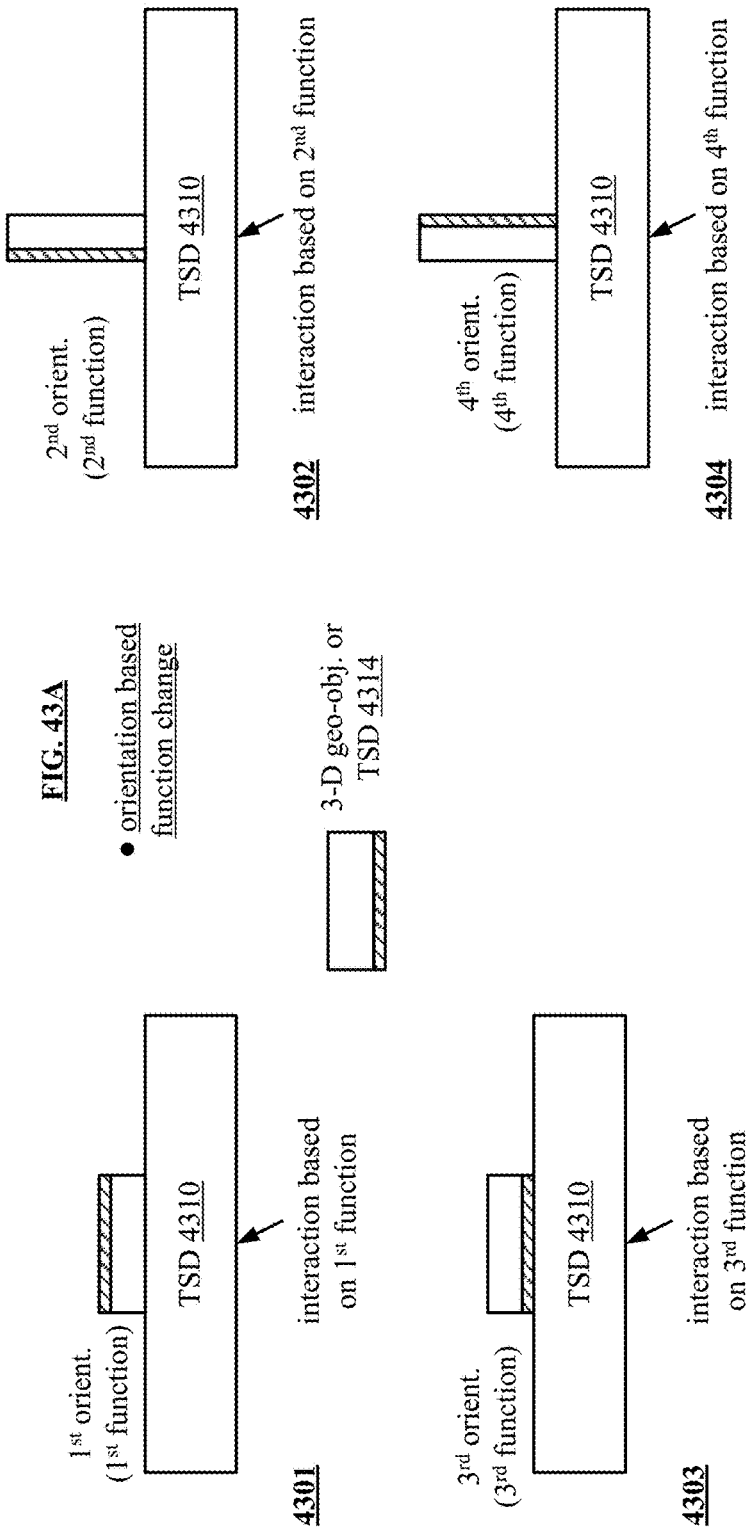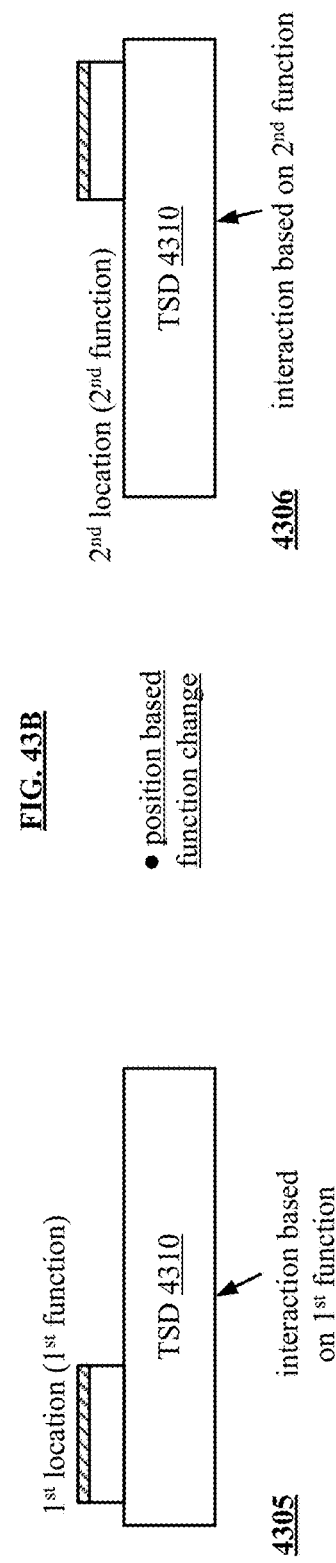
FIG. 43A
FIG. 43B

4500

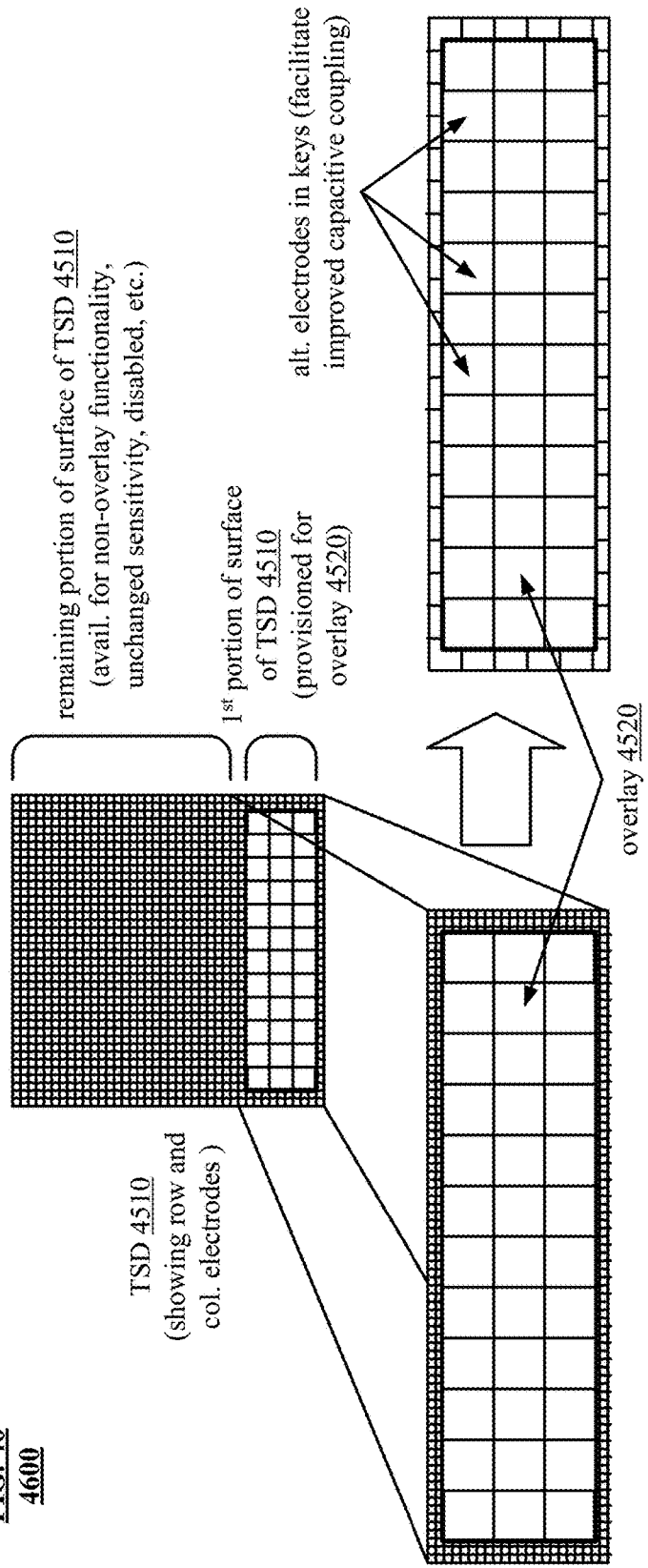
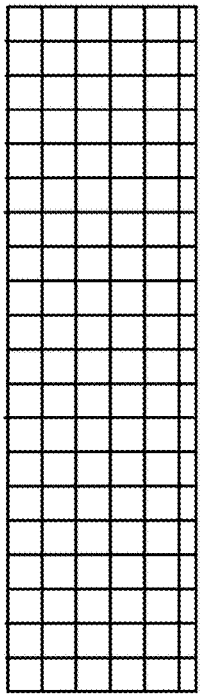
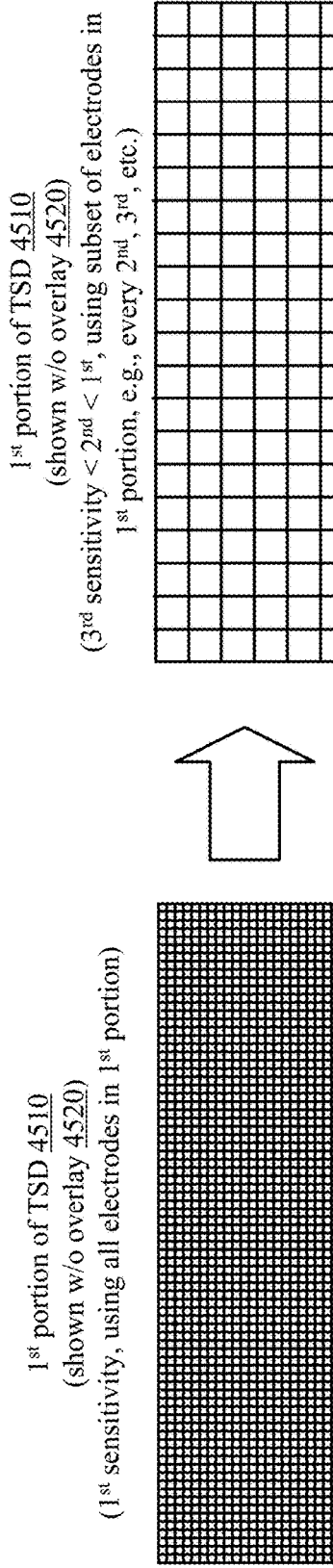
FIG. 46
4600

4900

TSD 4810 (showing row and col. electrodes)

5100

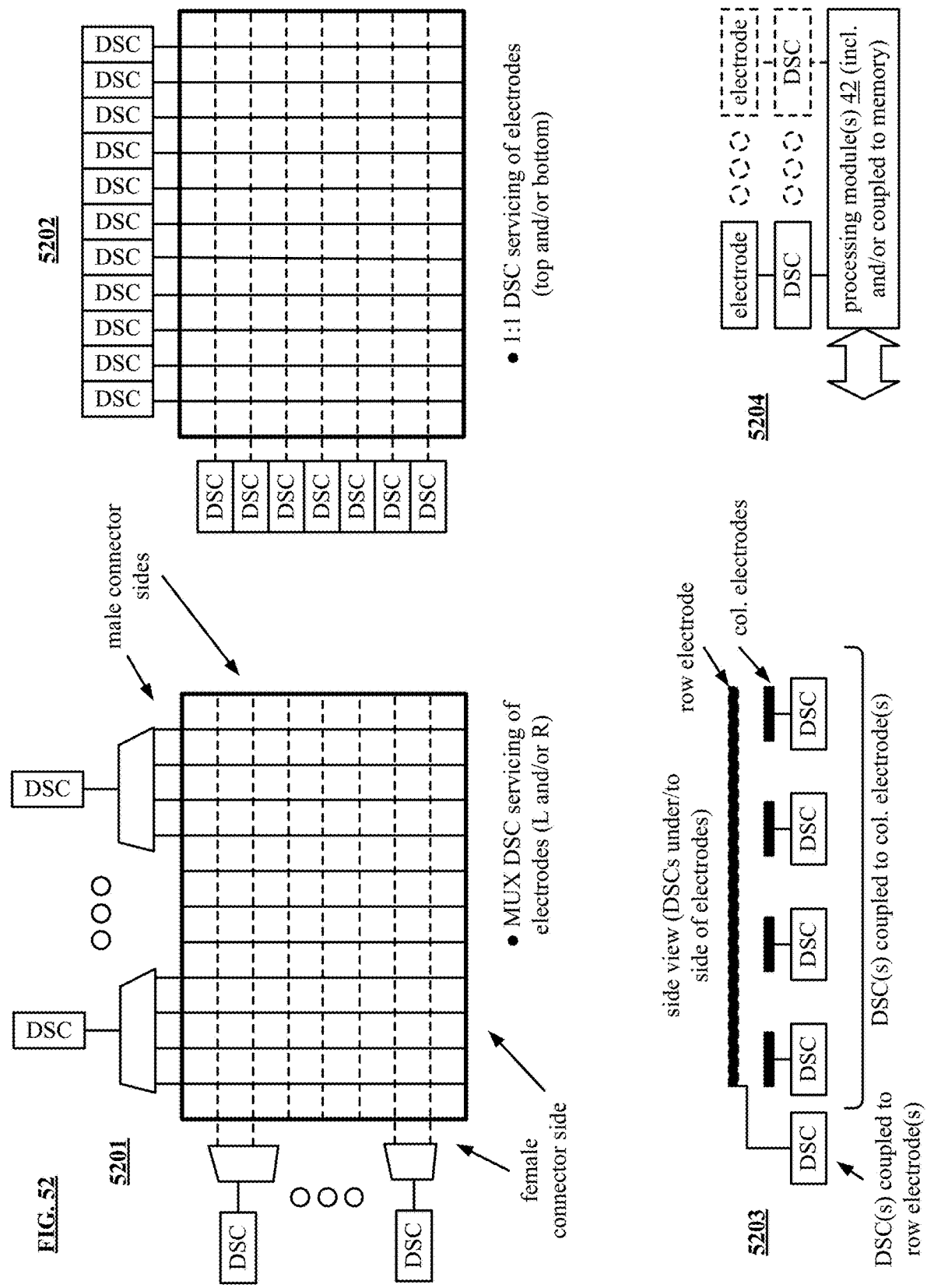

5301

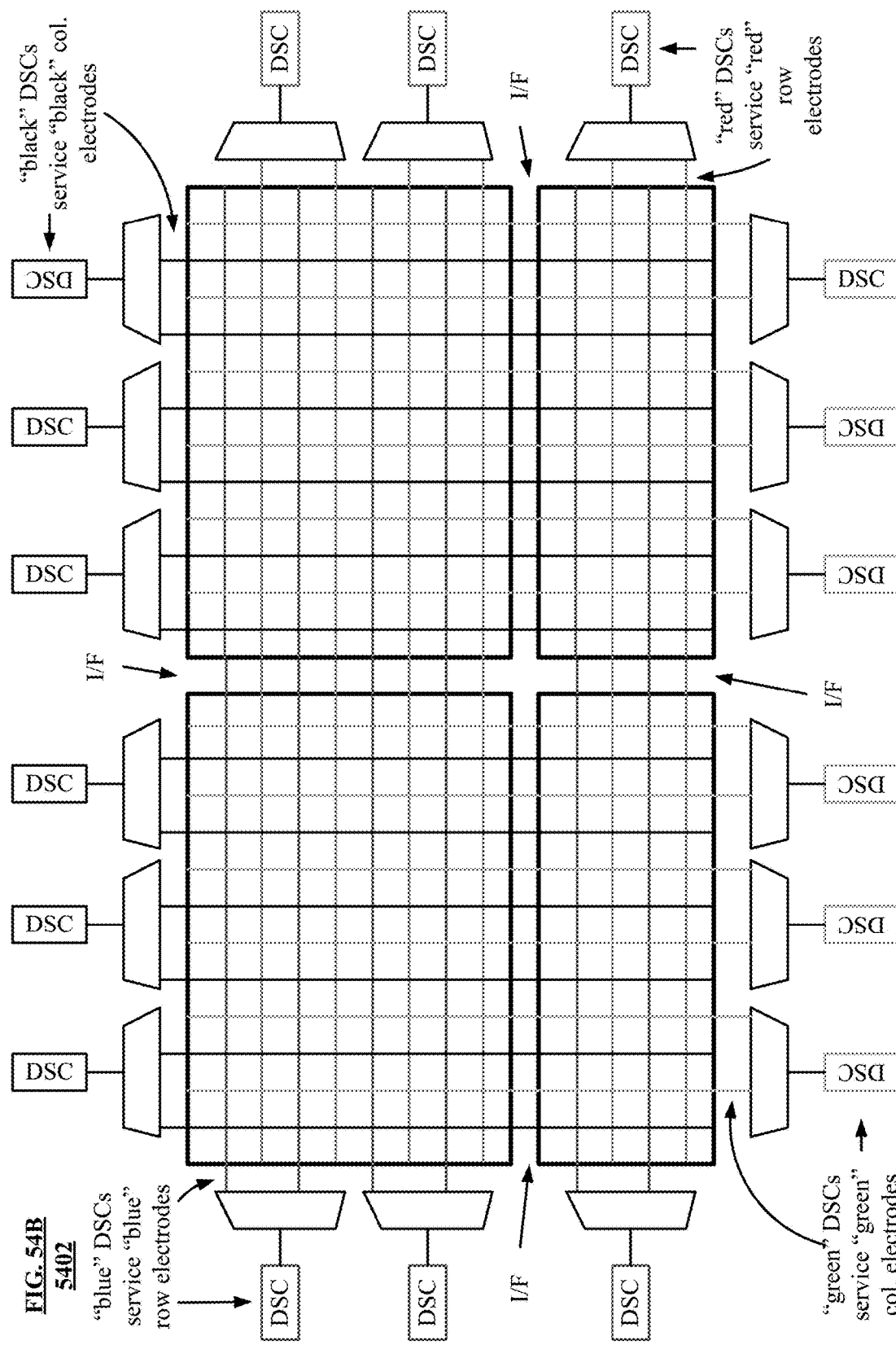

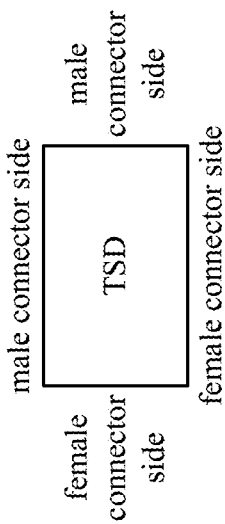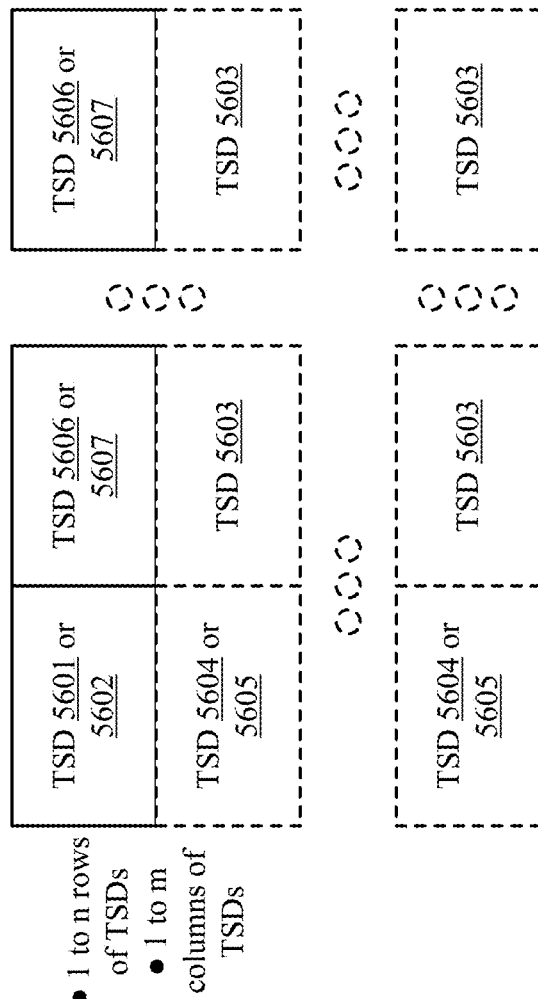
FIG. 57

DEVICE AND HOST COMMUNICATIONS FOR INPUT/OUTPUT (I/O) OPERATIVE TOUCH SENSOR DEVICE (TSD)

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 16/793,043, entitled "Input/Output (I/O) Operative Touch Sensor Device (TSD)," filed Feb. 18, 2020, pending, which is hereby incorporated herein by reference in its entirety and made part of the present U.S. Utility Patent Application for all purposes.

The present U.S. Utility Patent Application also claims priority pursuant to 35 U.S.C. § 120 as a continuation-in-part of U.S. Utility application Ser. No. 17/731,612, entitled "Analog Front End Channel Driver Circuit," filed Apr. 28, 2022, which is a continuation of U.S. Utility application Ser. No. 17/184,031, entitled "Analog Front End Channel Driver Circuit," filed Feb. 24, 2021, issued as U.S. Pat. No. 11,340,727 on May 24, 2022, which is a continuation of U.S. Utility application Ser. No. 16/857,600, entitled "ANALOG FRONT END CHANNEL DRIVER CIRCUIT," filed Apr. 24, 2020, issued as U.S. Pat. No. 10,963,093 on Mar. 30, 2021, which is a continuation of U.S. Utility application Ser. No. 16/253,717, entitled "CHANNEL DRIVER CIRCUIT," filed Jan. 22, 2019, issued as U.S. Pat. No. 10,664,098 on May 26, 2020, which claims priority pursuant to 35 U.S.C. § 119(e) to U.S. Provisional Application No. 62/620,812, entitled "CHANNEL DRIVER CIRCUIT," filed Jan. 23, 2018, and U.S. Provisional Application No. 62/630,595, entitled "ANALOG FRONT END CHANNEL DRIVING CIRCUIT," filed Feb. 14, 2018.

U.S. Utility application Ser. No. 16/253,717 also claims priority pursuant to 35 U.S.C. § 120, as a continuation-in-part (CIP) of U.S. Utility patent application Ser. No. 16/109,600, entitled "MULTI-TOUCH SENSOR AND ELECTROSTATIC PEN DIGITIZING SYSTEM UTILIZING SIMULTANEOUS FUNCTIONS FOR IMPROVED PERFORMANCE," filed Aug. 22, 2018, issued as U.S. Pat. No. 10,678,372 on Jun. 9, 2020, which claims priority pursuant to 35 U.S.C. § 120 as a continuation of U.S. Utility application Ser. No. 15/506,097, entitled "MULTI-TOUCH SENSOR AND ELECTROSTATIC PEN DIGITIZING SYSTEM UTILIZING SIMULTANEOUS FUNCTIONS FOR IMPROVED PERFORMANCE," filed Feb. 23, 2017, issued as U.S. Pat. No. 10,120,498 on Nov. 6, 2018, which is a U.S. National Stage Application submitted pursuant to 35 U.S.C. § 371 of Patent Cooperation Treaty Application No. PCT/US2016/038497, entitled "MULTI-TOUCH SENSOR AND ELECTROSTATIC PEN DIGITIZING SYSTEM UTILIZING SIMULTANEOUS FUNCTIONS FOR IMPROVED PERFORMANCE," filed Jun. 21, 2016, which claims priority pursuant to 35 U.S.C. § 119(e) to U.S. Provisional Application No. 62/183,062, entitled "MULTI-TOUCH SENSOR AND ELECTROSTATIC PEN DIGITIZING SYSTEM UTILIZING SIMULTANEOUS FUNCTIONS FOR IMPROVED PERFORMANCE," filed Jun. 22, 2015.

INCORPORATION BY REFERENCE

The U.S. Utility application Ser. No. 16/793,078, entitled "Sensitivity Region of Interest Processing (ROIP) for Input/Output (I/O) Operative Touch Sensor Device (TSD)," filed Feb. 18, 2020, now issued as U.S. Pat. No. 11,079,888 on Aug. 3, 2021, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touchscreens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

BRIEF DESCRIPTION OF THE SEVERAL VIEWS OF THE DRAWING(S)

FIG. 5A is a schematic plot diagram of a computing subsystem in accordance with the present invention;

FIG. 5C is a schematic block diagram of another embodiment of a computing subsystem in accordance with the present invention;

FIG. 6 is a schematic block diagram of a drive center circuit in accordance with the present invention;

FIG. 6A is a schematic block diagram of another embodiment of a drive sense circuit in accordance with the present invention;

FIG. 7 is an example of a power signal graph in accordance with the present invention;

FIG. 8 is an example of a sensor graph in accordance with the present invention;

FIG. 12 is a schematic block diagram of an embodiment of a power signal change detection circuit in accordance with the present invention;

FIG. 13 is a schematic block diagram of another embodiment of a drive-sense circuit in accordance with the present invention;

FIG. 14 is a schematic block diagram of an embodiment of a touch sensor device (TSD) in accordance with the present invention;

FIG. 15 is a schematic block diagram of another embodiment of a touch sensor device (TSD) in accordance with the present invention;

FIG. 16 is a schematic block diagram of various embodiments of electrode patterns that may be used on a touch sensor device (TSD) in accordance with the present invention;

FIG. 17 is a schematic block diagram of another embodiment of a touch sensor device (TSD) that is similar to FIG. 15 with the option of using any desired electrode pattern in accordance with the present invention;

FIG. 22 is a schematic block diagram of another embodiment of multiple touch sensor devices (TSDs) in accordance with the present invention;

FIG. 25 is a schematic block diagram of an embodiment of a DSC that is interactive with an electrode in accordance with the present invention;

FIG. 27 is a schematic block diagram of various embodiments of touch sensor devices (TSDs), which may or may not include display functionality via a touchscreen display, an liquid crystal display (LCD) operable display, a light emitting diode (LED) operable display, and/or other visual output component, in accordance with the present invention.

Figure 30:
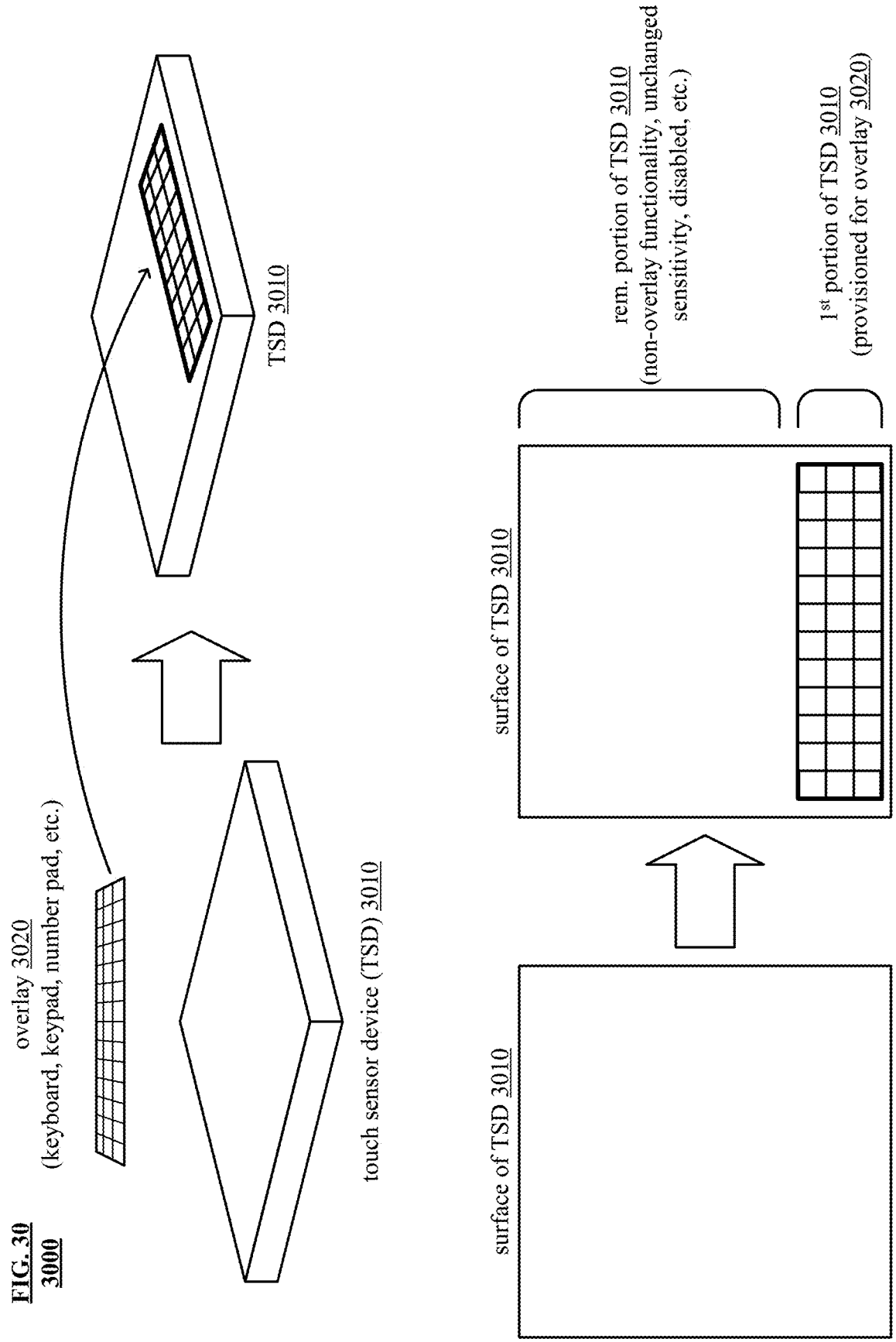
Figure 31:
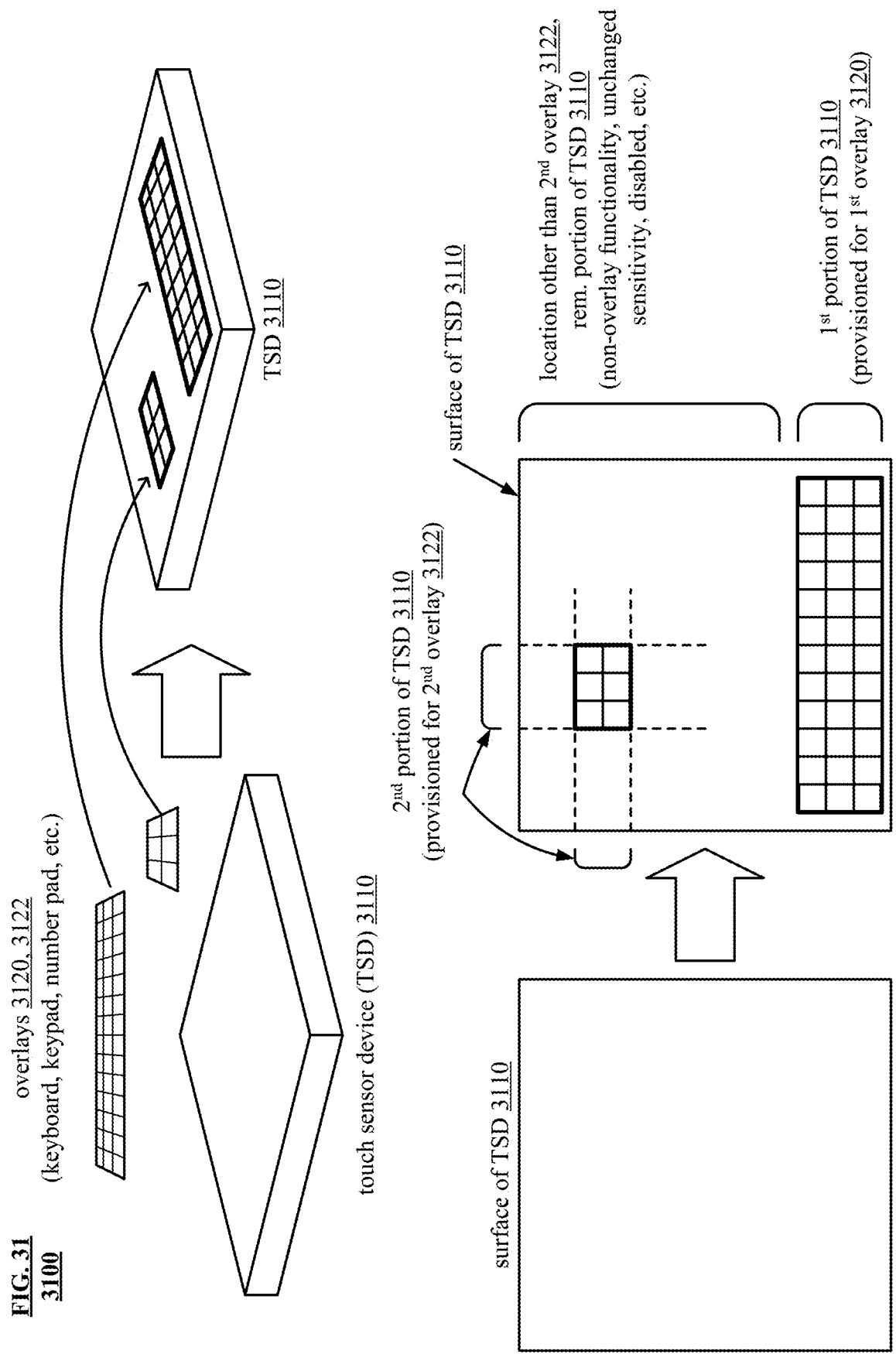
Figure 32:
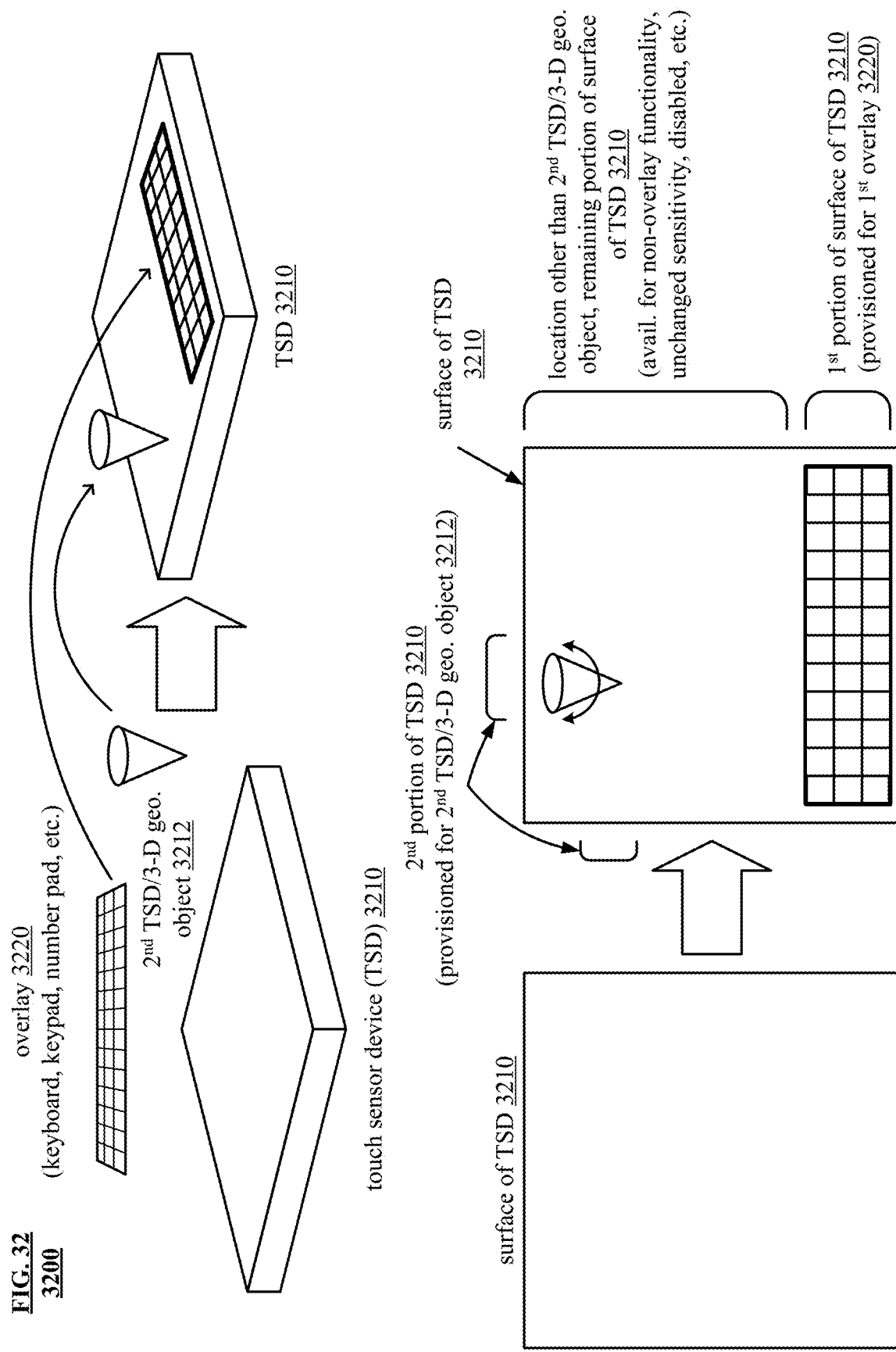
Figure 35A:
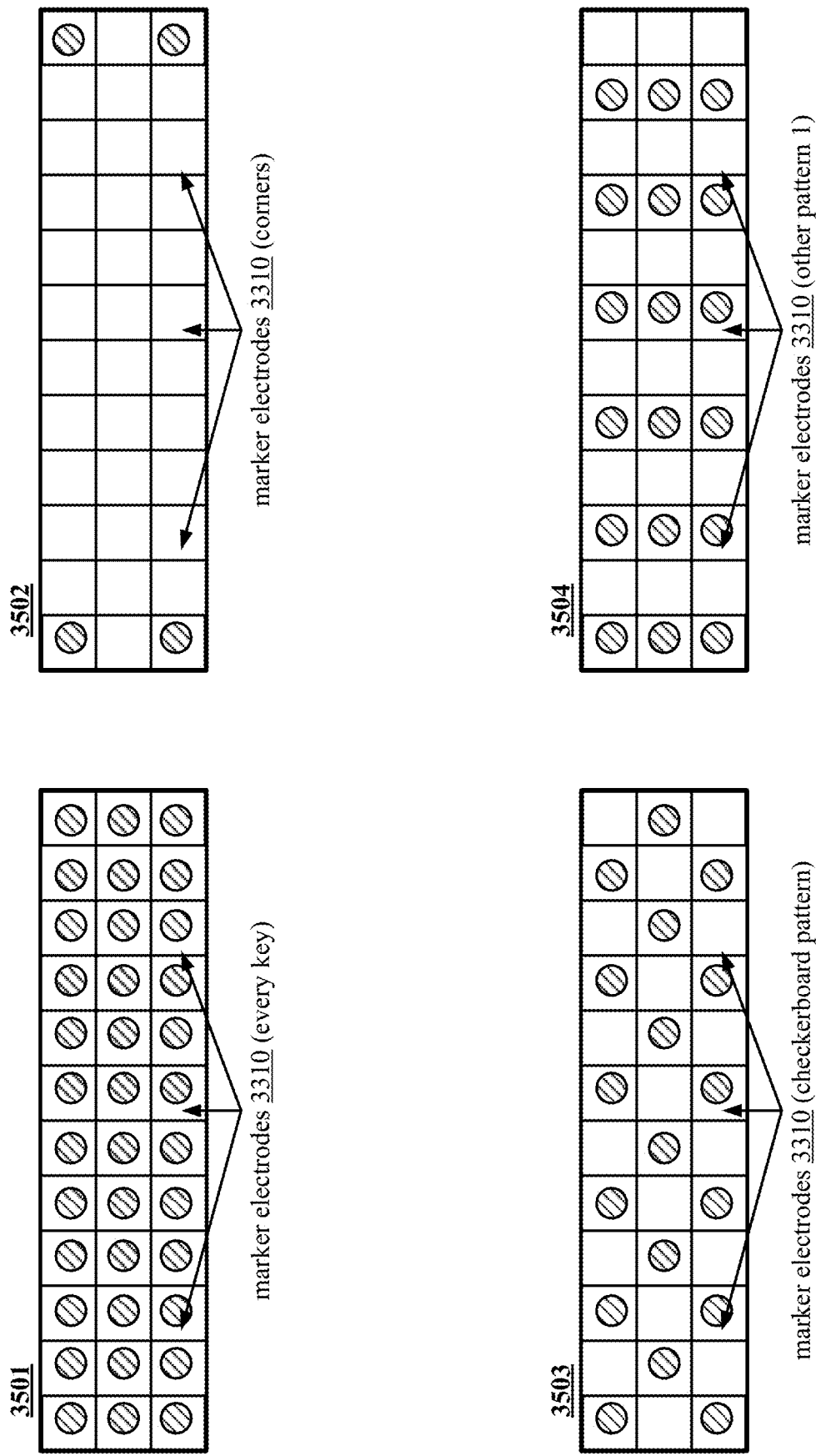
Figure 37A:
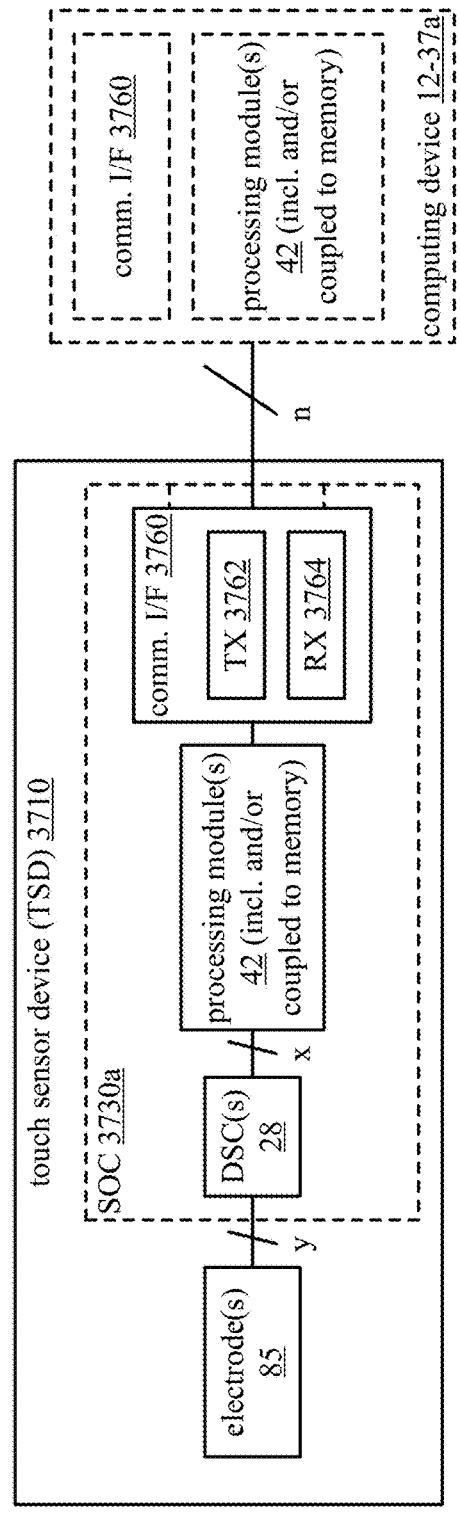
Figure 37B:
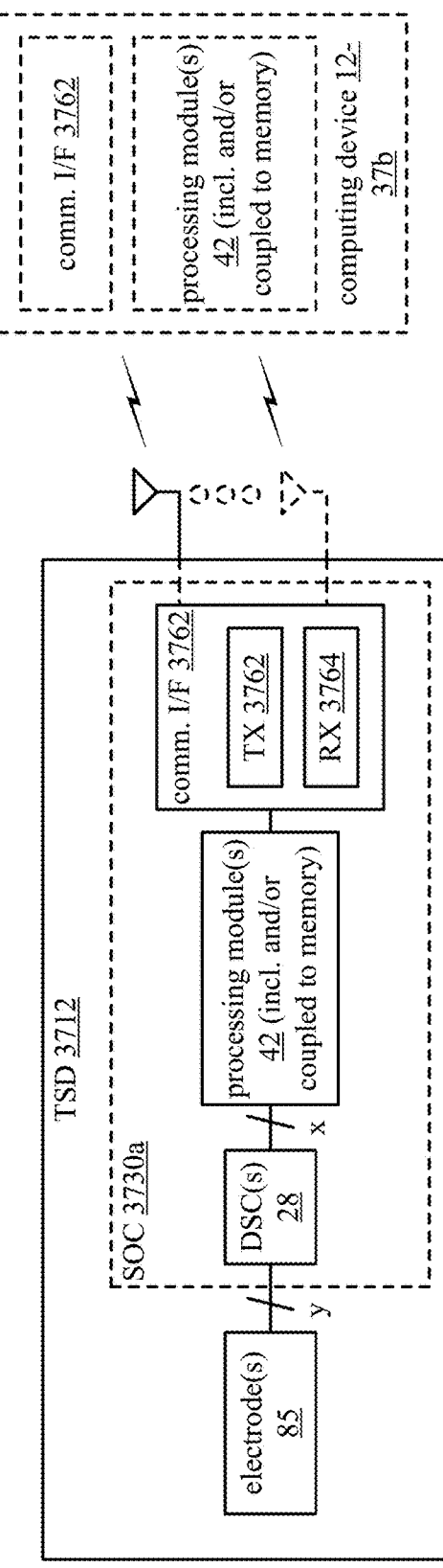
Figure 38:
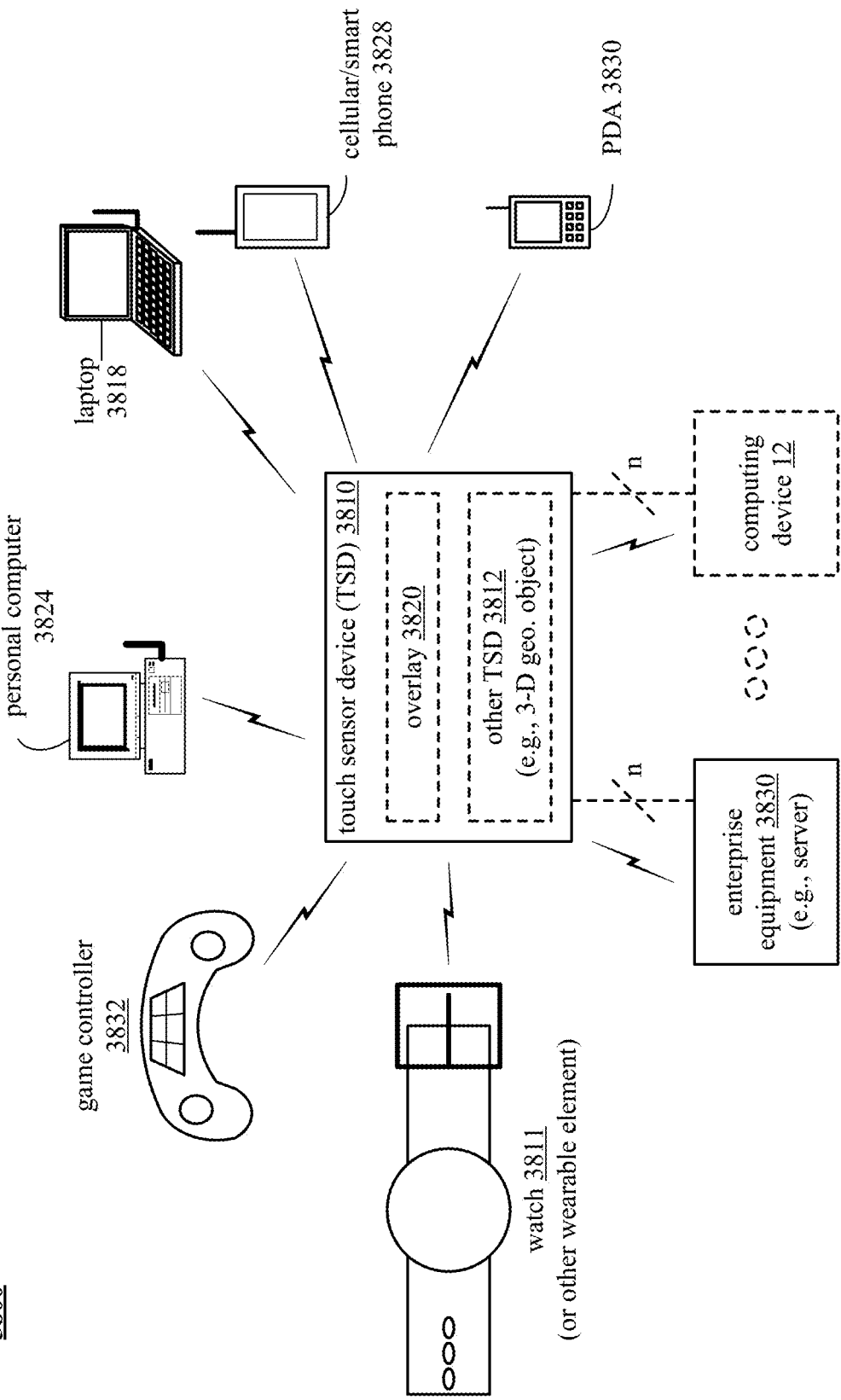
Figure 39A:
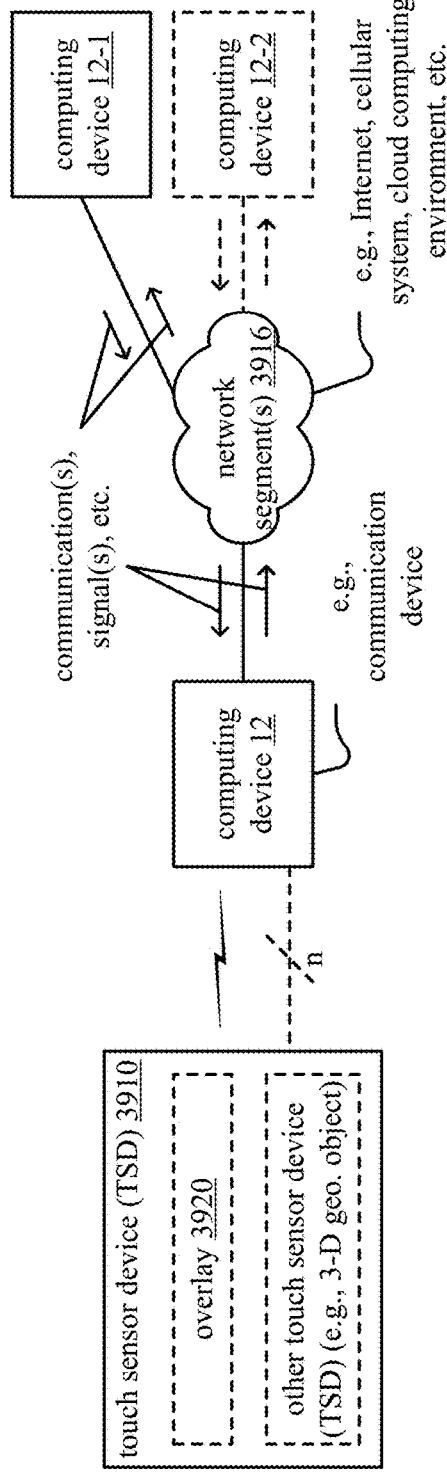
Figure 39B:
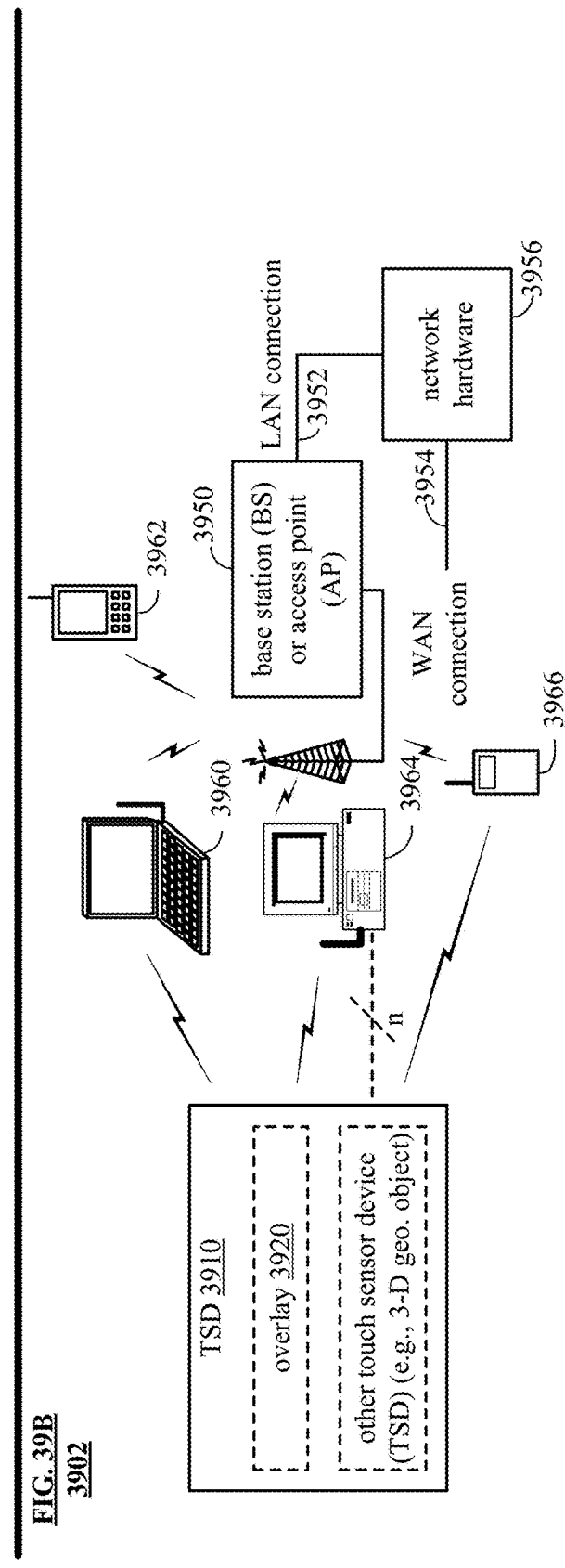
Figure 41:
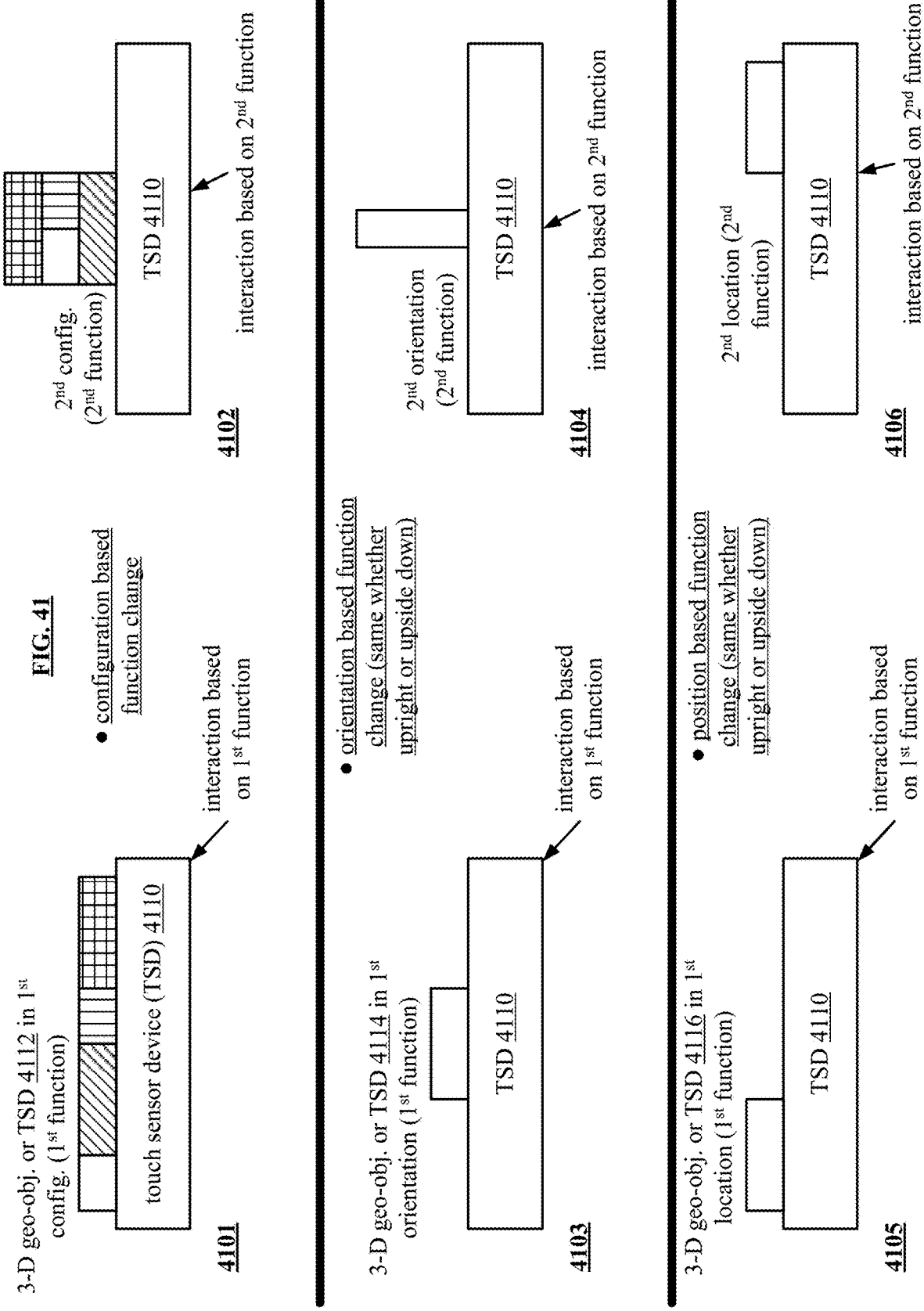
Figure 42:
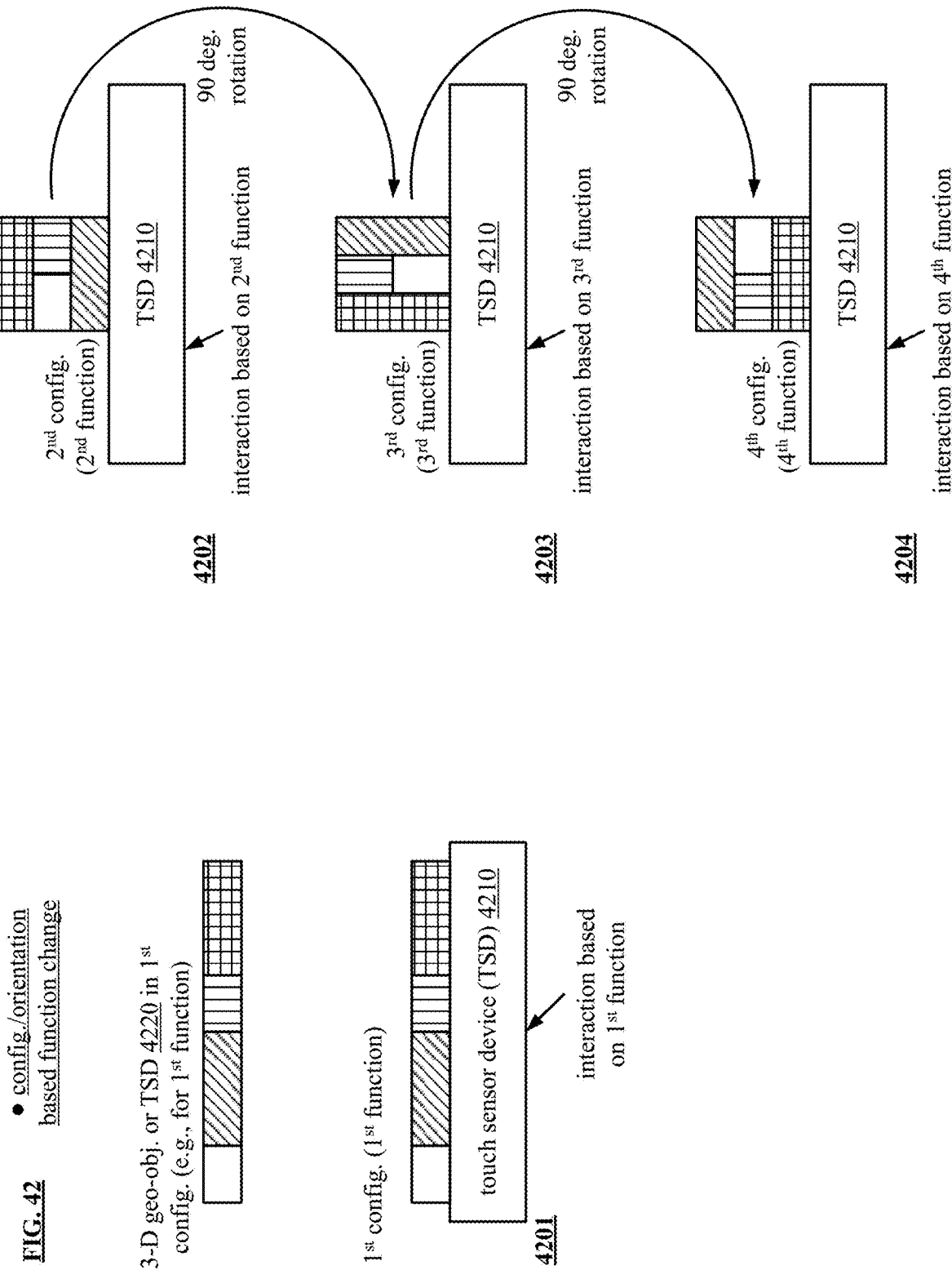
Figure 44:
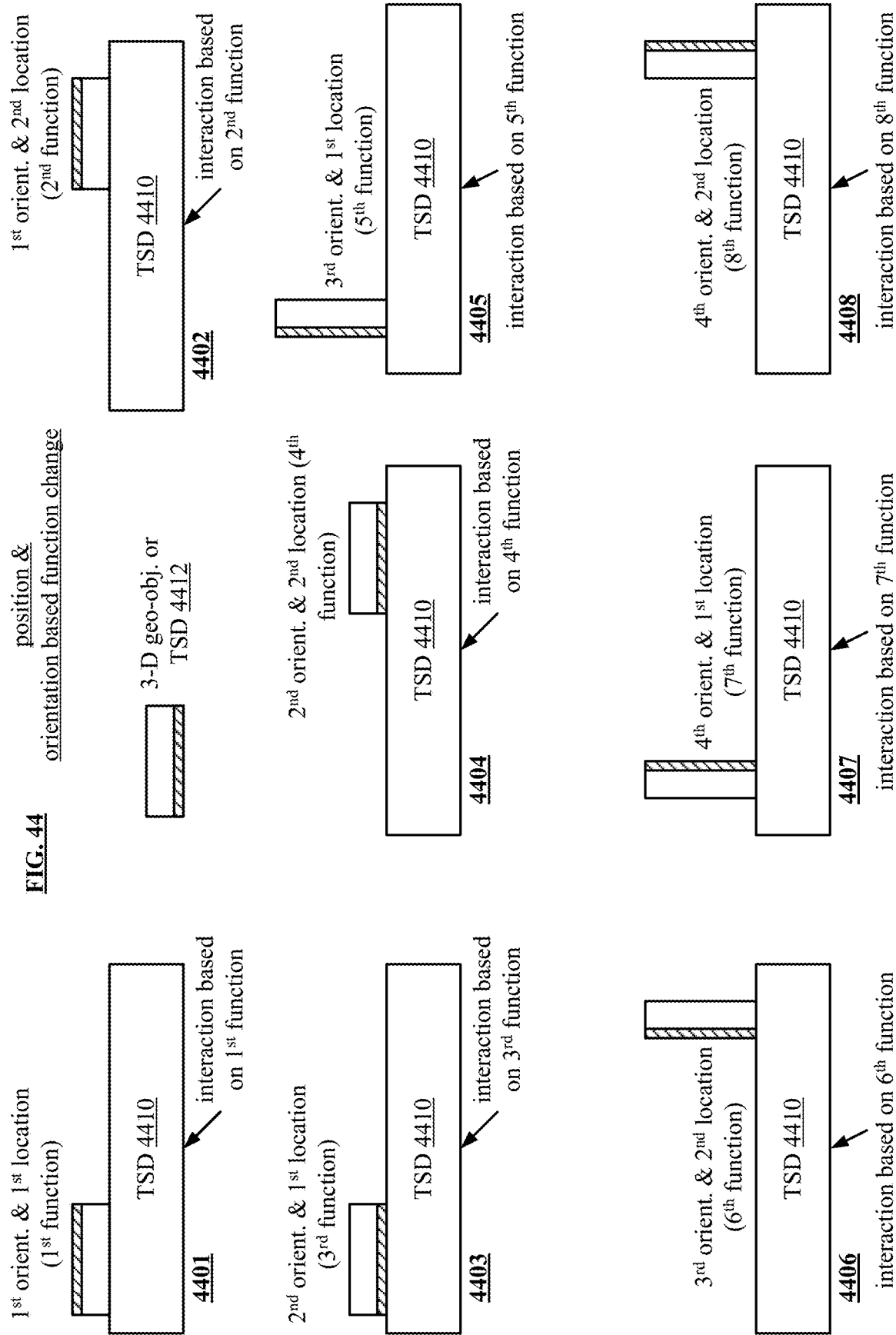
Figure 45:
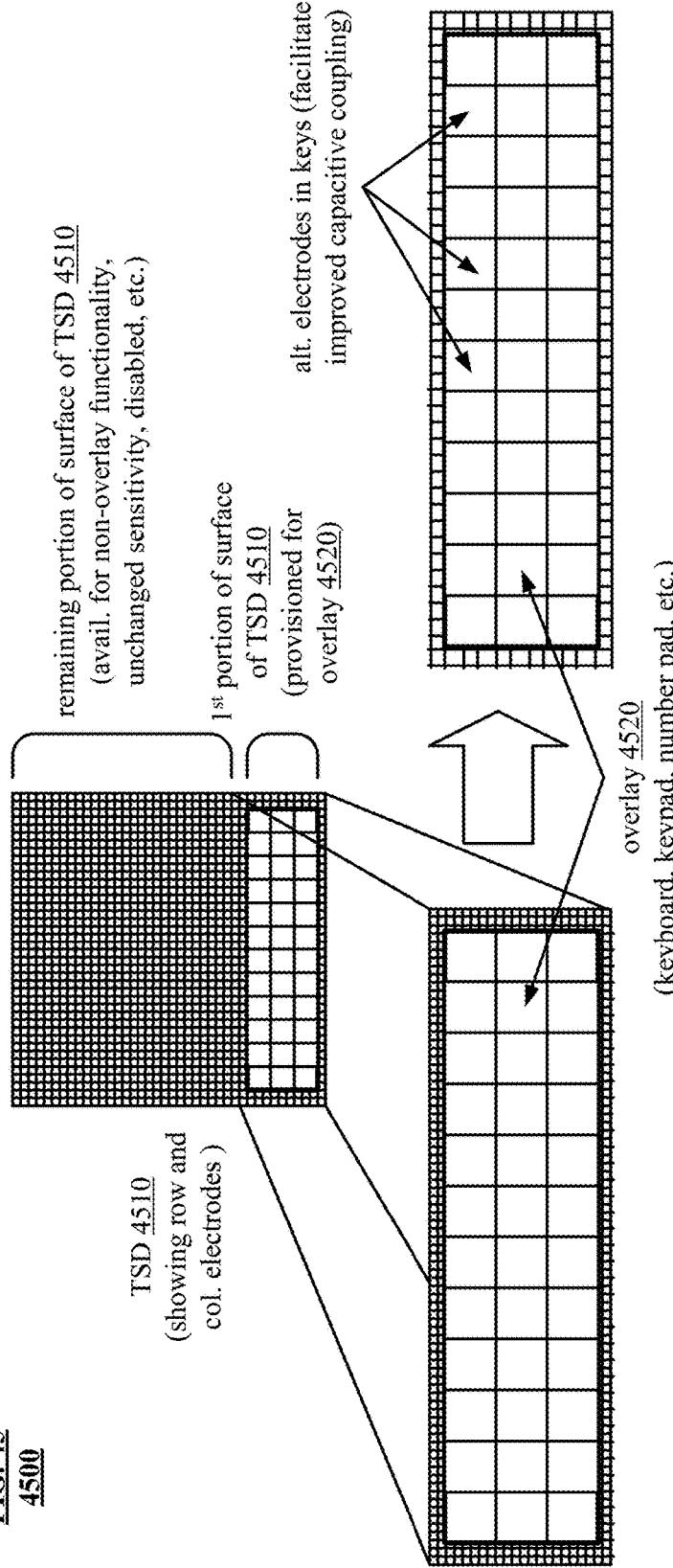
Figure 47:
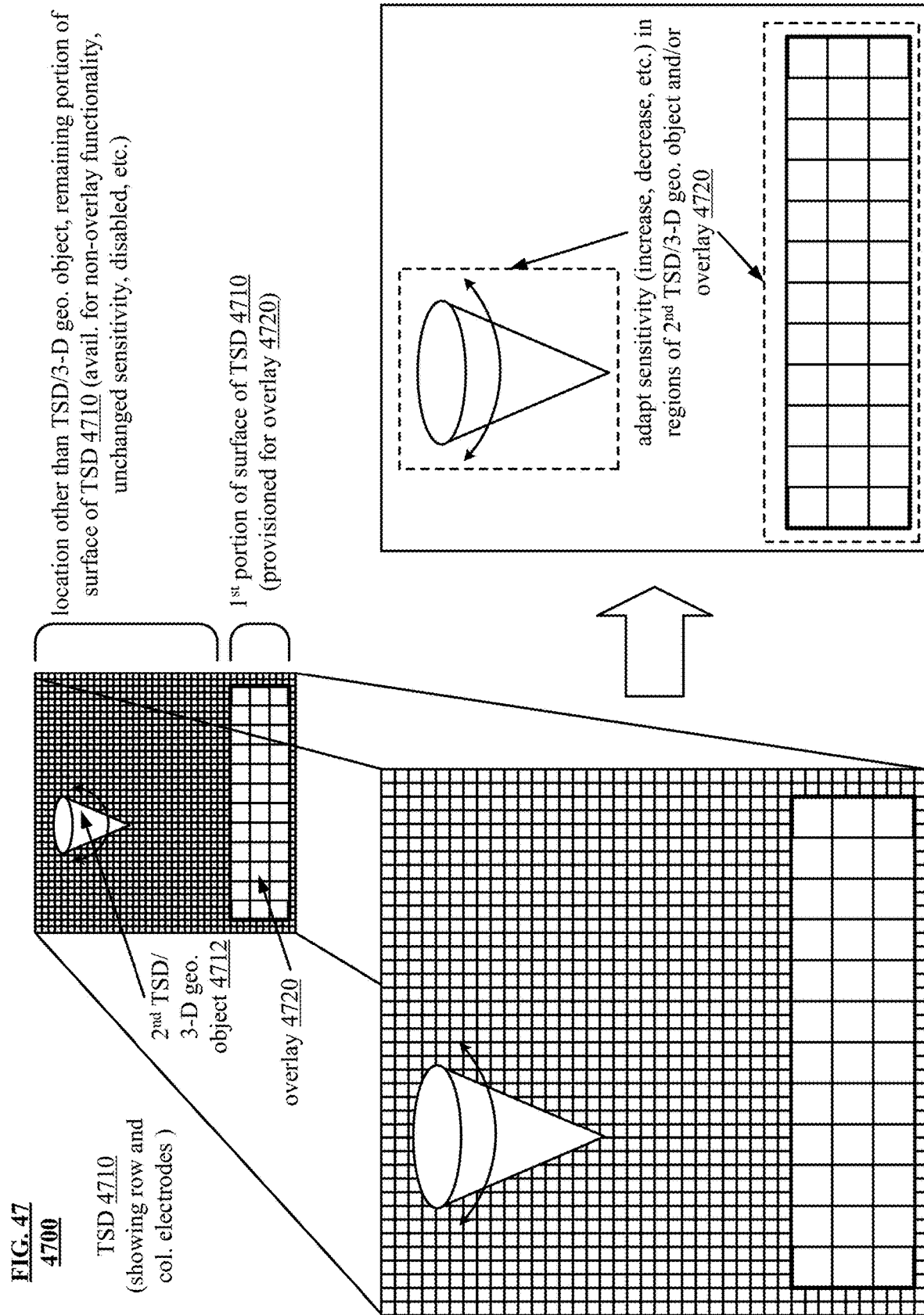
Figure 48:
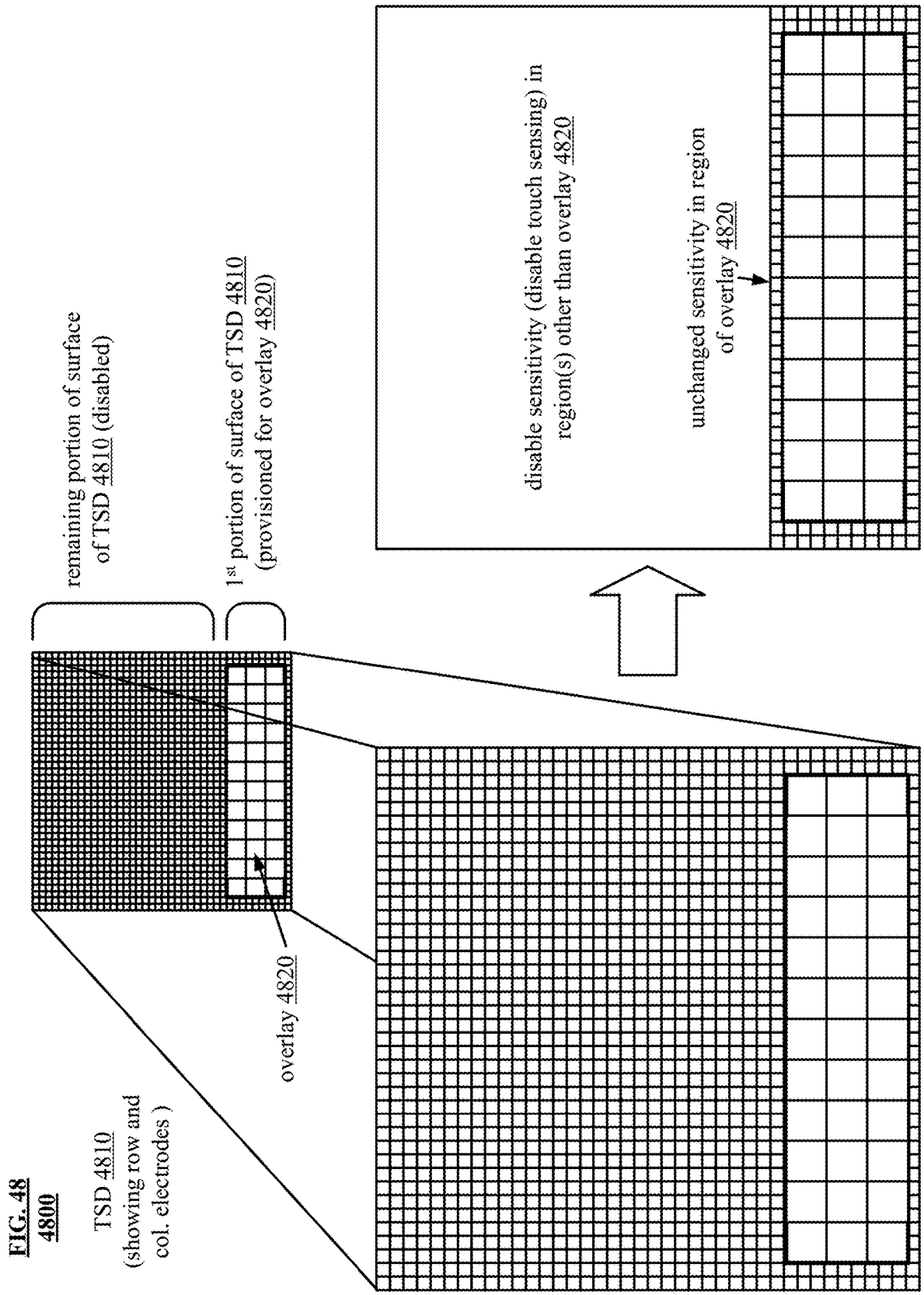
Figure 49:
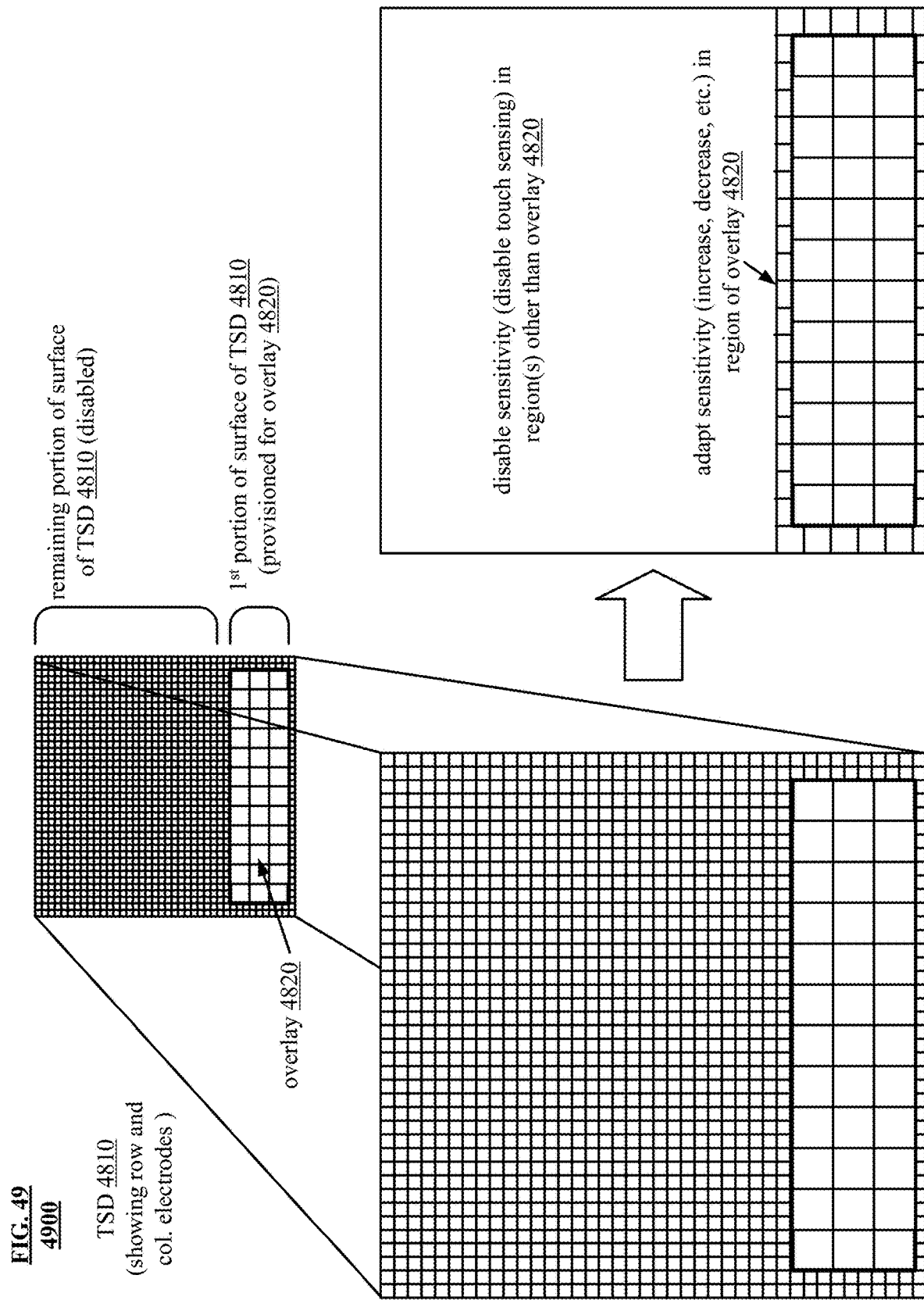
Figure 50:
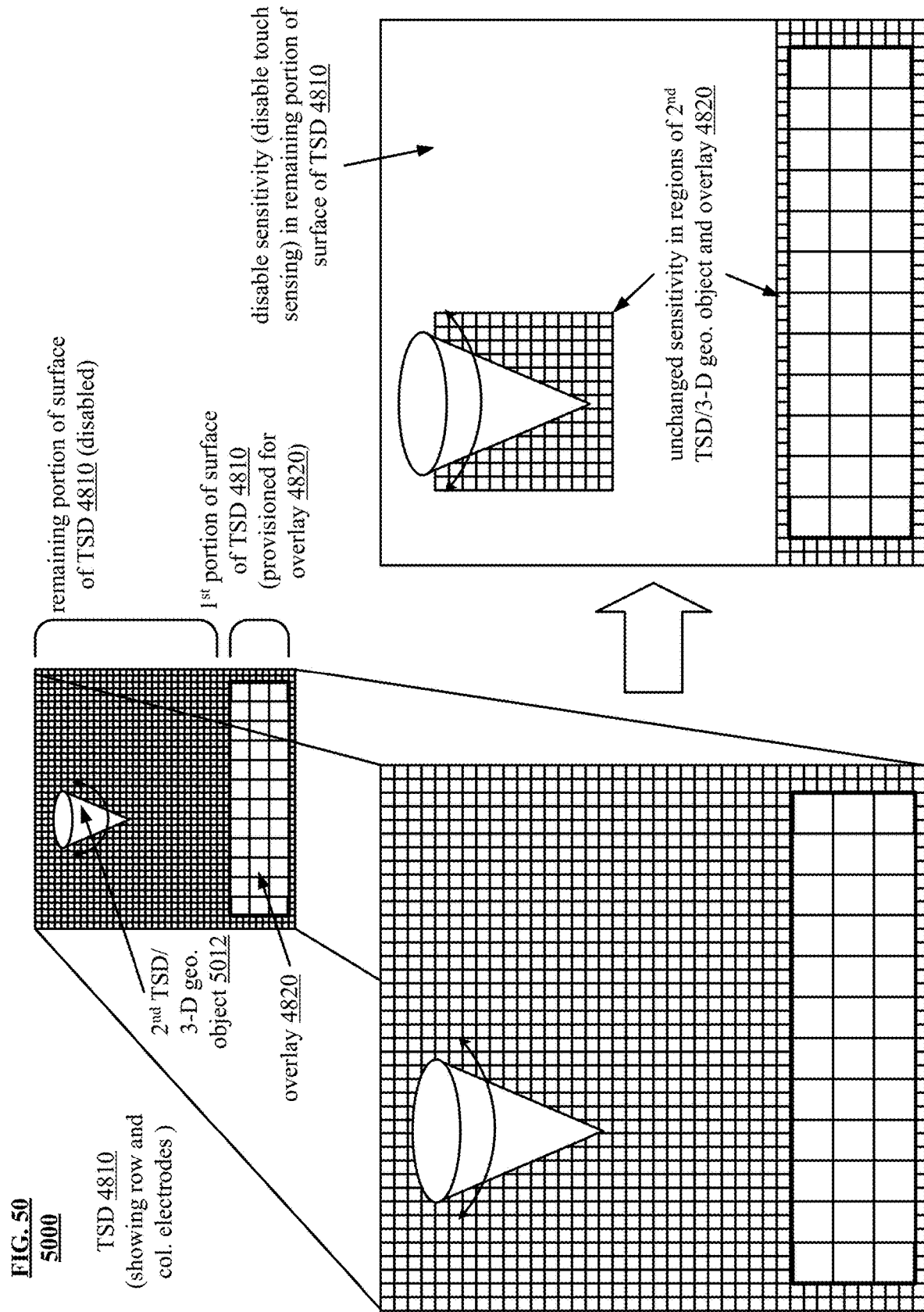
Figure 51:
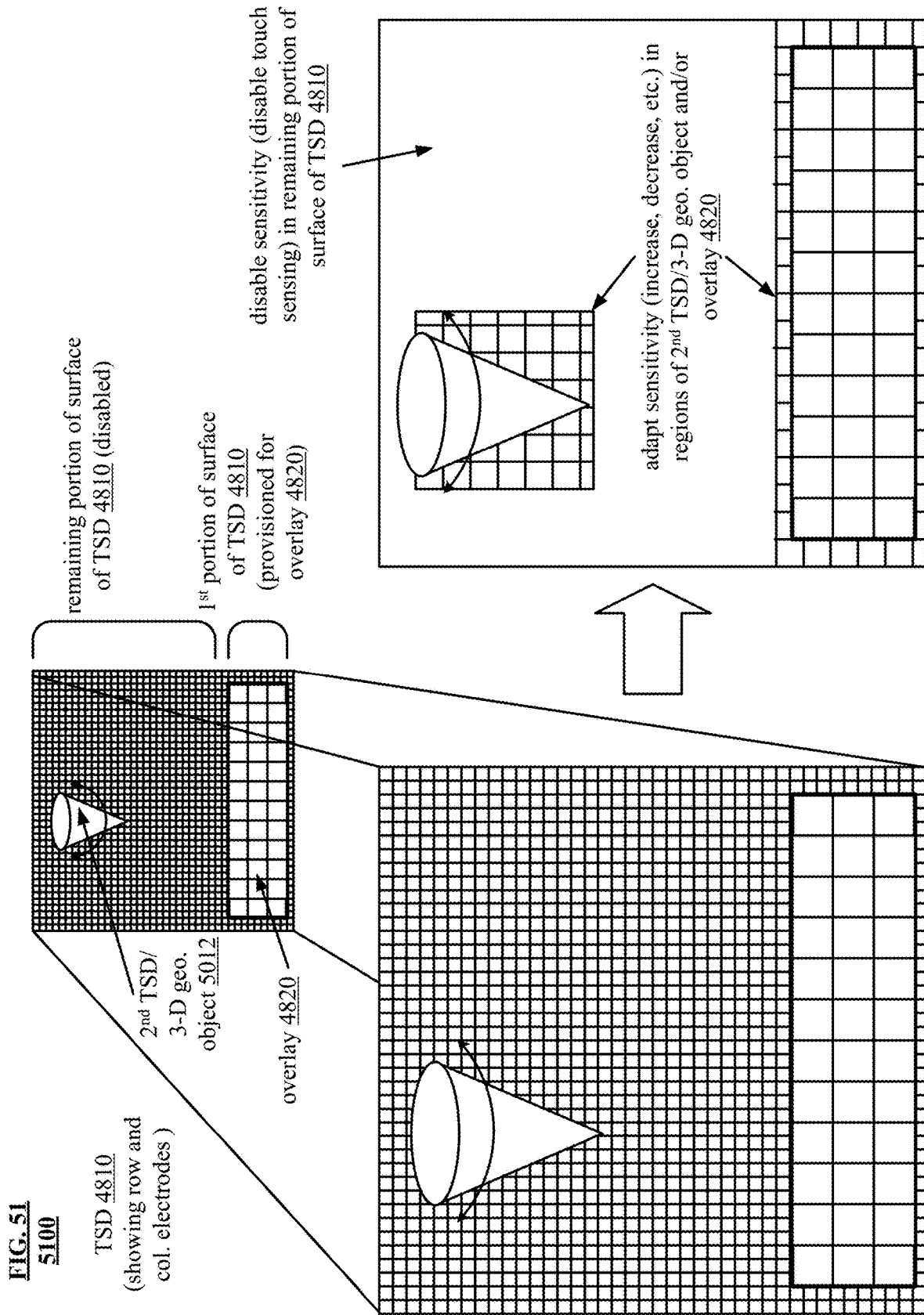
Figure 53A:
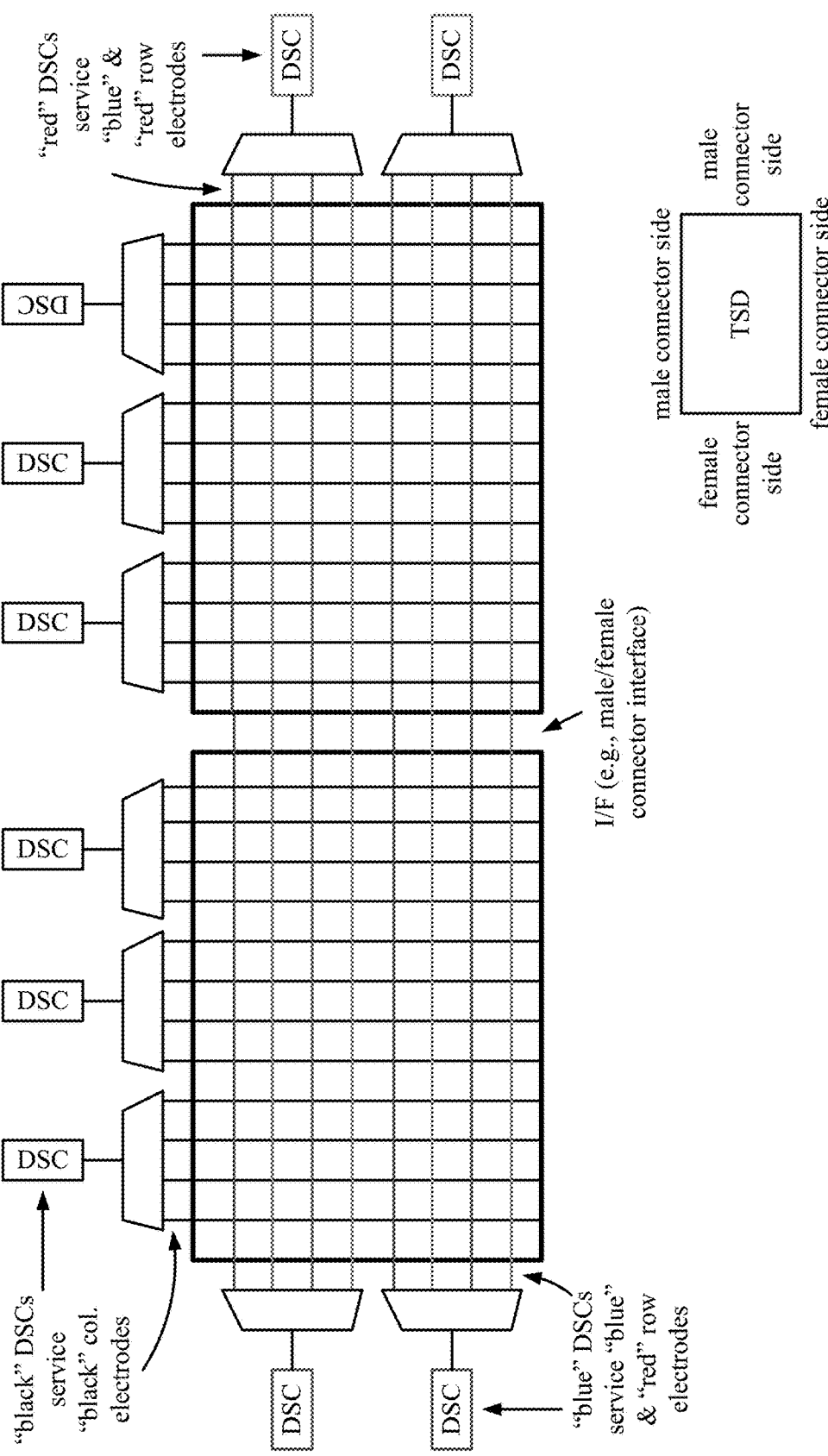
Figure 53B:
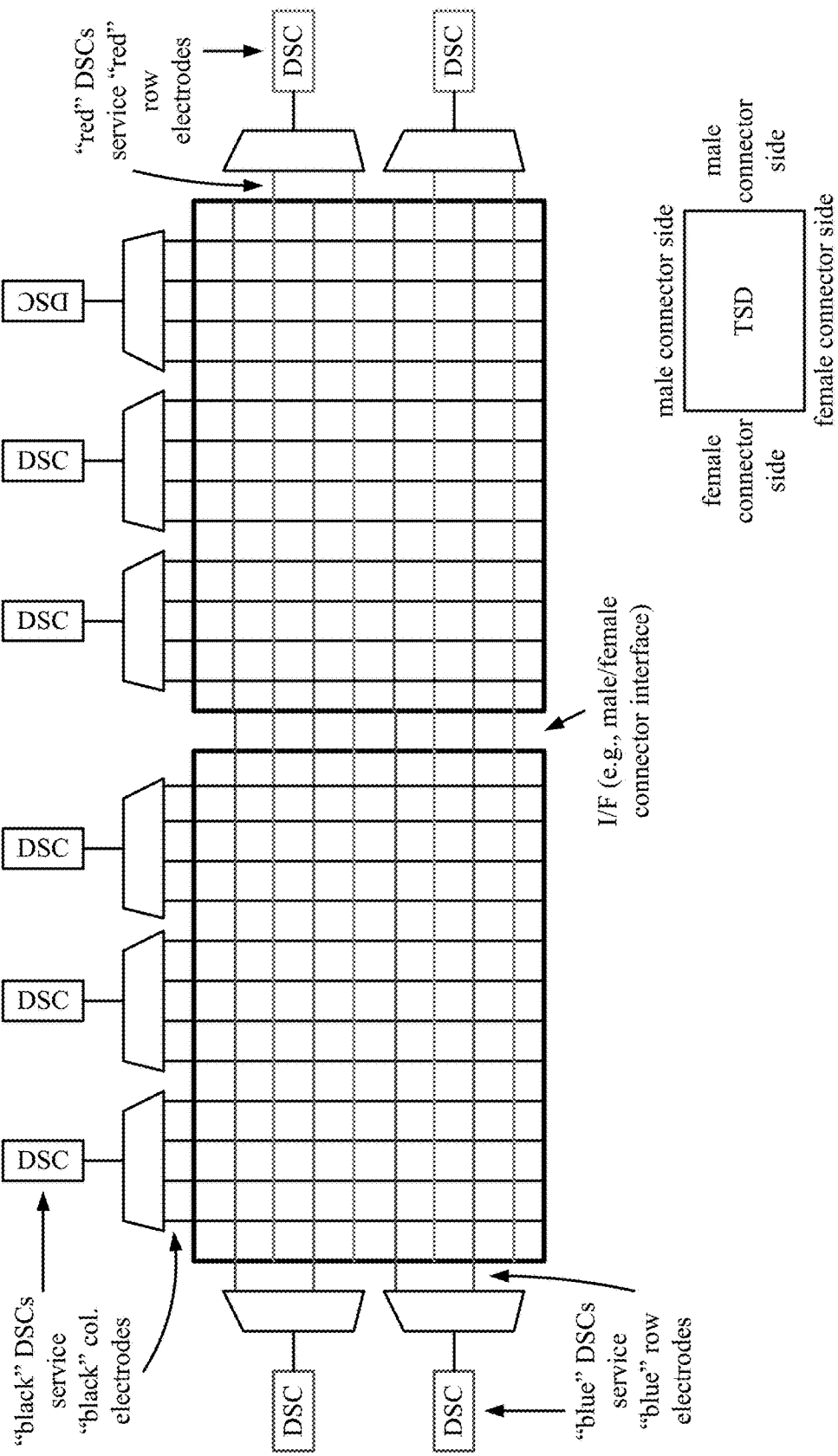
Figure 54A:
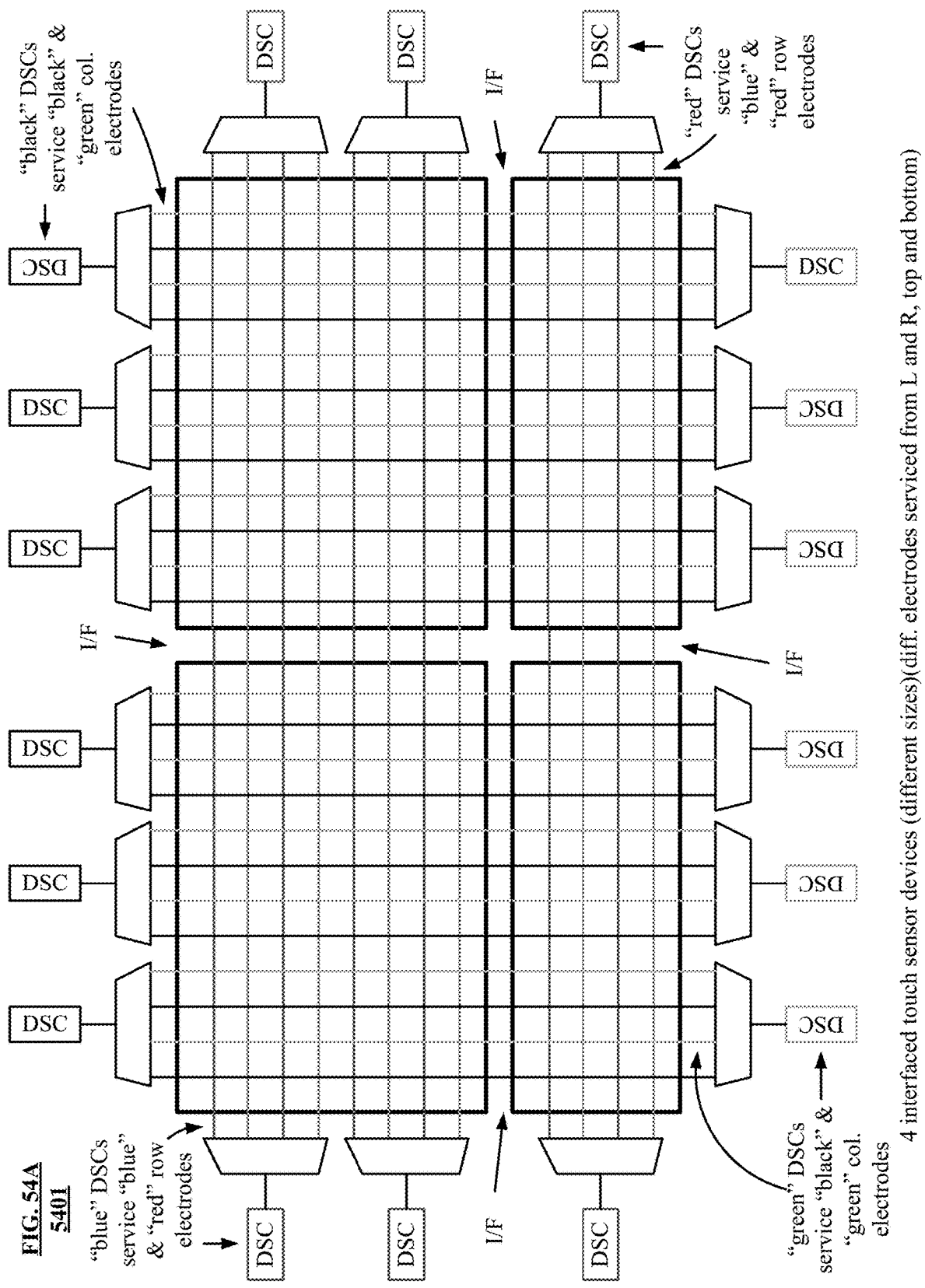
Figure 55:
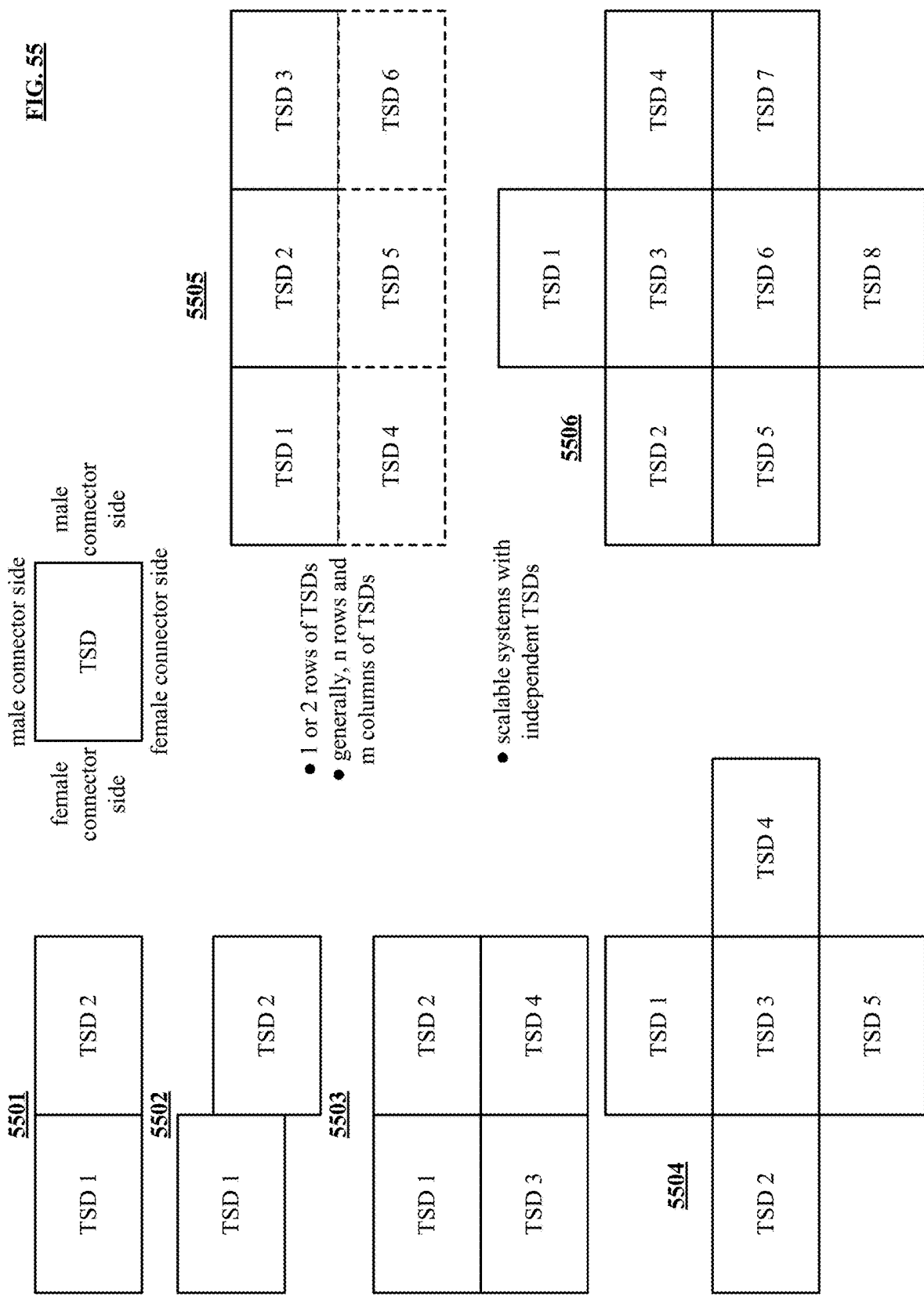
Figure 56:
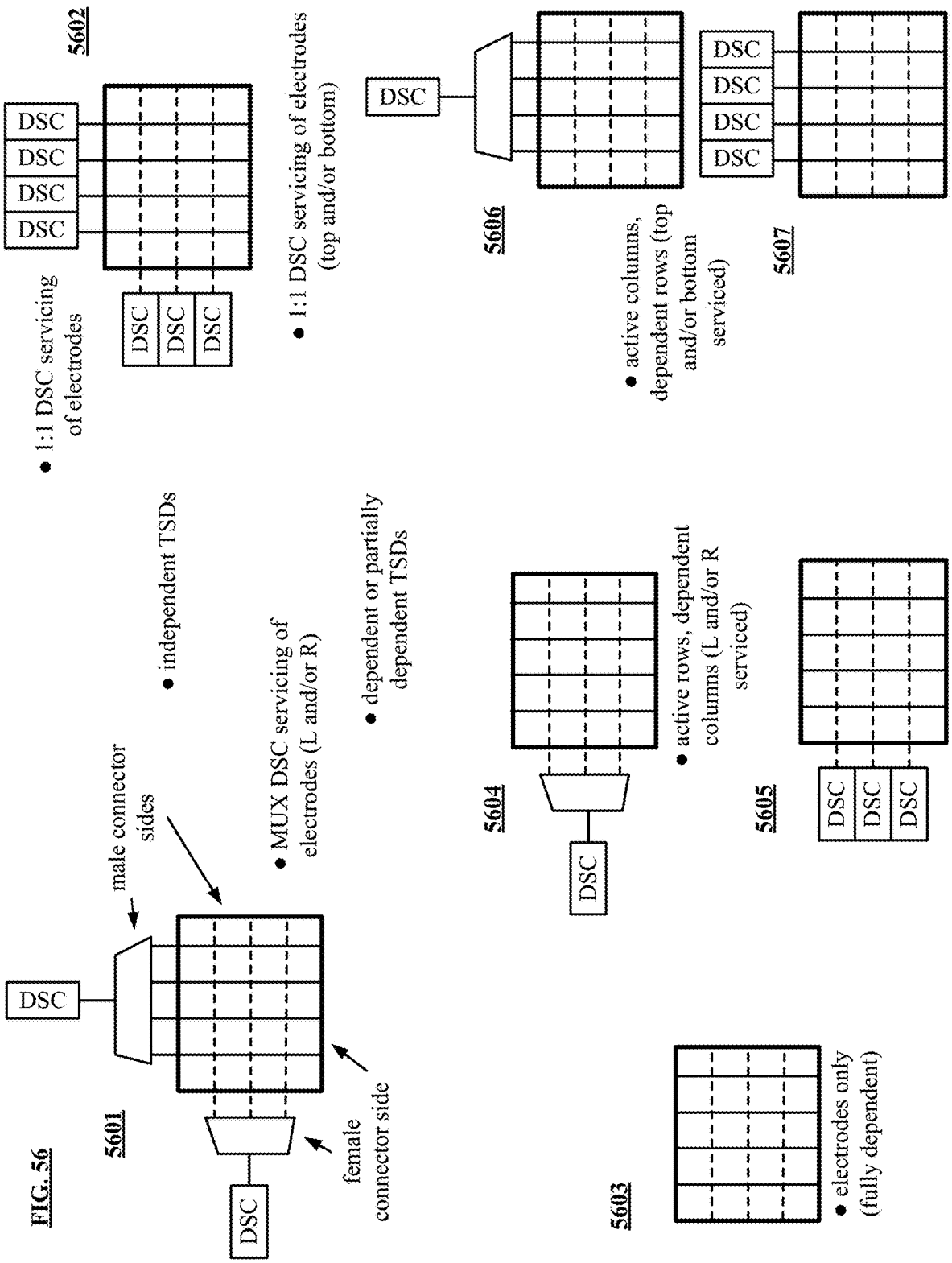

FIG. 28A is a schematic block diagram of other various embodiments of TSDs which may or may not include display functionality via a touchscreen display, an liquid crystal display (LCD) operable display, a light emitting diode (LED) operable display, and/or other visual output component, as well as 3-D geometric objects, which may or may not include TSD functionality, in accordance with the present invention;

FIG. 28B is a schematic block diagram of other various embodiments of TSDs which may or may not include display functionality via a touchscreen display, an liquid crystal display (LCD) operable display, a light emitting diode (LED) operable display, and/or other visual output component in accordance with the present invention;

FIG. 29 is a schematic block diagram of various embodiments of a 3-D geometric objects, which may or may not include TSD functionality, that is operative with a TSD in accordance with the present invention;

FIG. 30 is a schematic block diagram of an embodiment of an overlay that is operative with a TSD in accordance with the present invention;

FIG. 31 is a schematic block diagram of another embodiment of an overlay that is operative with a TSD in accordance with the present invention;

FIG. 32 is a schematic block diagram of an embodiment of an overlay and a 3-D geometric object, which may or may not include TSD functionality, that are both operative with a TSD in accordance with the present invention;

FIG. 33 is a schematic block diagram of various embodiments of overlays including marker electrodes that facilitate identification, location determination, and mapping of the overlays by a TSD in accordance with the present invention;

FIG. 34 is a schematic block diagram of various embodiments of 3-D geometric objects, which may or may not include TSD functionality, including marker electrodes that facilitate identification, location determination, and mapping of the overlays by a TSD in accordance with the present invention;

FIG. 35A is a schematic block diagram of other various embodiments of overlays including marker electrodes that facilitate identification, location determination, and mapping of the overlays by a TSD in accordance with the present invention;

FIG. 35B is a schematic block diagram of other various embodiments of overlays including marker electrodes that facilitate identification, location determination, and mapping of the overlays by a TSD in accordance with the present invention;

FIG. 36 is a schematic block diagram of various embodiments of TSDs including communication functionality, power sourcing, and/or controller functionality in accordance with the present invention;

FIG. 37A is a schematic block diagram of an embodiment of a communication system including a TSD in accordance with the present invention;

FIG. 37B is a schematic block diagram of another embodiment of a communication system including a TSD in accordance with the present invention;

FIG. 38 is a schematic block diagram of another embodiment of a communication system including a TSD in accordance with the present invention;

FIG. 39A is a schematic block diagram of another embodiment of a communication system including a TSD in accordance with the present invention;

FIG. 39B is a schematic block diagram of another embodiment of a communication system including a TSD in accordance with the present invention;

FIG. 40 is a schematic block diagram of various embodiments of TSDs that are configurable in accordance with the present invention;

FIG. 41 is a schematic block diagram of various embodiments of TSDs that are configurable and operative with TSDs in accordance with the present invention;

FIG. 42 is a schematic block diagram of other various embodiments of 3-D geometric objects or TSDs that are configurable and operative with TSDs in accordance with the present invention FIG. 43A is a schematic block diagram of other various embodiments of 3-D geometric objects or TSDs that are configurable and operative with TSDs in accordance with the present invention;

FIG. 43B is a schematic block diagram of other various embodiments of 3-D geometric objects or TSDs that are configurable and operative with TSDs in accordance with the present invention;

FIG. 44 is a schematic block diagram of other various embodiments of 3-D geometric objects or TSDs that are configurable and operative with TSDs in accordance with the present invention;

FIG. 45 is a schematic block diagram of an embodiment of an overlay that is operative with a TSD that is configured to perform sensitivity based region of interest processing (ROIP) in accordance with the present invention;

FIG. 46 is a schematic block diagram of another embodiment of an overlay that is operative with a TSD that is configured to perform sensitivity based ROIP in accordance with the present invention;

FIG. 47 is a schematic block diagram of an embodiment of an overlay and a 3-D geometric object, which may or may not include TSD functionality, that are both operative with a TSD that is configured to perform sensitivity based ROIP in accordance with the present invention;

FIG. 48 is a schematic block diagram of an embodiment of an overlay that is operative with a TSD that is configured to perform enable/disable based ROIP in accordance with the present invention;

FIG. 49 is a schematic block diagram of another embodiment of an overlay that is operative with a TSD that is configured to perform enable/disable based ROIP in accordance with the present invention;

FIG. 50 is a schematic block diagram of an embodiment of an overlay and a 3-D geometric object, which may or may not include TSD functionality, that are both operative with a TSD that is configured to perform enable/disable based ROIP in accordance with the present invention;

FIG. 51 is a schematic block diagram of another embodiment of an overlay and a 3-D geometric object, which may or may not include TSD functionality, that are both operative with a TSD that is configured to perform enable/disable based ROIP in accordance with the present invention;

FIG. 52 is a schematic block diagram of various embodiments of TSDs that are configured to interface with one or more other TSD and/or one or more other devices that include one or more electrodes in accordance with the present invention;

FIG. 53A is a schematic block diagram of an embodiment of TSDs that are interfaced in accordance with the present invention;

FIG. 53B is a schematic block diagram of an embodiment of TSDs that are interfaced in accordance with the present invention;

FIG. 54A is a schematic block diagram of another embodiment of TSDs that are interfaced in accordance with the present invention;

FIG. 54B is a schematic block diagram of another embodiment of TSDs that are interfaced in accordance with the present invention;

FIG. 55 is a schematic block diagram of various embodiments of TSDs that are interfaced in accordance with the present invention;

FIG. 56 is a schematic block diagram of other various embodiments of TSDs that are configured to interface with one or more other TSD and/or one or more other devices that include one or more electrodes in accordance with the present invention; and FIG. 57 is a schematic block diagram of various embodiments of TSDs and/or one or more other devices that include one or more electrodes that are interfaced in accordance with the present invention.

DETAILED DESCRIPTION OF THE INVENTION

Figure 1:
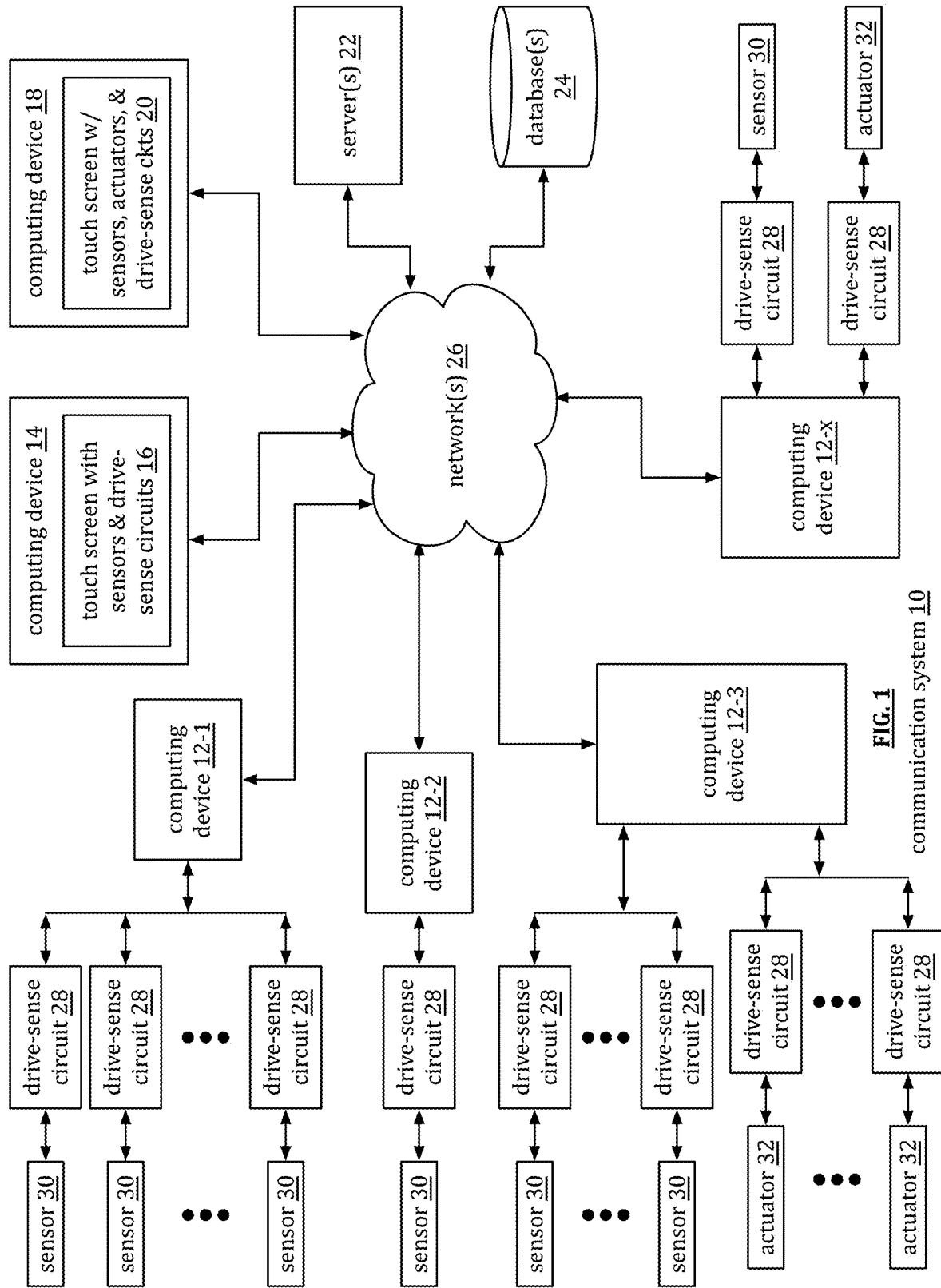
FIG. 1 is a schematic block diagram of an embodiment of a communication system in accordance with the present invention.

FIG. 1 is a schematic block diagram of an embodiment of a communication system 10 that includes a plurality of computing devices 12-10, one or more servers 22, one or more databases 24, one or more networks 26, a plurality of drive-sense circuits 28, a plurality of sensors 30, and a plurality of actuators 32. Computing devices 14 include a touchscreen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
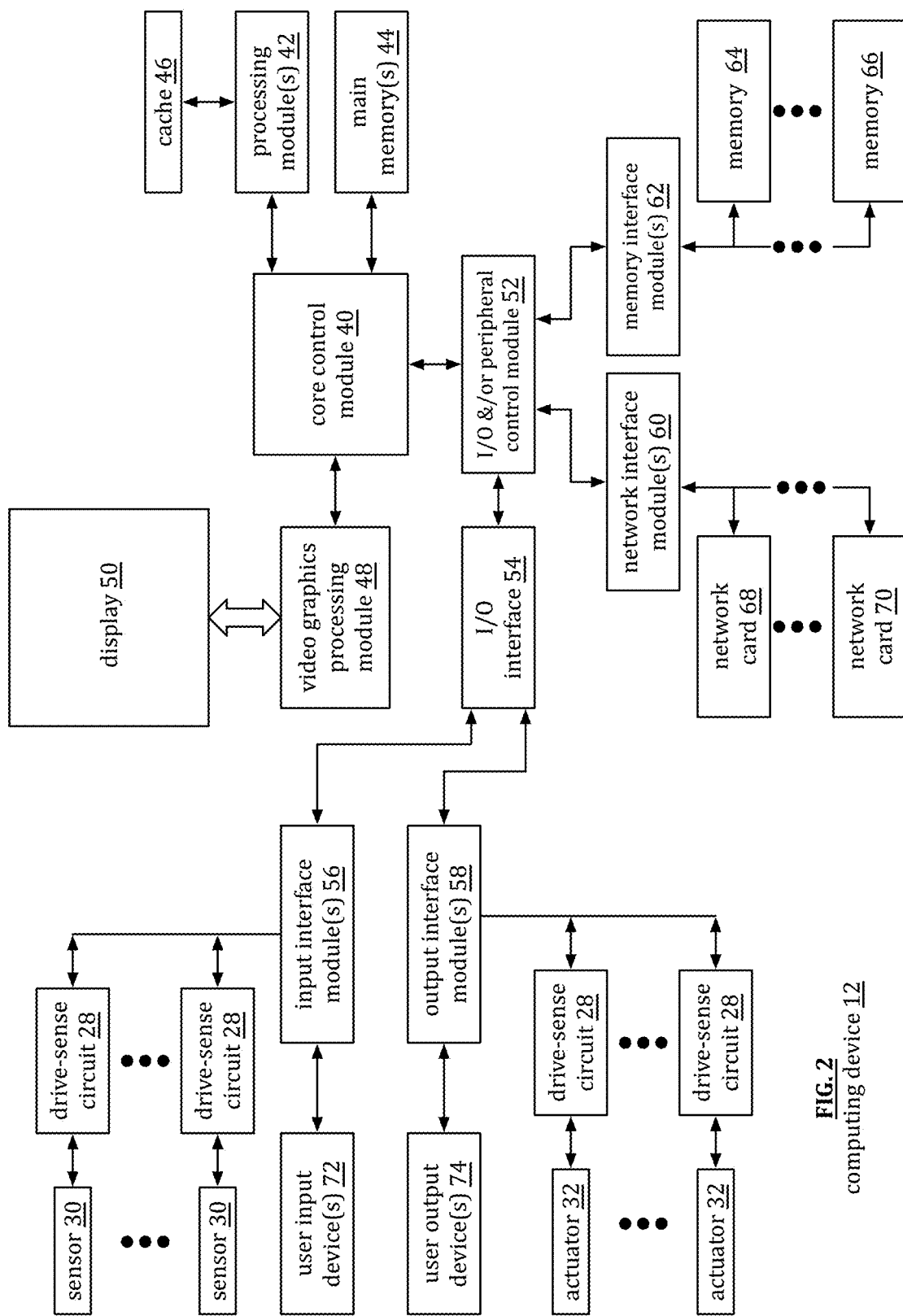
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
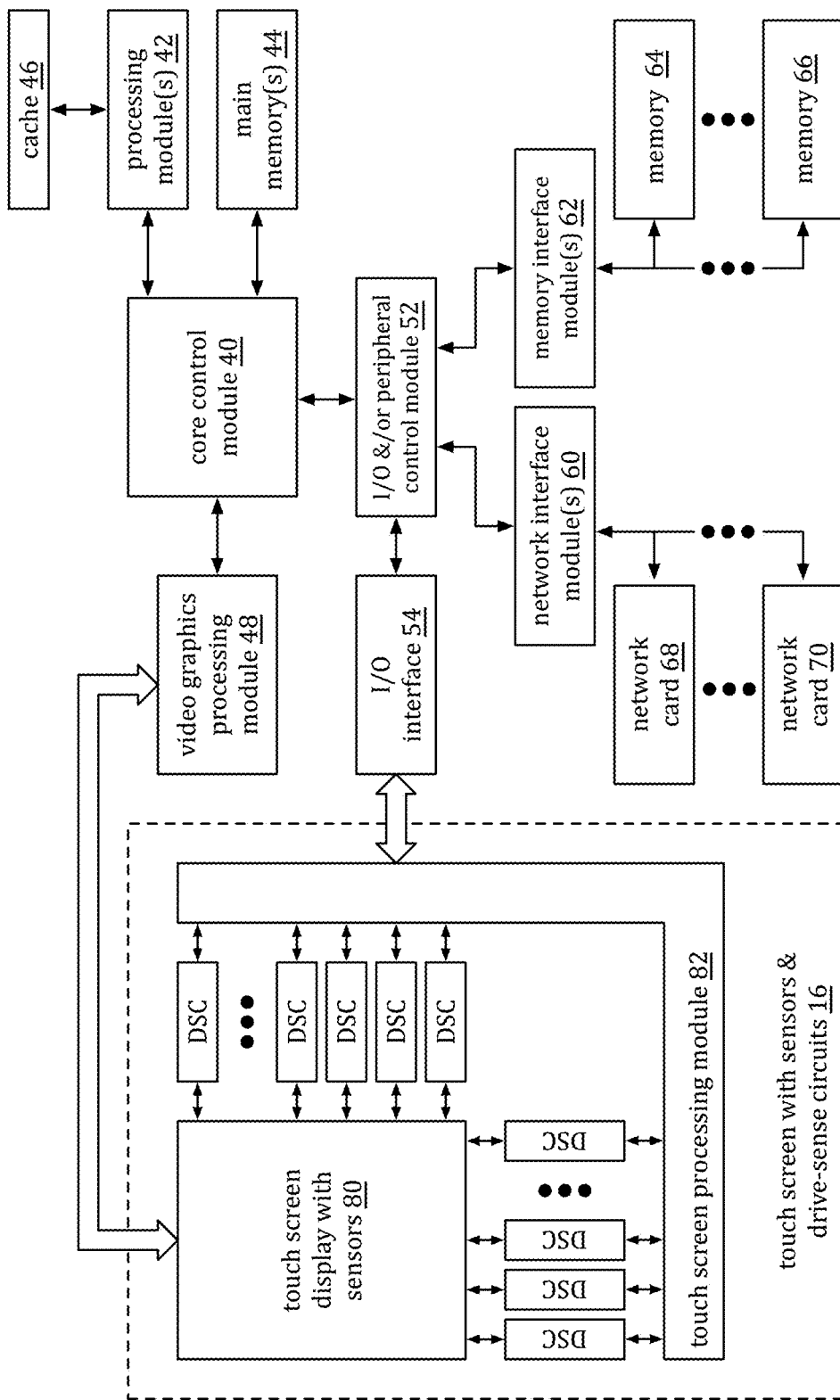
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touchscreen 16, an Input-Output (I/O) peripheral control module 52, one or more input interface modules 56, one or more output interface modules 58, one or more network interface modules 60, and one or more memory interface modules 62. The touchscreen 16 includes a touchscreen display 80, a plurality of sensors 30, a plurality of drive-sense circuits (DSC), and a touchscreen processing module 82.

Computing device 14 operates similarly to computing device 12 of FIG. 2 with the addition of a touchscreen as an input device. The touchscreen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
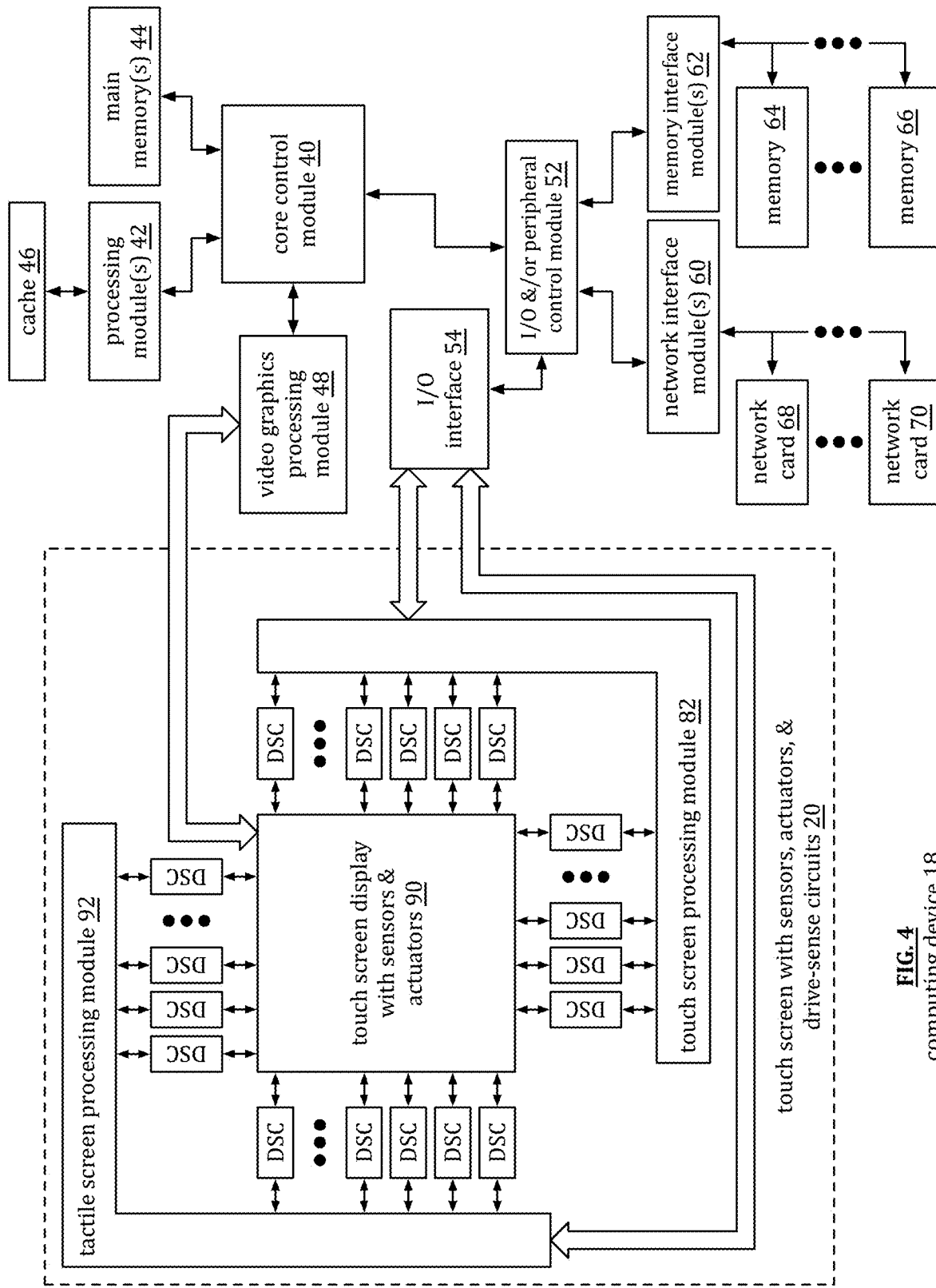
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touchscreen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

Figure 5B:
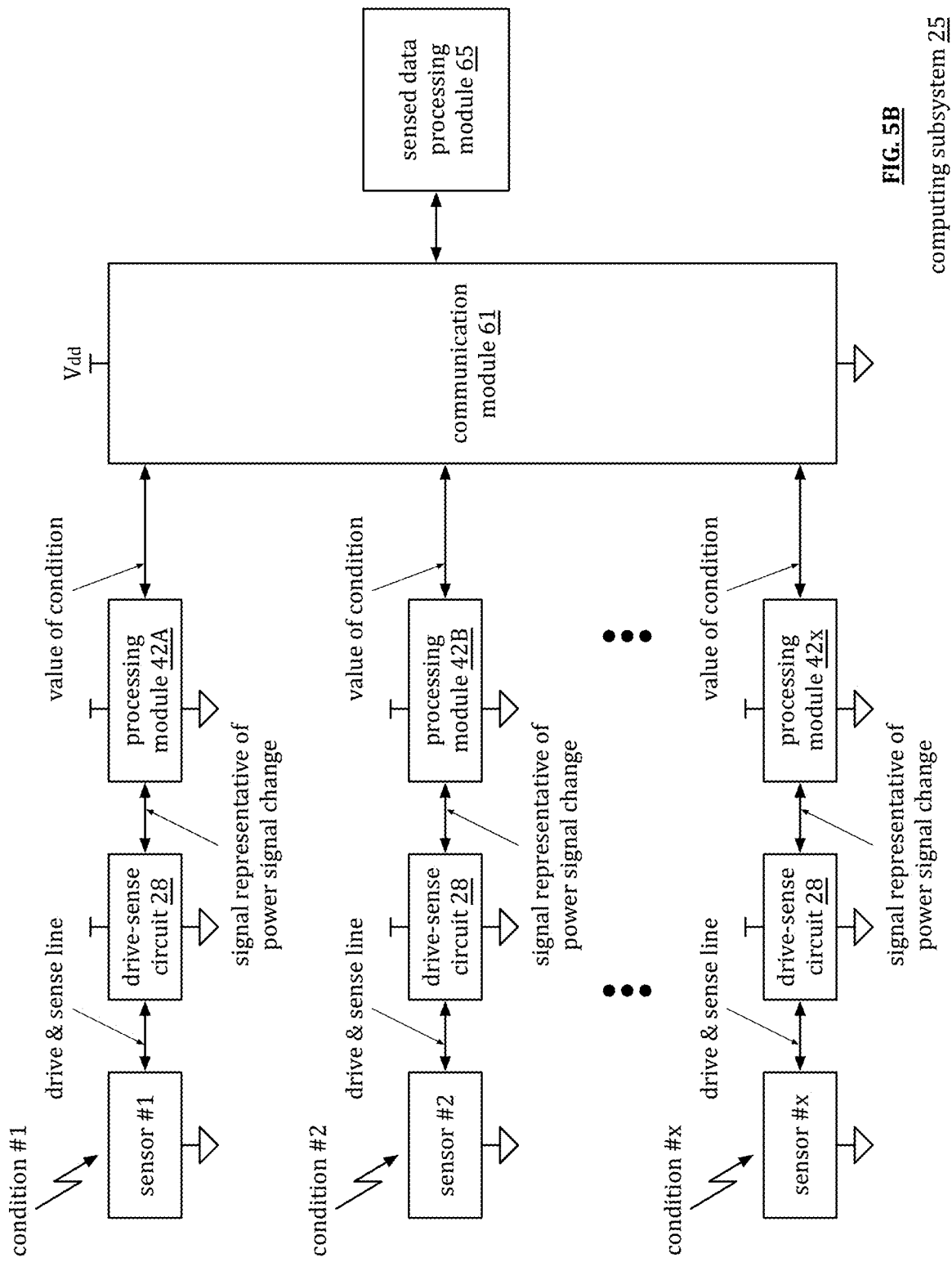
FIG. 5B is a schematic block diagram of another embodiment of a computing subsystem in accordance with the present invention.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
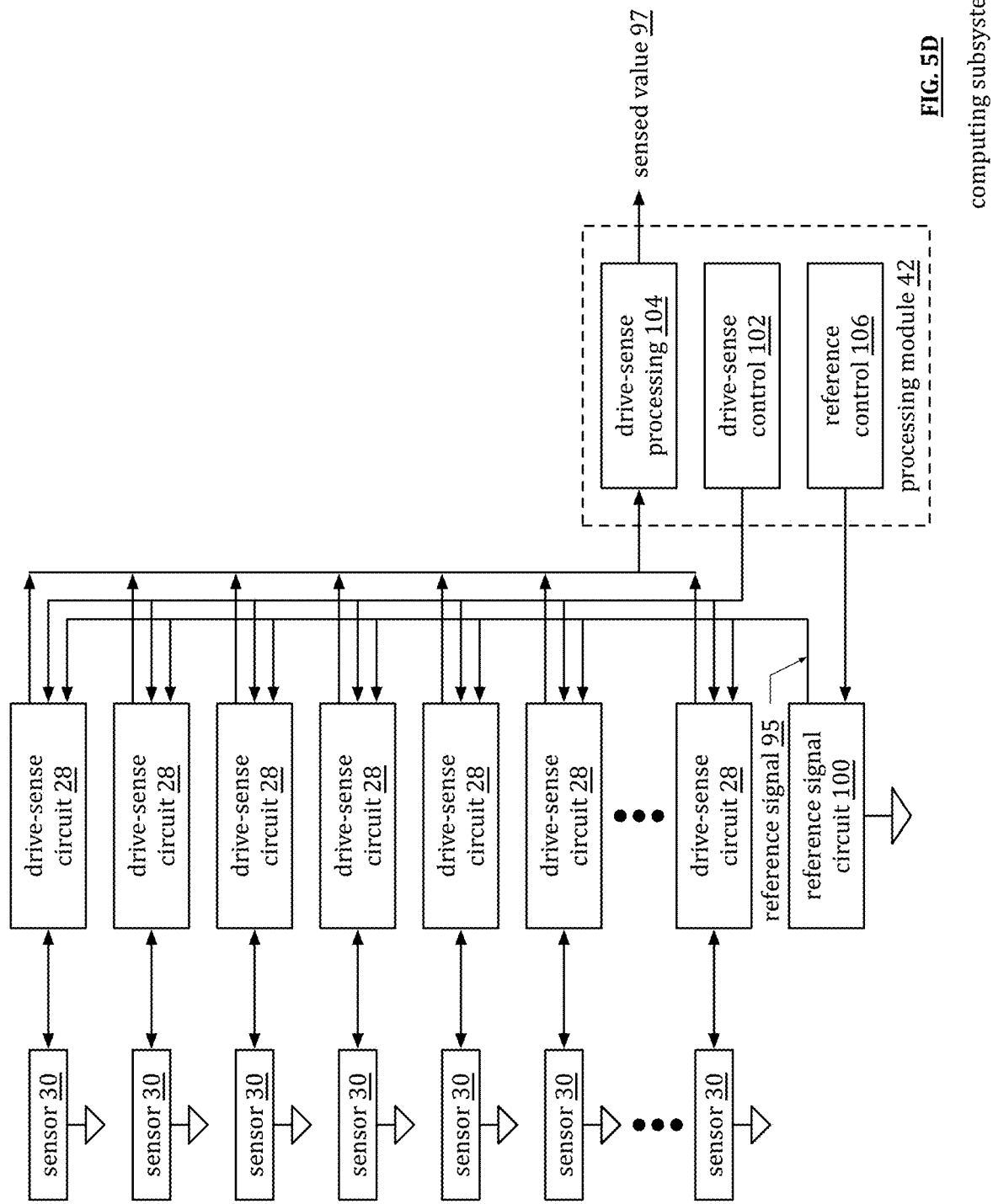
FIG. 5D is a schematic block diagram of another embodiment of a computing subsystem in accordance with the present invention.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
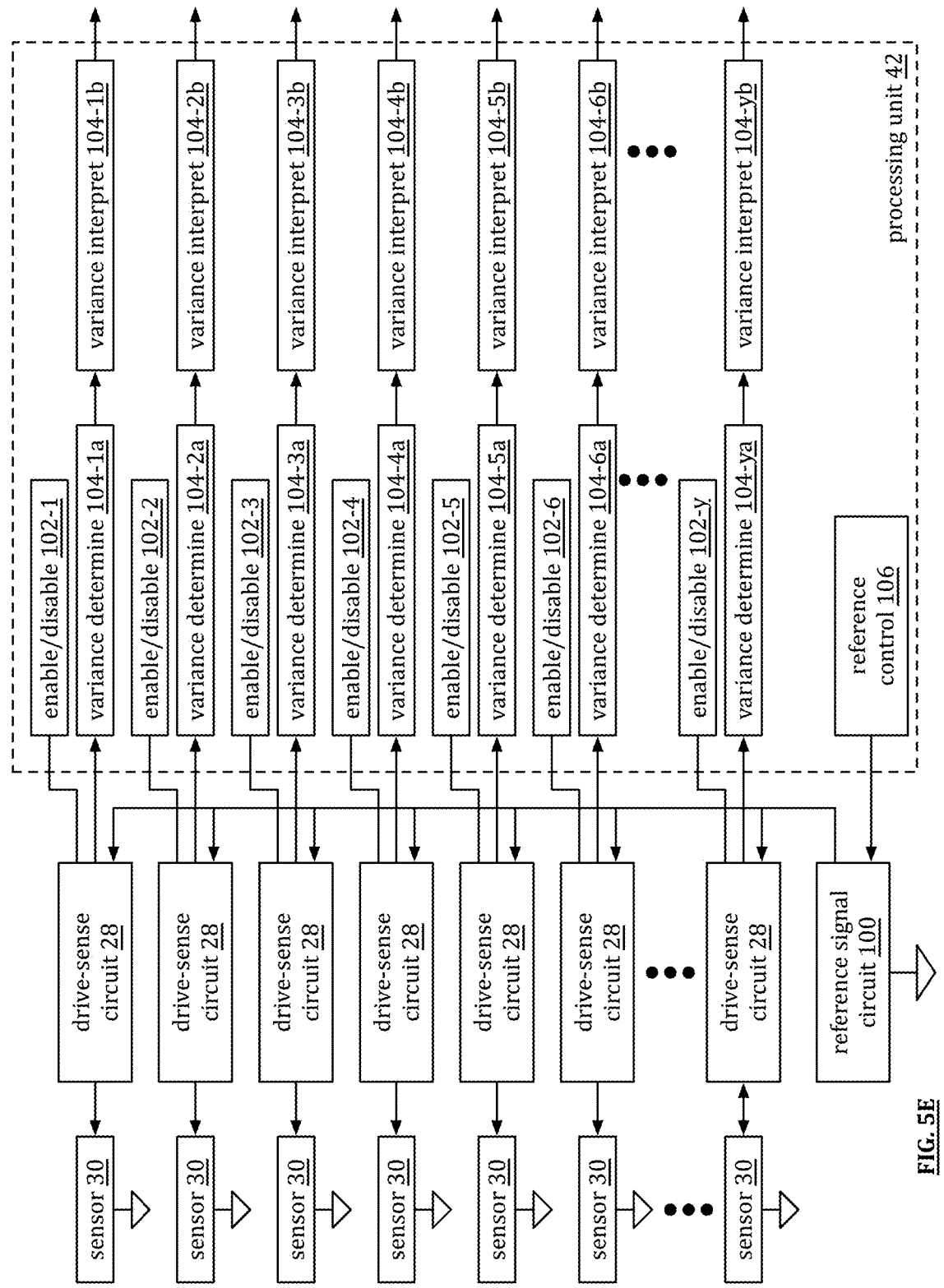
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1*b* interprets the difference to determine a specific value for the sensed physical condition.

As a specific example, the variance determining module 104-1*a* receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-*b*1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-*b*1 then determines the sensed value based on the difference and the known value. In this example, the sensed value equals 25+86*(100/256)=25+33.6=58.6 degrees Celsius.

FIG. 6 is a schematic block diagram of a drive center circuit 28-*a* coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-*a*1 coupled to a sensor 30. The drive sense-sense circuit 28-*a*1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases.

As an example of a second type, a capacitance touch sensor decreases in capacitance as a touch is sensed.

Figure 9:
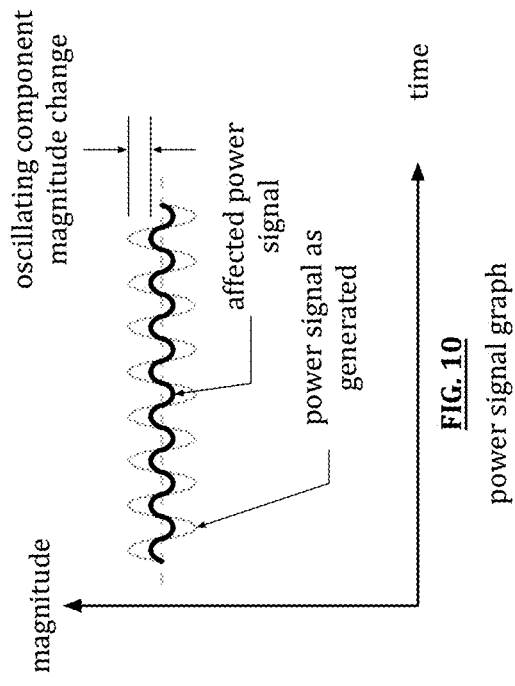
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
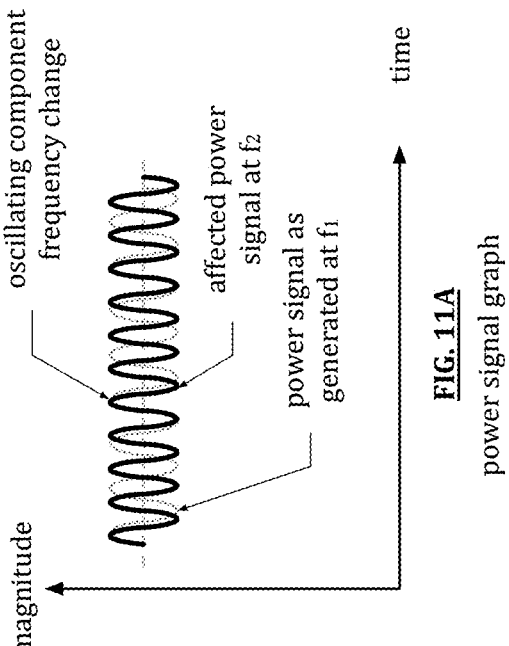
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11:
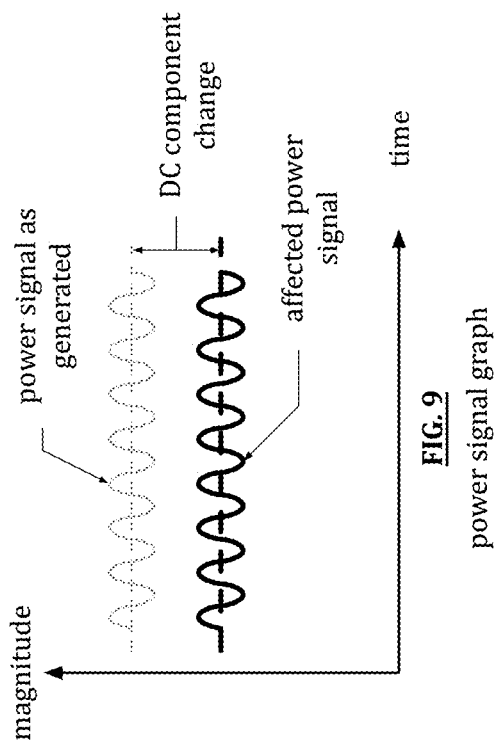
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

Figure 11A:
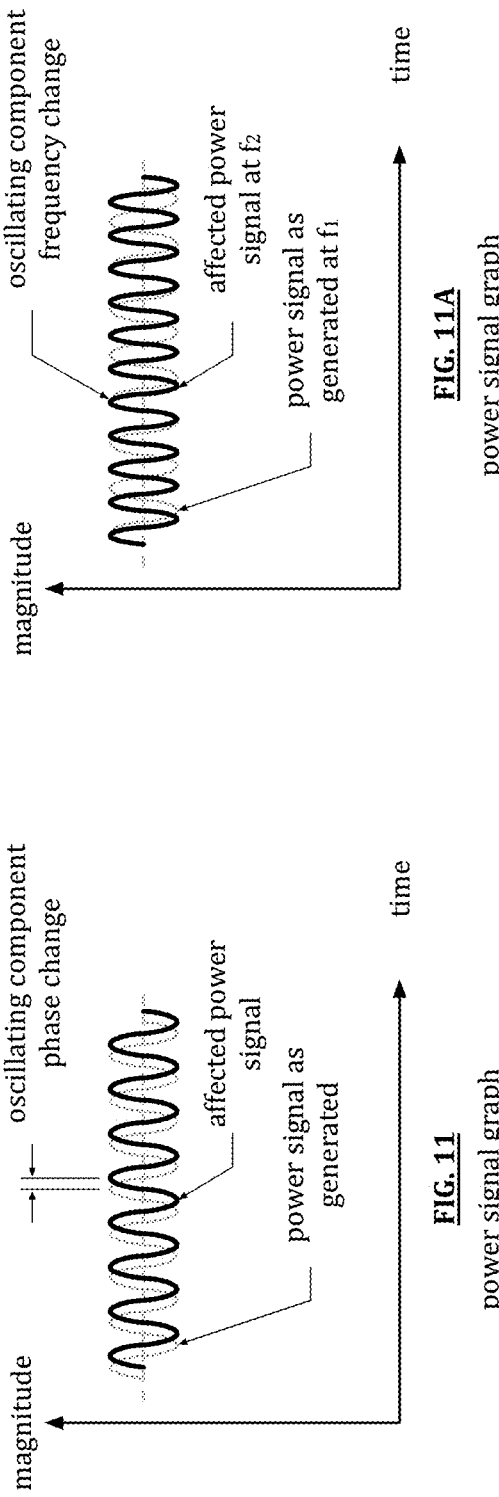
FIG. 11A is a schematic block diagram of another example of a power signal graph in accordance with the present invention.

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

FIG. 13 is a schematic block diagram of another embodiment of a drive sense circuit 28-*b* includes a change detection circuit 150, a regulation circuit 152, and a power source circuit 154. The drive-sense circuit 28-*b* is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE,", filed Aug. 27, 2018, pending. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, trellis coded modulation (TCM), turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, battery, load, electrical coupling or connection, etc.

Note that the different respective signals that are driven and simultaneously sensed by one or more DSCs may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113,379, etc. and/or their equivalents.

Note that certain of the following diagrams show a computing device (e.g., alternatively referred to as device; the terms computing device and device may be used interchangeably) that may include or be coupled to one or more processing modules. In certain instances, the one or more processing modules is configured to communicate with and interact with one or more other devices including one or more of DSCs, one or more components associated with a DSC, one or more components associated with a display, a touch sensor device that may or may not include display functionality (e.g., a touchscreen display with sensors, a panel without display functionality that includes one or more sensors, etc., one or more other components associated with a display, a touchscreen display with sensors, or generally a touch sensor device that may or may not include display functionality, etc.) Note that any such implementation of one or more processing modules may include integrated memory and/or be coupled to other memory. At least some of the memory stores operational instructions to be executed by the one or more processing modules. In addition, note that the one or more processing modules may interface with one or more other computing devices, components, elements, etc. via one or more communication links, networks, communication pathways, channels, etc. (e.g., such as via one or more communication interfaces of the computing device, such as may be integrated into the one or more processing modules or be implemented as a separate component, circuitry, etc.).

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

In addition, while many examples, embodiments, diagrams, etc. herein include one or more DSCs (e.g., coupled to one or more processing modules and one or more electrodes), note that any instantiation of a DSC may alternatively be implemented using a channel drive circuitry, an Analog Front End (AFE) that includes analog to digital and/or digital to analog conversion capability, etc. within alternative embodiments.

FIG. 14 is a schematic block diagram of an embodiment 1400 of a touch sensor device (TSD) in accordance with the present invention. This diagram includes a schematic block diagram of an embodiment of a TSD 1410 that is implemented to include a touchscreen display with sensors 80 that also includes a plurality of drive-sense circuits (DSCs), a touchscreen processing module 82, a display 83, and a plurality of electrodes 85 (e.g., the electrodes operate as the sensors or sensor components into which touch and/or proximity may be detected in the touchscreen display with sensors 80). The touchscreen display with sensors 80 is coupled to a processing module 42, a video graphics processing module 48, and a display interface 93, which are components of a computing device (e.g., one or more of computing devices 14-18), an interactive display, or other device that includes a touchscreen display. An interactive display functions to provide users with an interactive experience (e.g., touch the screen to obtain information, be entertained, etc.). For example, a store provides interactive displays for customers to find certain products, to obtain coupons, to enter contests, etc.

In some examples, note that display functionality and touchscreen functionality are both provided by a combined device that may be referred to as a touchscreen display with sensors 80. However, in other examples, note that touchscreen functionality and display functionality are provided by separate devices, namely, the display 83 and a touchscreen that is implemented separately from the display 83. Generally speaking, different implementations may include display functionality and touchscreen functionality within a combined device such as a touchscreen display with sensors 80, or separately using a display 83 and a touchscreen.

There are a variety of other devices that may be implemented to include a touchscreen display. For example, a vending machine includes a touchscreen display to select and/or pay for an item. Another example of a device having a touchscreen display is an Automated Teller Machine (ATM). As yet another example, an automobile includes a touchscreen display for entertainment media control, navigation, climate control, etc.

The touchscreen display with sensors 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list. Other screen sizes, resolutions, aspect ratios, etc. may be implemented within other various displays.

| Resolution | Width (lines) | Height (lines) | pixel aspect ratio | screen aspect ratio | screen size (inches) |
| --- | --- | --- | --- | --- | --- |
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touchscreen display. The electrodes 85 are distributed throughout the display area or where touchscreen functionality is desired. For example, a first group of the electrodes are arranged in rows and a second group of electrodes are arranged in columns. As will be discussed in greater detail with reference to one or more of FIGS. 18, 19, 20, and 21, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

In certain examples, one or more images are displayed so as to facilitate communication of data from a first computing device to a second computing device via a user. For example, one or more images are displayed on the touchscreen display with sensors 80, and when a user is in contact with the one or more images that are displayed on the touchscreen display with sensors 80, one or more signals that are associated with the one or more images are coupled via the user to another computing device. In some examples, the touchscreen display with sensors 80 is implemented within a portable device, such as a cell phone, a smart phone, a tablet, and/or any other such device that includes a touching display with sensors 80. Also, in some examples, note that the computing device that is displaying one or more images that are coupled via the user to another computing device does not include a touchscreen display with sensors 80, but merely a display that is implemented to display one or more images. In accordance with operation of the display, whether implemented as it display alone for a touchscreen display with sensors, as the one or more images are displayed, and when the user is in contact with the display (e.g., such as touching the one or more images with a digit of a hand, such as found, fingers, etc.) or is was within sufficient proximity to facilitate coupling of one or more signals that are associated with a lot of images, then the signals are coupled via the user to another computing device.

When the display 83 is implemented as a touchscreen display with sensors 80, while the display 83 is rendering the frames of video into visible images, the drive-sense circuits (DSC) provide sensor signals to the electrodes 85. When the touchscreen (e.g., which may alternatively be referred to as screen) is touched, capacitance of the electrodes 85 proximal to the touch (i.e., directly or close by) is changed. The DSCs detect the capacitance change for affected electrodes and provide the detected change to the touchscreen processing module 82.

The touchscreen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

In addition, note that certain implementations of TSDs may be made to include many more row electrodes and many more column electrodes than shown in this diagram as well as others included herein. In certain examples, a TSD includes tens, hundreds, thousands, etc. or an even larger number of row electrodes and/or tens, hundreds, thousands, etc. or an even larger number of column electrodes. In general, a TSD may be implemented to include one or more electrodes. In certain examples, such one or more electrodes includes a first group of one or more electrodes implemented in a first direction and a second group of one or more electrodes implemented in a second direction that is different than the first direction. In one implementation, the second direction is 90 degrees different than the first direction. In another implementation, the second direction is offset from the first direction by some other amount (e.g., a difference in alignment that is greater than 10 degrees and less than 90 degrees different than the first direction).

FIG. 15 is a schematic block diagram of another embodiment 1500 of a TSD 1510 in accordance with the present invention. This diagram has certain similarities to the prior diagram and includes a schematic block diagram of another embodiment of a TSD 1510 that includes display functionality, e.g., a touchscreen display 80, and that also includes a plurality of drive-sense circuits (DSCs), the touchscreen processing module 82, the processing module 42, the video graphics processing module 48, a display 83, and a plurality of electrodes 85. The processing module 42 is executing an operating system 89 and one or more user applications 91 to produce data that is processed by the video graphics processing module 48 to generate frames of data 87. The processing module 42 provides the frames of data 87 to the display interface 93.

This diagram is similar to the prior diagram with at least one different being that the electrodes 85 are diagonally aligned. Generally speaking, the electrodes 85 may be implemented using any desired pattern, configuration, arrangement, etc. In addition, interfaces (I/Fs) 86 provide interfacing between the DSCs and the electrodes 85 appropriately such that a respective DSC services one or more electrodes 85 that are diagonally aligned in this implementation of a TSD 1510. For example, given the diagonally aligned electrodes 85, the DSCs as implemented in a particular architecture may not align directly with the respective electrodes that they service, and the I/Fs 86 provide for appropriate coupling between the DSCs and the electrodes 85. The TSD 1510 operates similarly to the TSD 1410 of FIG. 14 with the above noted differences.

FIG. 16 is a schematic block diagram of various embodiments 1601 through 1617 of electrode patterns that may be used on a TSD in accordance with the present invention. These diagrams show portions of or cross-sections of various embodiments of electrode patterns that may be used in accordance with any of the various TSDs described herein and/or their equivalents.

Generally speaking, the various electrodes within a TSD may be implemented in any desired configuration, pattern, arrangement, etc. In addition, note that alternative embodiments may include an electrode that is a pad, a button, etc. that is not implemented in a configuration, pattern, arrangement, etc. that facilitate capacitive coupling between a first electrode implemented in a first direction and a second electrode implemented in a second direction.

Reference 1601 corresponds to a pattern that includes uniformly spaced vertical electrodes. Reference numeral 1602 corresponds to a pattern that includes uniformly spaced horizontal electrodes. Generally speaking, note that the electrodes of such patterns may be aligned in any desired direction. Also, they may be uniformly spaced, non-uniformly spaced, parallel, non-parallel, etc.

Reference numeral 1603 corresponds to a pattern that includes non-uniformly spaced vertical electrodes. Reference numeral 1604 corresponds to a pattern that includes non-uniformly spaced horizontal electrodes. Note that the non-uniformity of spacing of the vertical or horizontal electrodes may be based on any desired pattern, including a repetitive pattern, a random pattern, etc.

Reference numeral 1605 corresponds to a pattern that includes uniformly spaced slanted/diagonal electrodes. Reference numeral 1606 corresponds to a pattern that includes nonuniformly spliced slanted electrodes.

Reference 1607 corresponds to a pattern that includes a uniformly spaced checkerboard. Reference 1608 corresponds to a pattern that includes non-uniformly spaced checkerboard. Note that the non-uniformity of spacing of the vertical and horizontal electrodes within such a non-uniformly spaced checkerboard pattern may be based on any desired pattern, including a repetitive pattern, a random pattern, etc. In addition, note that a pattern including electrodes extending in various directions such as checkerboard may include electrical isolation between the electrodes aligned in one direction and the electrodes aligned in another direction. For example, considering a checkerboard pattern such as these, the vertical and horizontal aligned electrodes may be electrically isolated such that there is not direct electrical connection between the vertical and horizontal aligned electrodes yet are configured to facilitate capacitive coupling of signals between the vertical and horizontal aligned electrodes.

Reference 1609 corresponds to a pattern that includes curved vertical aligned electrodes. In this particular example, the electrodes are more closely aligned to one another near the middle of the pattern than at the top or the bottom of the pattern. Reference 1610 corresponds to a pattern that includes curved horizontal aligned electrodes. In this particular example, the electrodes are more closely aligned to one another near the middle of the pattern than at the left or the right of the pattern.

Reference 1611 corresponds to a pattern that includes a curved checkerboard that includes both curved vertical aligned electrodes and curved horizontal aligned electrodes. Note also that the curved vertical aligned electrodes and curved horizontal aligned electrodes may be electrically isolated from one another such that such that there is not direct electrical connection between the vertical aligned electrodes and curved horizontal aligned electrodes.

Reference 1612 corresponds to a pattern that includes s-shaped vertical aligned electrodes. Note that an alternative pattern may alternatively include s-shaped horizontal aligned electrodes.

Reference 1613 corresponds to a pattern that includes a uniformly spaced slanted/diagonal checkerboard. Reference 1614 corresponds to a pattern that includes a non-uniformly spaced slanted/diagonal checkerboard. In this particular example, the electrodes are more closely aligned near the corners of this cross-section than in the middle/center of this cross-section.

Reference 1615 corresponds to a pattern that includes an alternative curved checkerboard such that some electrodes curve up and back down when traversing from left to right and other electrodes curve down and back up when traversing from left to right and other. Reference 1616 corresponds to a pattern that includes an alternative curved checkerboard such that some electrodes curve to the right and back to the left when traversing from top to bottom and other electrodes curve to the left and back to the right when traversing from top to bottom. Reference 1617 corresponds to a vertical and slanted/diagonal pattern that includes some electrodes aligned vertically and other electrodes aligned in a slanted/diagonal manner.

For example, considering the patterns shown by reference numerals 1613, 1614, 1615, 1616, and 1617 that include electrodes aligned in at least 2 different directions may be electrically isolated such that there is not direct electrical connection between the electrodes aligned in at least 2 different directions yet are configured to facilitate capacitive coupling of signals between the electrodes aligned in at least 2 different directions.

Generally speaking, any desired pattern of electrodes may be used in a TSD and may be implemented on any surface, layer, component, etc. of the TSD. In some examples, note that one or more protective layers may be implemented over electrodes to ensure that they are not damaged, etc. yet still are configured to facilitate capacitive coupling with the electrodes and/or between electrodes through the one or more protective layers.

In addition, with respect to electrodes implemented in different directions (e.g., rows and columns, or some other pattern) within a TSD, a mutual capacitance is created between a first electrode implemented in a first direction in a first surface, layer, component, etc. of the TSD and a second electrode implemented in a second direction in a second surface, layer, component, etc. of the TSD. In addition, each electrode has a self-capacitance, which corresponds to a parasitic capacitance created by the electrode with respect to other conductors in the TSD (e.g., ground, conductive layer(s), and/or one or more other electrodes). Also, a mutual capacitance exists between a first electrode implemented in a first direction in a first surface, layer, component, etc. of the TSD and a second electrode implemented in a second direction in a second surface, layer, component, etc. of the TSD. When no touch (e.g., from a user, stylus, other device that may or may not include TSD functionality, another other TSD, etc. is present), the self-capacitances and mutual capacitances of the TSD are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

FIG. 17 is a schematic block diagram of another embodiment 1700 of a TSD that is similar to FIG. 15 with the option of using any desired electrode pattern in accordance with the present invention. For example, the electrodes 85 of the TSD 1710 may be implemented using any of the various electrode patterns shown within FIG. 16, or alternatively, using any other desired electrode pattern, configuration, etc. Similar to FIG. 15, I/Fs 86 provide for appropriate coupling between the DSCs and the electrodes 85 to accommodate any desired electrode pattern and coupling between the DSCs and the electrodes 85.

Figure 18:
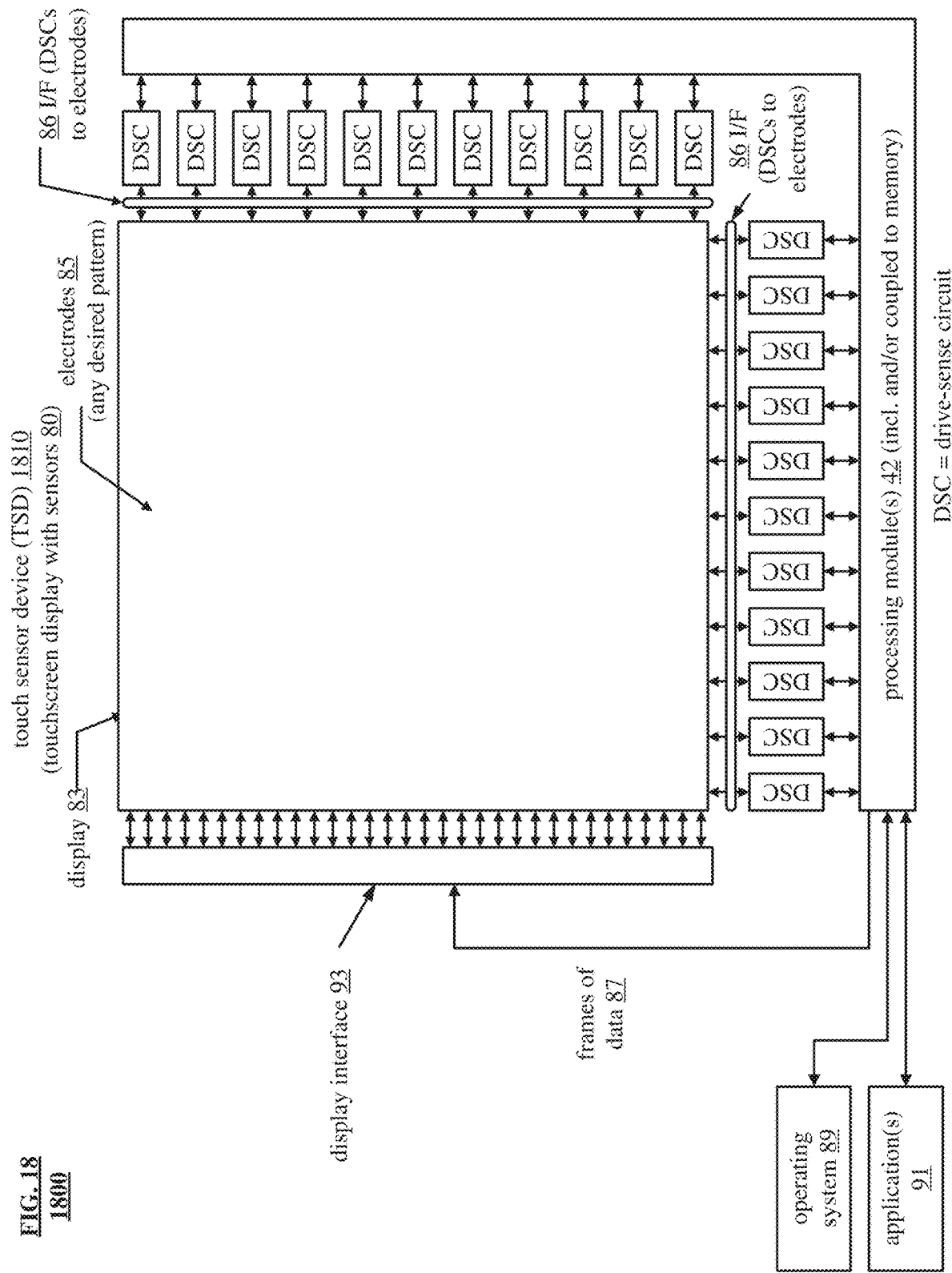
FIG. 18 is a schematic block diagram of another embodiment of a touch sensor device (TSD) in accordance with the present invention.

FIG. 18 is a schematic block diagram of another embodiment 1800 of a touchscreen display in accordance with the present invention. This diagram includes a schematic block diagram of another embodiment of a touch sensor device (TSD) 1810 that includes display functionality, e.g., a touchscreen display 80, and that also includes a plurality of drive-sense circuits (DSCs), the processing module 42, a display 83, and a plurality of electrodes 85. The processing module 42 is executing an operating system 89 and one or more user applications 91 to produce frames of data 87. The processing module 42 provides the frames of data 87 to the display interface 93. The TSD 1810 operates similarly to the TSD 1410 of FIG. 14 with the above noted differences.

Figure 19:
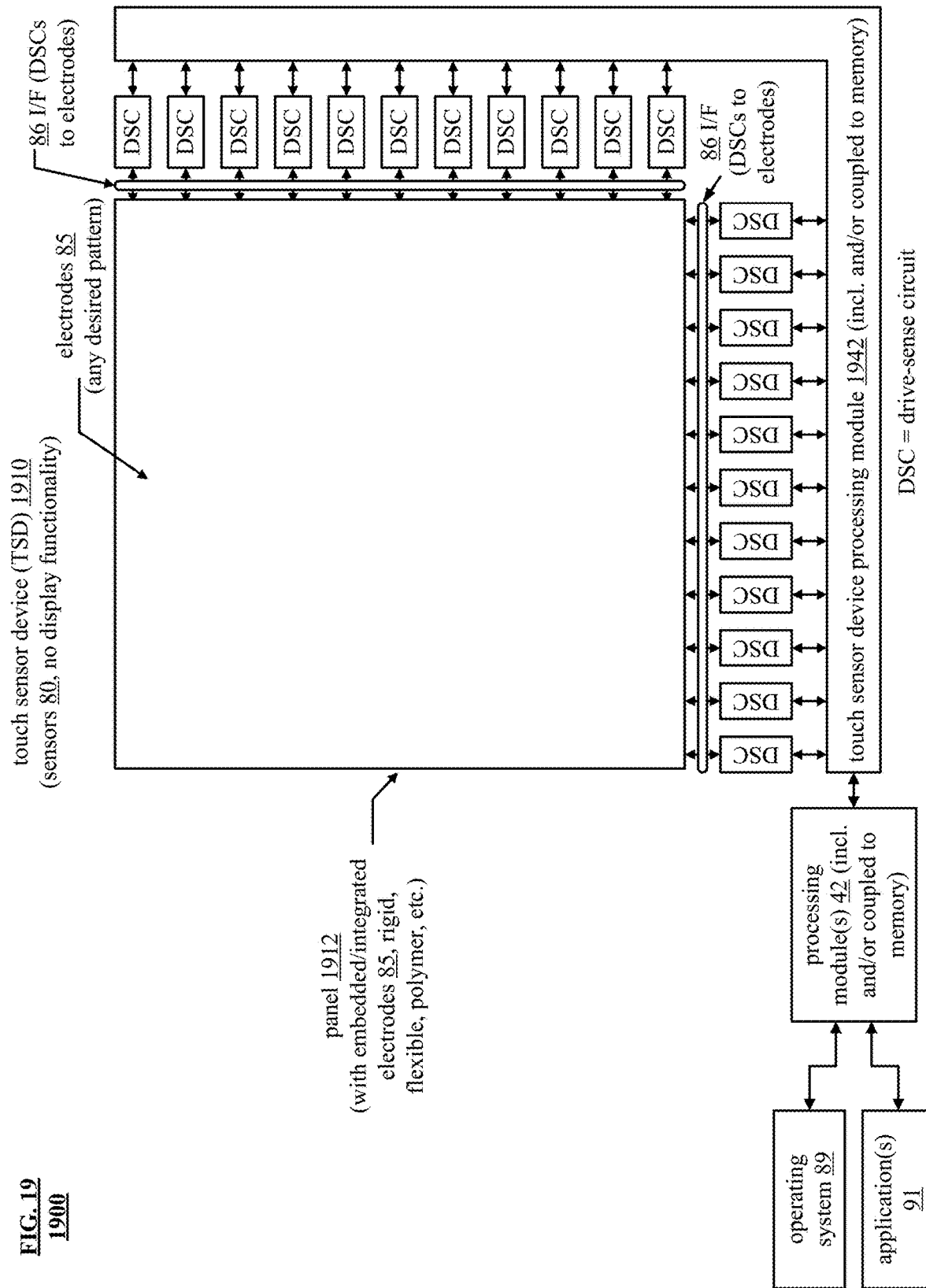
FIG. 19 is a schematic block diagram of an embodiment of a touch sensor device (TSD) in accordance with the present invention.

FIG. 19 is a schematic block diagram of an embodiment 1900 of a touch sensor device (TSD) in accordance with the present invention. Note that a touch sensor device may or may not include display functionality. For example, one example of a touch sensor device includes a touchscreen display (e.g., such as described with respect to FIG. 14 or FIG. 15). Alternatively, a touch sensor device may include touch sensor functionality without including display functionality. In this diagram, an alternative example of a touch sensor device, namely, touch sensor device 1910, includes sensor 80 but with no display functionality. Generally speaking, any reference to a touch sensor device herein may be used to refer to a touch sensor device that may or may not include display functionality (e.g., a touchscreen display or a touch sensor device such as touch sensor device 1910 that does not include display functionality). This diagram is similar to FIG. 17 with at least some differences being that this diagram includes a touch sensor device 1910 with sensors 80. The touch sensor device 1910 of this diagram includes a panel 1912 (e.g., that includes embedded/integrated electrodes 85) that facilitates touch sensor functionality. However, the touch sensor device 1910 of this diagram does not include display functionality and does not include a video graphics processing module 48 or a display interface 93 as does FIG. 17. In addition, the touchscreen processing module 82 of FIG. 14, which may include and/or be coupled to memory, is replaced in FIG. 19 by a touch sensor device processing module 1942, which may include and/or be coupled to memory.

The touch sensor device processing module 1942 operates similarly to the touchscreen processing module 82 of FIG. 17 with respect to touch related functionality yet with at least some differences being that the touch sensor device processing module 1942 does not particularly operate in accordance with display related functionality. For example, the touch sensor device 1910 includes a panel 1912, a plurality of sensors (e.g., shows as electrodes 85 in the diagram), a plurality of drive-sense circuits (DSCs), and the touch sensor device processing module 1942. The touch sensor device 1910 includes a plurality of sensors (e.g., electrodes 85, capacitor sensing cells, capacitor sensors, inductive sensor, etc.) to detect a proximal touch of the panel 1912. For example, when one or more fingers, styluses, other components, etc. touches the screen, capacitance of sensors proximal to the touch(es) are affected (e.g., impedance changes). The drive-sense circuits (DSC) coupled to the affected sensors detect the change and provide a representation of the change to the touch sensor device processing module 1942, which may be a separate processing module or integrated into the processing module 42.

The touch sensor device processing module 1942 processes the representative signals from the drive-sense circuits (DSC) to determine the location of the touch(es). This information is inputted to the processing module 42 for processing as an input. For example, a touch represents a selection of a location on the panel 1912, a motion on the panel 1912, a gesture of a user with respect to the panel 1912, etc.

In addition, with respect to this diagram and others herein, note that the panel 1912 may be implemented in a variety of ways including in a rigid format such as is made when such electrodes are implemented in a TSD that includes display functionality. However, when the panel 1912 that includes the electrodes 85, which may be implemented in any desired pattern, may alternatively be implementation using other non-rigid materials that are flexible and allow for adaptability to a variety of applications. Such materials may be polymer, flexible plastic, any other materials that facilitates capacitive coupling to the electrodes of the panel 1912 while also allowing flexibility of the panel 1912.

Figure 20:
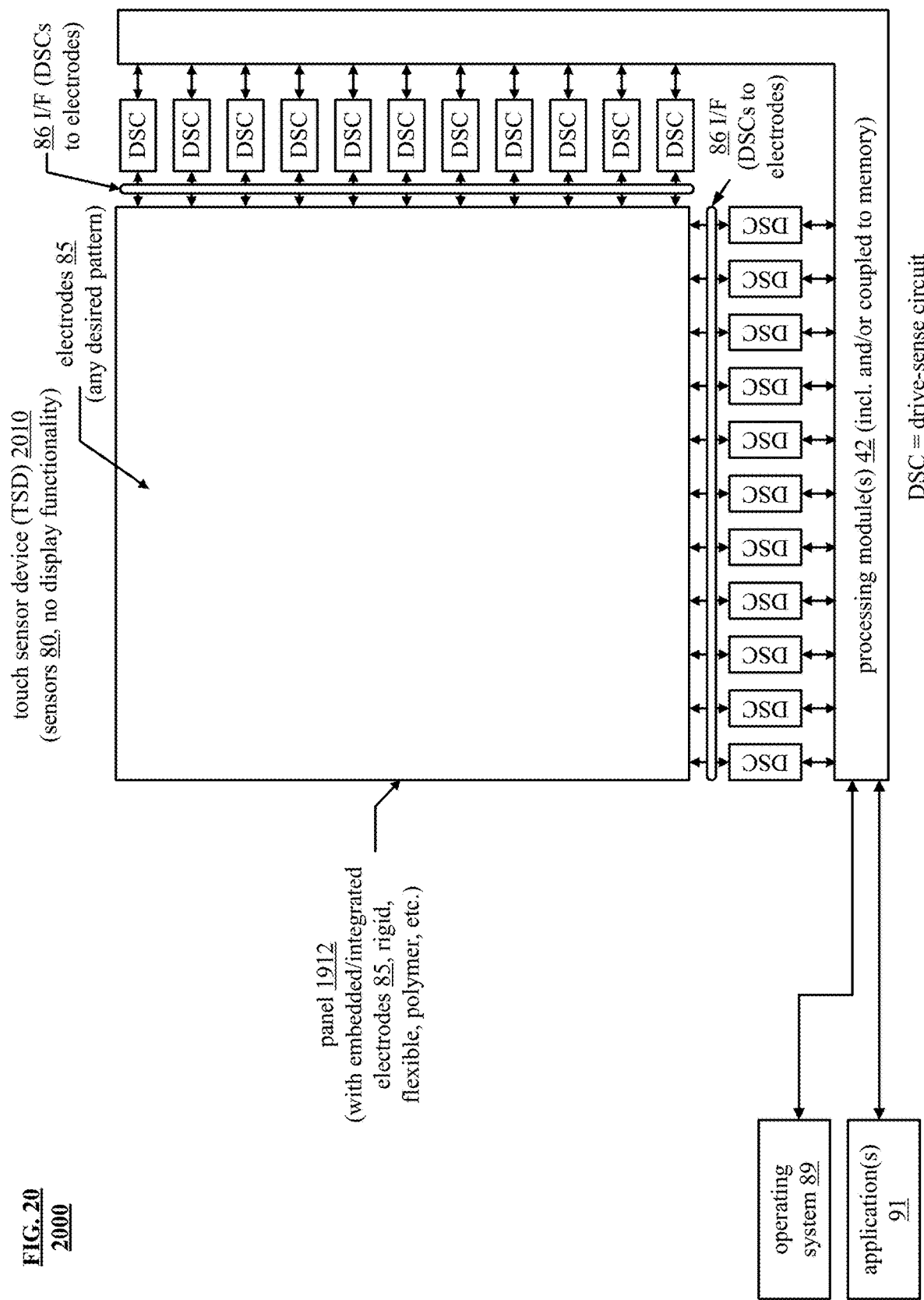
FIG. 20 is a schematic block diagram of another embodiment of a touch sensor device (TSD) in accordance with the present invention.

FIG. 20 is a schematic block diagram of another embodiment 2000 of a touch sensor device (TSD) in accordance with the present invention. This diagram has some similarities to prior diagrams including FIG. 19. In this diagram, the functionality from a touch sensor device processing module 1942, which may include or be coupled to memory, such as with respect to FIG. 19, is integrated into the processing module 42, which may include or be coupled to memory. The processing module 42 facilitates touch related functionality without specifically supporting display related functionality.

Note that while many of the examples of electrode alignment within a panel or touchscreen display show the electrodes as being aligned with respect to rows and columns, any other desired configuration of electrodes may alternatively be made. For example, electrodes may be arranged angularly such as a first set of electrodes are implemented as extending from upper left to lower right of the panel or touch screen display and a second set of electrodes are implemented as extending from upper right to lower left of the panel or touchscreen display. Generally speaking, any desired configuration and implementation of electrode arrangement within such a panel or touchscreen display, including any such pattern shown with respect to FIG. 16, may be implemented within any such device as described here including various aspects, embodiments, and/or examples of the invention (and/or their equivalents).

Figure 21:
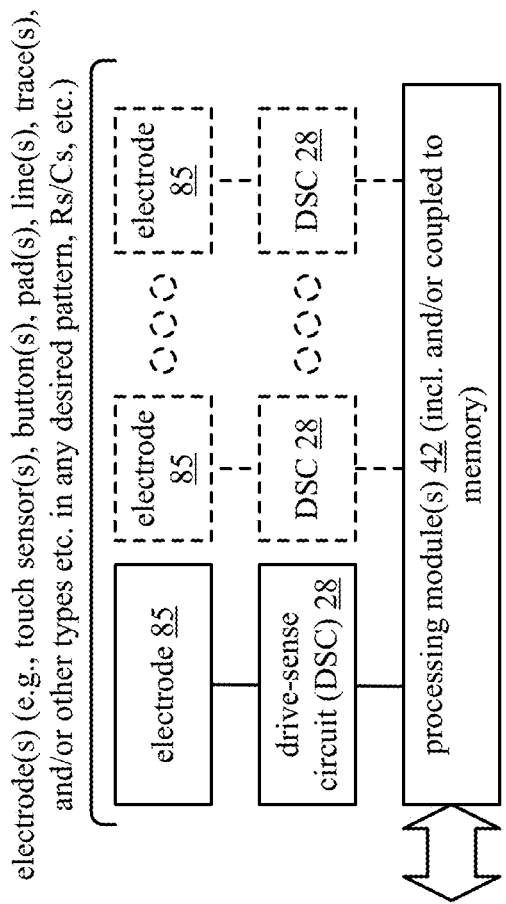
FIG. 21 is a schematic block diagram of another embodiment of a touch sensor device (TSD) in accordance with the present invention.

FIG. 21 is a schematic block diagram of another embodiment 2100 of a touch sensor device (TSD) in accordance with the present invention. The TSD includes one or more drive-sense circuits (DSCs) 28 and one or more electrodes 85 in accordance with the present invention. Within this diagram, as well as any other diagram described herein, or their equivalents, the one or electrodes 85 that are in communication with one or more DSC 28 (e.g., touch sensor electrodes such as may be implemented within a TSD configured to facilitate sensing of touch, proximity, gesture, etc.) may be of any of a variety of one or more types including any one or more of a touch sensor element (e.g., including one or more touch sensors with or without display functionality), a touchscreen including both touch sensor and display functionality, a button, an electrode, an external controller, one or more rows of electrodes, one or more columns of electrodes, a matrix of buttons, an array of buttons, a film that includes any desired implementation of components to facilitate touch sensor operation, and/or any other configuration by which interaction with the touch sensor may be performed.

Note that the one or more electrodes 85 may be implemented within any of a variety of devices including any one or more of a touchscreen, a pad device, a laptop, a cell phone, a smartphone, a whiteboard, an interactive display, a navigation system display, an in-vehicle display, a panel (e.g., implemented using rigid or flexible material), etc., and/or any other device in which one or more touch electrodes 85 may be implemented.

Note that such interaction of a user with an electrode 85 may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor including proximity detection, gesture detection, etc.). With respect to the various embodiments, implementations, etc. of various respective electrodes as described herein, note that they may also be of any such variety of one or more types. For example, electrodes may be implemented within any desired shape or style (e.g., lines, buttons, pads, etc.) or include any one or more of touch sensor electrodes, capacitive buttons, capacitive sensors, row and column implementations of touch sensor electrodes such as in a touchscreen, etc.

One example of such user interaction with the one or more electrodes 85 is via capacitive coupling between the user and the one or more electrodes 85. Such capacitive coupling (CC) may be achieved from a user, via a stylus, an active element such as an electronic pen (e-pen), and/or any other element such as an overlay, another TSD, etc. implemented to facilitate capacitive coupling between the user and the electrode 85. In some examples, note that the one or more electrodes 85 are also implemented to detect user interaction based on user touch (e.g., via capacitive coupling (CC) from a user, such as a user's finger, to the one or more electrodes 85).

Another example of such interaction with the one or more electrodes 85 is via capacitive coupling between a non-user element and the one or more electrodes 85. For example, consider a robotic arm, article of manufacture, etc. comes into proximity to the one or more electrodes 85, then capacitive coupling between the a robotic arm, article of manufacture, etc. may be detected via the one or more electrodes 85. Note that any example, embodiment, etc. described herein corresponding to user interaction with the TSD may analogously be performed based on interaction of any other object other than a user when interacting with the TSD.

At the bottom of this diagram, one or more processing modules 42 is coupled to drive-sense circuits (DSCs) 28. Note that the one or more processing modules 42 may include integrated memory and/or be coupled to other memory. At least some of the memory stores operational instructions to be executed by the one or more processing modules 42.

FIG. 22 is a schematic block diagram of another embodiment 2200 of multiple touch sensor devices (TSDs) in accordance with the present invention. At the bottom of this diagram, a first TSD/$1^{st}$ device includes one or more processing modules 42 includes a first subset of the one or more processing modules 42 that are in communication and operative with a first subset of the one or more DSCs 28 (e.g., those in communication with one or more row and/or column electrodes of the first TSD/$1^{st}$ device) and a second TSD/$2^{nd}$ device includes a second subset of the one or more processing modules 42 that are in communication and operative with a second subset of the one or more DSCs 28 (e.g., those in communication with one or more row and/or column electrodes of the second TSD/$2^{nd}$ device).

In even other examples, the one or more processing modules 42 shown in the first TSD/$1^{st}$ device or the second TSD/$2^{nd}$ device includes a first subset of the one or more processing modules 42 that are in communication and operative with a first subset of the one or more DSCs 28 (e.g., those in communication with one or more row and/or column electrodes of a TSD) and a second subset of the one or more processing modules 42 that are in communication and operative with a second subset of the one or more DSCs 28 (e.g., those in communication with electrodes of an e-pen or some other TSD).

In some examples, the first subset of the one or more processing modules 42, a first subset of one or more DSCs 28, and a first subset of one or more electrodes 85 are implemented within or associated with a first TSD/$1^{st}$ device, and the second subset of the one or more processing modules 42, a second subset of one or more DSCs 28, and a second subset of one or more electrodes 85 are implemented within or associated with a second TSD/$2^{nd}$ device. The different respective devices (e.g., first and second) may be similar type devices or different devices. For example, they may both be devices that include touch sensors (e.g., without display functionality). For example, they may both be devices that include touchscreens (e.g., with display functionality). For example, the first TSD/$1^{st}$ device may be a device that include touch sensors (e.g., with or without display functionality), and the second TSD/$2^{nd}$ device is an e-pen device.

In an example of operation and implementation, with respect to the first subset of the one or more processing modules 42 that are in communication and operative with a first subset of one or more DSCs 28, a signal #1 is coupled from a first electrode 85 that is in communication to a first DSC 28 of the first subset of one or more DSCs 28 that is in communication and operative with the first subset of the one or more processing modules 42 to a second electrode 85 that is in communication to a first DSC 28 of the second subset of one or more DSCs 28 that is in communication and operative with the second subset of the one or more processing modules 42.

When more than one DSC 28 is included within the first subset of one or more DSCs 28, the signal #1 may also be coupled from the first electrode 85 that is in communication to a first DSC 28 of the first subset of one or more DSCs 28 that is in communication and operative with the first subset of the one or more processing modules 42 to a third electrode 85 that is in communication to a second DSC 28 of the second subset of one or more DSCs 28 that is in communication and operative with the second subset of the one or more processing modules 42.

Generally speaking, signals may be coupled between one or more electrodes 85 that are in communication and operative with the first subset of the one or more DSCs 28 associated with the first subset of the one or more processing modules 42 and the one or more electrodes 85 that are in communication and operative with the second subset of the one or more DSCs 28 (e.g., signal #1, signal #2). In certain examples, such signals are coupled from one electrode 85 (e.g., such as associated with the first TSD/$1^{st}$ device) to one or more other electrodes 85 (e.g., such as associated with the second TSD/$2^{nd}$ device).

In some examples, these two different subsets of the one or more processing modules 42 are also in communication with one another (e.g., via communication effectuated via capacitive coupling between a first subset of electrodes 85 serviced by the first subset of the one or more processing modules 42 and a second subset of electrodes 85 serviced by the first subset of the one or more processing modules 42, via one or more alternative communication means such as a backplane, a bus, a wireless communication path, etc., and/or other means). In some particular examples, these two different subsets of the one or more processing modules 42 are not in communication with one another directly other than via the signal coupling between the one or more electrodes 85 themselves.

A first group of one or more DSCs 28 is/are implemented simultaneously to drive and to sense respective one or more signals provided to a first of the one or more electrodes 85. In addition, a second group of one or more DSCs 28 is/are implemented simultaneously to drive and to sense respective one or more other signals provided to a second of the one or more electrodes 85.

For example, a first DSC 28 is implemented simultaneously to drive and to sense a first signal via a first sensor electrode 85. A second DSC 28 is implemented simultaneously to drive and to sense a second signal via a second sensor electrode 85. Note that any number of additional DSCs implemented simultaneously to drive and to sense additional signals to additional electrodes 85 as may be appropriate in certain embodiments. Note also that the respective DSCs 28 may be implemented in a variety of ways. For example, they may be implemented within a device that includes the one or more electrodes 85, they may be implemented within a TSD such as a touchscreen that includes display functionality, they may be distributed among a TSD that includes the one or more electrodes 85 that does not include display functionality, etc.

In this diagram as well as any other diagram herein, note that the different respective signals that are driven and simultaneously sensed via the electrodes 85 may be differentiated from one another. For example, appropriate filtering and processing can identify the various signals given their differentiation, orthogonality to one another, difference in frequency, etc. Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

Other examples described herein and their equivalents operate using any of a number of different characteristics other than or in addition to frequency. Differentiation between the signals based on frequency corresponds to a first signal has a first frequency and a second signal has a second frequency different than the first frequency. Differentiation between the signals based on amplitude corresponds to a that if first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC).

Alternatively, differentiation between the different respective signals may be made based on using different types of FEC/ECC for the different respective signals.

Differentiation between the signals based on type corresponds to a first signal being or a first type and a second signal being of a second generated, coded, and/or based on a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents.

Figure 23A:
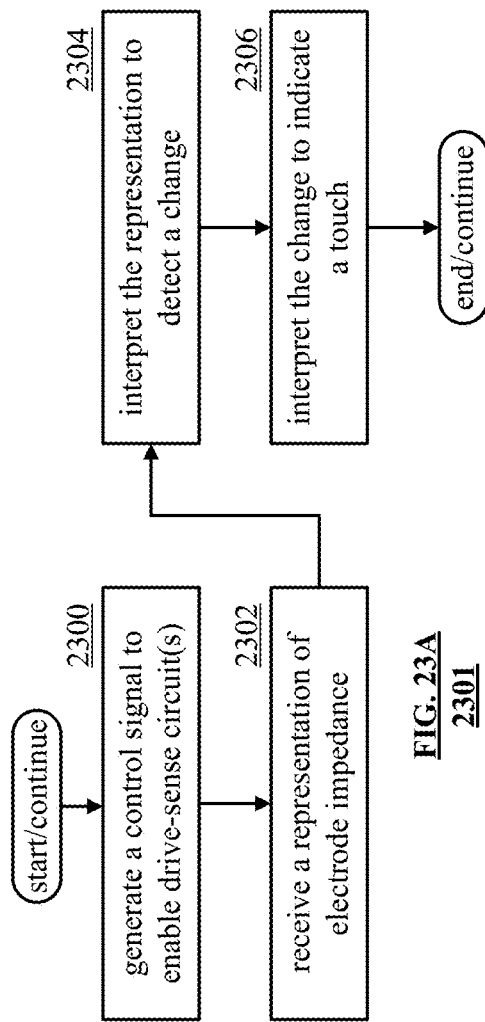
FIG. 23A is a logic diagram of an embodiment of a method for sensing a touch on a touch sensor device (TSD)(with or without display functionality) in accordance with the present invention.

FIG. 23A is a logic diagram of an embodiment of a method for sensing a touch on a touch sensor device (TSD)(with or without display functionality) in accordance with the present invention. This diagram includes a logic diagram of an embodiment of a method 2301 for execution by one or more computing devices for sensing a touch on a TSD that is executed by one or more processing modules of one or various types (e.g., 42, 82, 1942 and/or 48 of other figures included herein). The method 2301 begins at step 2300 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method 2301 continues at step 2302 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method 2301 continues at step 2304 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode of a user or other element. As another example, a decrease in mutual capacitance (e.g., the capacitance between a row electrode and a column electrode) is also indicative of a touch and/or presence of a user or other element near the electrodes. The processing module does this for each representation of the impedance of the electrode it receives. Note that the representation of the impedance is a digital value, an analog signal, an impedance value, and/or any other analog or digital way of representing a sensor's impedance.

The method 2301 continues at step 2306 where the processing module interprets the change in the impedance to indicate a touch and/or presence of a user or other element of the TSD in an area corresponding to the electrode. For each change in impedance detected, the processing module indicates a touch and/or presence of a user or other element. Further processing may be done to determine if the touch is a desired touch or an undesired touch.

Figure 23B:
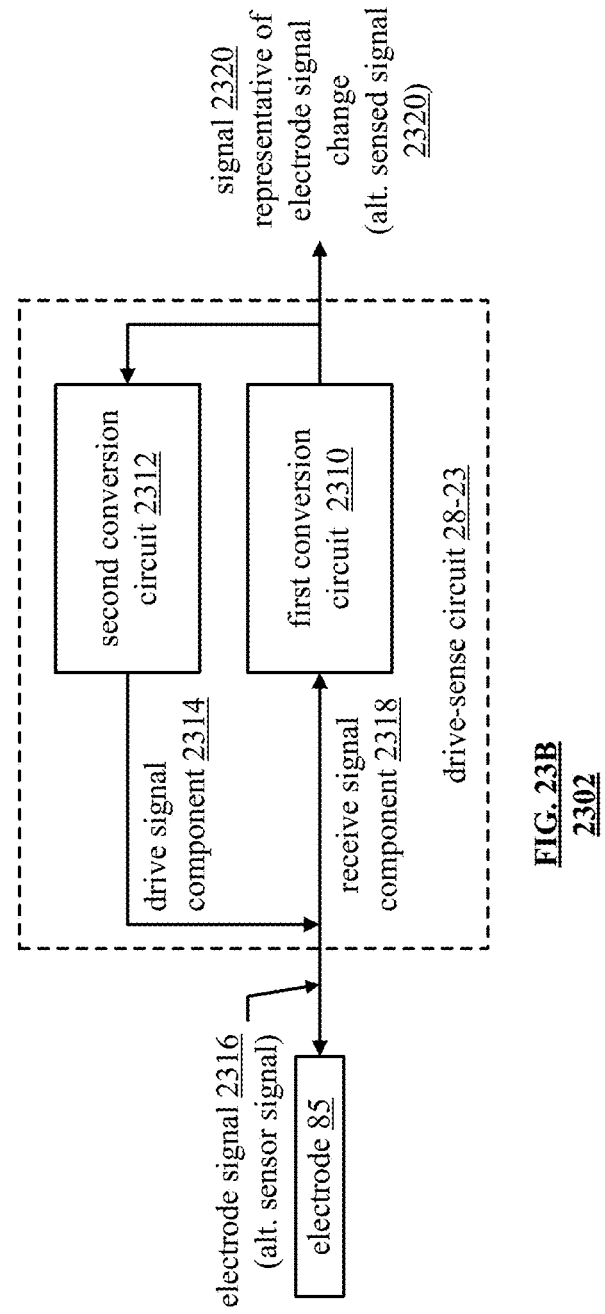
FIG. 23B is a schematic block diagram of an embodiment of a drive sense circuit in accordance with the present invention.

FIG. 23B is a schematic block diagram of an embodiment 2302 of a drive sense circuit in accordance with the present invention. this diagram includes a schematic block diagram of an embodiment of a drive sense circuit 28-18 that includes a first conversion circuit 2310 and a second conversion circuit 2312. The first conversion circuit 2310 converts an electrode signal 2316 (alternatively a sensor signal, such as when the electrode 85 includes a sensor, etc.) into a signal 2320 that is representative of the electrode signal and/or change thereof (e.g., note that such a signal may alternatively be referred to as a sensor signal, a signal representative of a sensor signal and/or change thereof, etc. such as when the electrode 85 includes a sensor, etc.). The second conversion circuit 2312 generates the drive signal component 2314 from the sensed signal 2312. As an example, the first conversion circuit 2310 functions to keep the electrode signal 2316 substantially constant (e.g., substantially matching a reference signal) by creating the signal 2320 to correspond to changes in a receive signal component 2318 of the sensor signal. The second conversion circuit 2312 functions to generate a drive signal component 2314 of the sensor signal based on the signal 2320 substantially to compensate for changes in the receive signal component 2318 such that the electrode signal 2316 remains substantially constant.

In an example, the electrode signal 2316 (e.g., which may be viewed as a power signal, a drive signal, a sensor signal, etc. such as in accordance with other examples, embodiments, diagrams, etc. herein) is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 2310 adjusts the signal 2320 based on the receive signal component 2318, which is indicative of the impedance of the electrode and change thereof. The second conversion circuit 2312 adjusts the regulated current based on the changes to the signal 2320.

As another example, the electrode signal 2316 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 2310 adjusts the signal 2320 based on the receive signal component 2318, which is indicative of the impedance of the electrode and change thereof. The second conversion circuit 2312 adjusts the regulated voltage based on the changes to the signal 2320.

Figure 24:
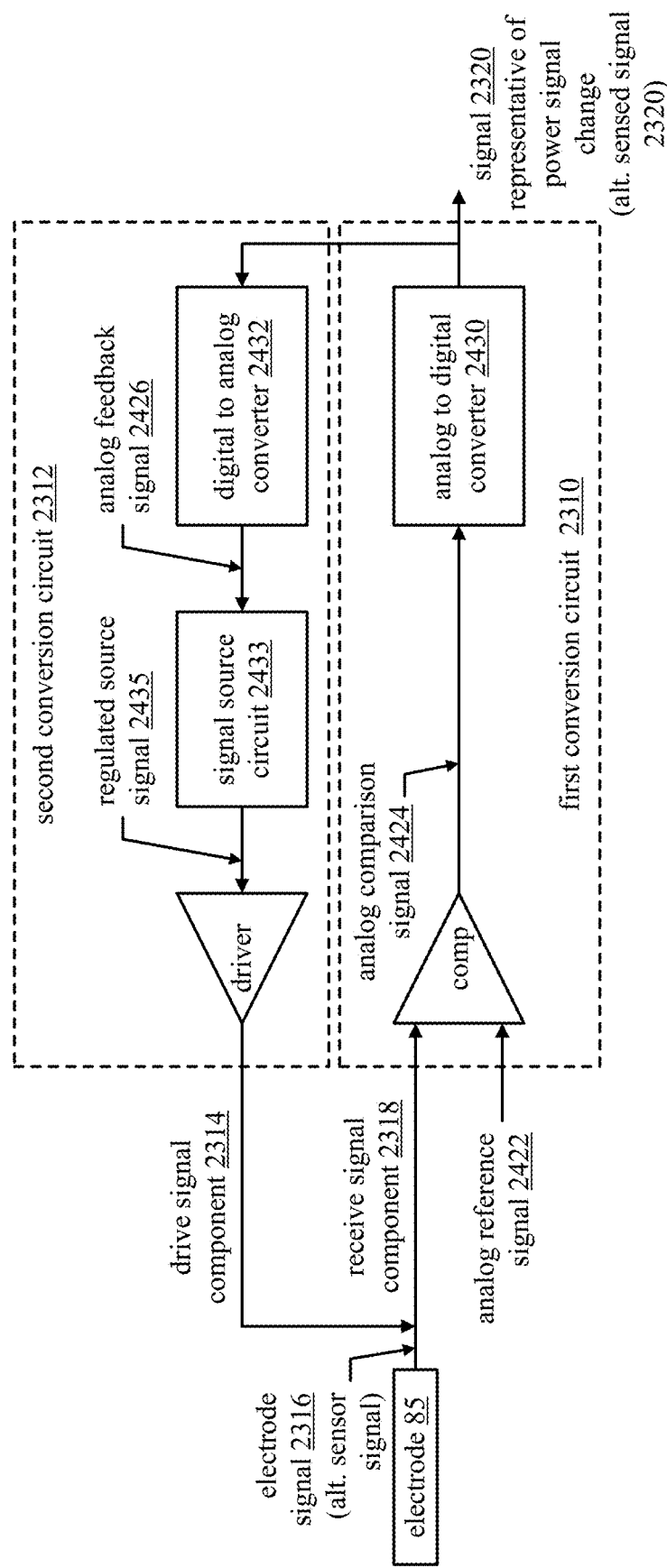
FIG. 24 is a schematic block diagram of another embodiment of a drive sense circuit in accordance with the present invention.

FIG. 24 is a schematic block diagram of another embodiment 2400 of a drive sense circuit in accordance with the present invention. this diagram includes a schematic block diagram of another embodiment of a drive sense circuit 28 that includes a first conversion circuit 2310 and a second conversion circuit 2312. The first conversion circuit 2310 includes a comparator (comp) and an analog to digital converter 2430. The second conversion circuit 2312 includes a digital to analog converter 2432, a signal source circuit 2433, and a driver.

In an example of operation, the comparator compares the electrode signal 2316 (alternatively, a sensor signal, etc.) to an analog reference signal 2422 to produce an analog comparison signal 2424. The analog reference signal 2424 includes a DC component and/or an oscillating component. As such, the electrode signal 2316 will have a substantially matching DC component and/or oscillating component. An example of an analog reference signal 2422 is also described in greater detail with reference to FIG. 7 such as with respect to a power signal graph.

The analog to digital converter 2430 converts the analog comparison signal 2424 into the signal 2320. The analog to digital converter (ADC) 2430 may be implemented in a variety of ways. For example, the (ADC) 2430 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 2432 may be a sigma-delta DAC, a pulse width modulator DAC, a binary weighted DAC, a successive approximation DAC, and/or a thermometer-coded DAC.

The digital to analog converter (DAC) 2432 converts the signal 2320 into an analog feedback signal 2426. The signal source circuit 2433 (e.g., a dependent current source, a linear regulator, a DC-DC power supply, etc.) generates a regulated source signal 2435 (e.g., a regulated current signal or a regulated voltage signal) based on the analog feedback signal 2426. The driver increases power of the regulated source signal 2435 to produce the drive signal component 2314.

FIG. 25 is a schematic block diagram of an embodiment 2500 of a DSC that is interactive with an electrode in accordance with the present invention. Similar to other diagrams, examples, embodiments, etc. herein, the DSC 28-a2 of this diagram is in communication with one or more processing modules 42. The DSC 28-a2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a2 includes a current source 110-1 and a power signal change detection circuit 112-a1. The power signal change detection circuit 112-a1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the impedance of the electrode 85 decreases and the current power signal 116 remains substantially unchanged, the voltage across the electrode 85 is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Figure 26:
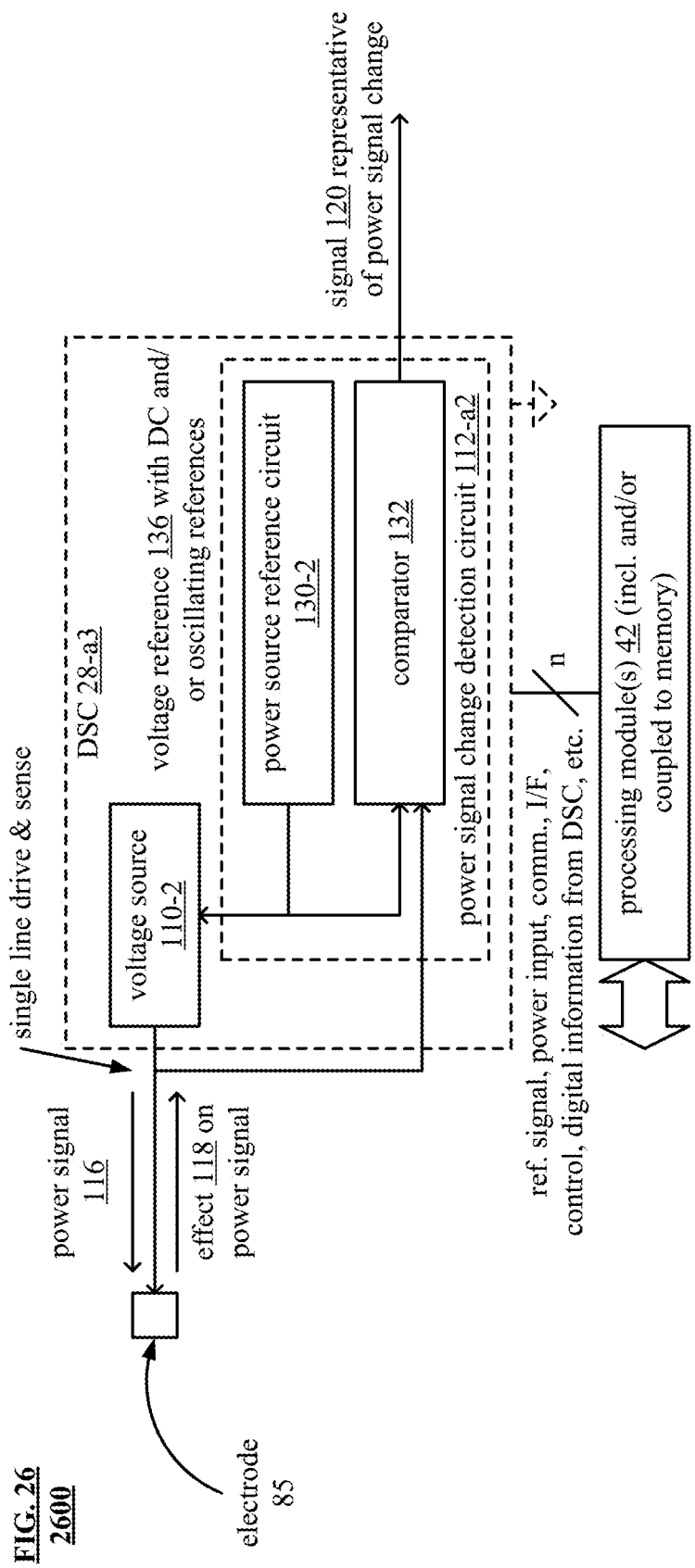
FIG. 26 is a schematic block diagram of another embodiment of a DSC that is interactive with an electrode in accordance with the present invention.

FIG. 26 is a schematic block diagram of another embodiment 2600 of a DSC that is interactive with an electrode in accordance with the present invention. Similar to other diagrams, examples, embodiments, etc. herein, the DSC 28-a3 of this diagram is in communication with one or more processing modules 42. Similar to the previous diagram, although providing a different embodiment of the DSC, the DSC 28-a3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a3 includes a voltage source 110-2 and a power signal change detection circuit 112-a2. The power signal change detection circuit 112-a2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the impedance of the electrode 85 decreases and the voltage power signal 116 remains substantially unchanged, the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

With respect to many of the following diagrams, one or more processing modules 42, which includes and/or is coupled to memory, is configured to communicate and interact with one or more DSCs 28 the coupled to one or more electrodes of the panel or a touchscreen display such as may be implemented within a touch sensor device (TSD) (with or without display functionality). In many of the diagrams, the DSCs 28 are shown as interfacing with electrodes of the panel or touchscreen display (e.g., via interface 86 that couples to row electrodes and another interface 86 that couples to column electrodes). Note that the number of lines that coupled the one or more processing modules 42 to the respective one or more DSCs 28, and from the one or more DSCs 28 to the respective interfaces 86 may be varied (e.g., such as may be described by n and m, which are positive integers greater than or equal to 1). Note that the respective values may be the same or different within different respective embodiments and/or examples herein.

Note that the same and/or different respective signals may be driven simultaneously sensed by the respective one or more DSCs 28 that couple to electrodes 85 within any of the various embodiments and/or examples herein. In some examples, a common signal (e.g., having common one or more characteristics) is implemented in accordance with self signaling, and different respective signals (e.g., different respective signals having one or more different characteristics) are implemented in accordance with mutual signaling as described below. Again, as mentioned above, note that the different respective signals that are driven and simultaneously sensed via the electrodes 85 may be differentiated from one another.

FIG. 27 is a schematic block diagram of various embodiments 2701 through 2707 of touch sensor devices (TSDs), which may or may not include display functionality via a touchscreen display, an liquid crystal display (LCD) operable display, a light emitting diode (LED) operable display, and/or other visual output component, in accordance with the present invention. For example, one or more means of providing visual output that may be observed by a user may be implemented within a TSD. Such a means may be an LED that is eliminated when the TSD is operational. Such a means may alternatively be a display, such as in accordance with a touchscreen display associated with at least a portion of the TSD. Such a means may alternatively be a display such as implemented on a pager type device such as including one or more lines configured to display textual information. Note that such a TSD may be implemented with or without such visual output functionality.

One or more touch sensors are implemented on one or more surfaces of a TSD. For example, a TSD may be implemented to have any desired shape, and one or more touch sensors are implemented on one or more surfaces of that particular shape. In certain examples, one or more touch sensors are implemented on all of surfaces of that particular shape. For example, one or more electrodes are implemented on one or more surfaces of the TSD to facilitate capacitive coupling in accordance with detecting user interaction with the TSD (e.g., such as based on a finger, hand, or other part of a user, from a stylus associated with a user, and/or from active element such as an e-pen, another TSD, etc. associated with a user) and/or in accordance with detecting one or more signals being coupled into the one or more electrodes of the TSD (e.g., such as from active element such as an e-pen, another TSD, etc. associated with a user). Also, note that the one or more electrodes may be implemented underneath a protective layer on the surface of the TSD through which capacitive coupling may still be made to the one or more electrodes through the protective layer.

Note that the one or more electrodes are coupled to one or more DSCs that are in communication with one or more processing modules, as described with respect to other diagrams herein (e.g., including FIG. 21, 22, etc.).

Referring to the diagram, TSD 2701 has a flat surface that is generally square in shape and has a particular thickness. In addition, in certain examples, the TSD 2701 one or more holes or voids. Such vacancies can include touch sensor functionality (e.g., the surface inside of the hole or void includes electrodes). Also, such vacancies also provide for other components to be implemented therein. For example, one or more other devices (e.g., such as a camera, a speaker, a mounting screw, a credit card reader, etc.) may be implemented within the one or more holes or voids. Note that the TSD functionality as described herein (e.g., using one or more DSCs coupled to one or more processing modules and electrodes) enables full TSD functionality right up to the edge of the holes or voids.

TSD 2702 is similar to TSD 2701 with at least one difference being that it generally has a rectangular shape and a particular thickness. In addition, in certain examples, the TSD 2702 one or more holes or voids. TSD 2703 includes multiple sections that facilitate changing of the configuration of the TSD based on how those particular sections are arranged next to one another. TSD 2704*a* has a flat surface that is generally circular or oval and has a particular thickness. TSD 2704*b* also has a flat surface that is generally circular or oval and has a particular thickness and includes a hole or void therein. For example, a variant of the TSD 2704*b* may be in the shape of a steering wheel, a navigational wheel, an aircraft control wheel, etc.

TSD 2705 and TSD 2706 include non-flat/curved surfaces. For example, note that a TSD may be implemented to have any desired shape, and one or more electrodes may be implemented on any of the one or more surfaces of the TSD including any non-flat/curved surfaces. For example, TSD 2705 and 2706 may be viewed as having a shape similar to various styles and options of a computer mouse.

TSD 2707 includes multiple portions such that one portion corresponds to a touch sensor region, such as may be implemented using a touchscreen, and also includes a casing/bezel that may or may not include touch sensors. For example, the TSD 2707 may be implemented such that touch sensor functionality is included only within the touch sensor region and not within the casing/bezel thereof. T FIG. 28A is a schematic block diagram of other various embodiments 2801 through 2809 of TSDs which may or may not include display functionality via a touchscreen display, an liquid crystal display (LCD) operable display, a light emitting diode (LED) operable display, and/or other visual output component, as well as 3-D geometric objects, which may or may not include TSD functionality, in accordance with the present invention.

With respect to those TSDs, such as 3-D geometric objects that include TSD functionality, data communication signaling may be made between two devices (e.g., such as with respect to FIG. 22) to provide information beyond merely positional, gesture, movement, proximity, etc. related information such that data is included within the signals coupled between electrodes of the two devices. In addition, in certain examples, user interaction that is detected by a first device may be communicated to the second device via such data communication signals.

In addition, consider a 3-D geometric object that does not include TSD functionality. In certain examples, such a 3-D geometric object is constructed so as to improve coupling from a user to a TSD through the 3-D geometric object. For example, the 3-D geometric object includes material that is a dielectric loaded material with a very high dielectric strength. In certain examples, the 3-D geometric object includes material such as small particles, e.g., spheres or some other shapes, that are not conductive but provide serve as a high dielectric with a very high dielectric strength.

In another example, the 3-D geometric object includes one more conductors extending from one surface to another (e.g., through the 3-D geometric object, from top to bottom) so as to improve coupling from a user to a TSD through the 3-D geometric object.

This diagram provides additional examples by which the TSD may be implemented. TSD 2801 includes a cube, squared shape. TSD 2802 includes a triangular shape. TSD 2803 includes a pyramid shape. TSD 2804 includes a cone shape. TSD 2805 includes a game controller shape, such as may be used in accordance with the gaming system. The TSD 2805 having the game controller shape may include one or more of a button, a lever, a joystick, etc. Note that an active device, such as an e-pen 2806 may also be configured to interact with one or more TSDs.

Also, an overlay 2820, which may be implemented to have any particular desired shape may be used in conjunction with a TSD. For example, the overlay 2820 may be implemented to have any desired form or shape, such as that of the keyboard, keypad, a number pad, a mouse pad, a touch pad, a gaming board such as a chess or checkerboard, etc. Generally speaking, such an overlay may have any desired form. For example, when the overlay 2020 is placed on the TSD, a user can then interact with the overlay that is placed on the TSD to provide user input. Consider an example in which the overlay 2820 is that of a keyboard, then as the overlay 2820 is placed on the TSD, the user can interact with the overlay 2820 that is the keyboard to effectuate keyboard functionality via TSD. For example, the one or more processing modules of the TSD interprets user interaction with the TSD based on the portion of the TSD that is associated with the overlay 2820 as corresponding to user input provided via a keyboard.

Note that the overlay 2820 may be implemented using any of a variety of types of materials. Considering an example, the overlay 2820 may be implemented using a rigid material to provide tactile feedback and sensation to the user similar to how an actual keyboard provides to user. The overlay 2820 may include plastic buttons/keys similar to an actual keyboard such that, when the plastic buttons/keys are depressed by the user, they react similar to a keyboard as physically moving downward when selected by the user and returning to their original position when the user ceases contacting them. Considering another example, the overlay 2820 is implemented to include one or more actuators to provide feedback in the form of physical sensation to a user of the overlay 2820, such as providing a desired degree of movement of one or more portions of the overlay 2820 that may be felt by a user when interacting with the overlay 2820.

In even other examples, the overlay 2820 may include buttons/keys that implemented based on dome switches. In even other examples, the overlay 2820 may include buttons/ keys that implemented based on scissor-switch mechanisms. For example, any of a number of means may be used to implement buttons/keys of the overlay 2820 such as to provide audio output, such as a clicking sound, when the keys are depressed, in a manner that certain keywords do. For example, the overlay 2820 may be implemented using appropriate means to provide a desired amount of tactile, audio, etc. feedback to the user in accordance with providing a user experience when interacting with the overlay 2820 that is similar to that of an actual keyboard. In some examples, the overlay 2820 is a passive device that is configured to facilitate user interaction with the TSD in a particular manner corresponding to the form of the overlay 2820. For example, the overlay 2820 may be implemented using polymer material, plastic material, some type of dielectric material, etc. so that capacitive coupling from a user interacting with the overlay 2820 is detected by the TSD.

In certain examples, a TSD is implemented to detect location, position, placement, etc. of the overlay 2820, such as based on one or more marker electrodes, other conductive elements, conductive material included within a particular colored pigment used to form and/or print at least some portions of the overlay 2820 such as Titanium Oxide or other conductive material, etc. included within the overlay 2820. For example, consider an overlay 2820 that is formed and/or printed using a silicon material of the first color, such as white or clear color, compared to another overlay 2820 that is formed and/or printed using a silicon material of a second color, such as black. Such an overlay 2820 that is formed using one of the colors may include better conductive properties than an overlay 2820 that is formed using another one of the colors. In some examples, it may be preferable to use a particular color to form and/or print such an overlay 2820 facilitate better identification of the overlay 2820, including its location, position, placement, etc. by the TSD. For example, the perimeter of the overlay 2820 and/or the perimeters of respective keys of the overlay 2820 may be printed with a particular colored pigment to facilitate better conductivity and detection by the TSD. In some instances, the respective keys themselves are printed using one particular colored pigment that has a conductivity that is greater than portions of the overlay 2820 that do not correspond to keys. In such an instance, the TSD is configured to detect the arrangement of the respective keys of the overlay 2020.

As shown on the upper right-hand side of the diagram, with respect to reference numeral 2807, a TSD may be implemented as a lap desk that may be placed on a lap of the user who is sitting. Also, in certain alternative examples, one or more of an overlay, 3-D geometric objects, another TSD, etc. may be configured to facilitate user interaction with the TSD 2807 that is implemented as a lap desk.

The bottom of the diagram shows tables 2808 and 2809 that include one or more TSDs. For example, the surface of the table 2808 is implemented to include TSD functionality. For example, one or more electrodes of the TSD are implemented on the surface of the table. The table 2809 is implemented using multiple elements/sections, and one or more of these multiple elements/sections may include TSD functionality. In one example, each of the respective elements/sections of the top of the table 2809 includes TSD functionality. In another example, fewer than all of the elements/sections of the top of the table 2809 includes TSD functionality (e.g., the section implemented as a backing or rear barrier of the surface of the table 2809 may be implemented not to include TSD functionality).

Generally speaking, note that such TSD functionality may be included within any number of devices having any number of various shapes, forms, configurations, etc. These examples are representative and not exhaustive of all possible shapes, forms, configurations, etc. of devices that may be implemented to include TSD functionality. Generally speaking, one or more electrodes may be included within any desired object, element, etc. to provide TSD functionality for that object, elements, etc.

FIG. 28B is a schematic block diagram of other various embodiments of TSDs which may or may not include display functionality via a touchscreen display, an liquid crystal display (LCD) operable display, a light emitting diode (LED) operable display, and/or other visual output component in accordance with the present invention.

For example, table 2901 includes a curved surface such that it bends upwards at one end. Note that such a table may alternatively be implemented to include any number of non-flat shapes or surfaces such as a pyramid shaped portion extending upward, a dome portion extending upward, etc. such as in the middle or another location on the surface of the table. Alternatively, the surface of the table may include a wavy surface that flows up and down across the surface of the table. Table 2902 includes a wavy surface. Table 2903 includes multiple elements or sections and at least one has one or more 3-D geometric objects, which may or may not include TSD functionality, placed thereon. In some example, one or more of these 3-D geometric objects is made of glass or some other transparent material that may be illuminated by the table surface (e.g., when the table is implemented as a TSD that includes display functionality such as a touchscreen or with some other display or output functionality such as LEDs, etc.). In some examples, the one or more of these 3-D geometric objects is an active device includes an action figure type shape (e.g., in the form or a Disney character, a cartoon character, etc.) such that it receives data signal communication from the table (e.g., via capacitive coupling from electrodes in the table to electrodes in the action figure type shape, and the action figure type shape is may be interactive with a user of the table (e.g., include a speaker to provide audio output, include one or more actuators to effectuate mouth, hand, head, etc. movement, etc.).

In addition, note that the one or more 3-D geometric objects may be implemented to includes light pipes such it includes is configured to display information thereon such as based on light signals provided up from the table (e.g., when the table is implemented as a TSD that includes display functionality such as a touchscreen or with some other display or output functionality such as LEDs, etc.).

FIG. 29 is a schematic block diagram of various embodiments 2901 through 2904 of a 3-D geometric objects, which may or may not include TSD functionality, that is operative with a TSD in accordance with the present invention.

Embodiment 2901 includes a touch sensor device (TSD) 2910 that is configured to facilitate user interaction with a 3-D geometric object, shown in this example as a cone. The 3-D geometric object may or may not include TSD functionality. For example, consider embodiment 2904 in the upper right portion of the diagram as including a 3-D geometric object that does include TSD functionality, then a transmit identification (TX ID) signal may be transmitted from the 3-D geometric object, such as via one or more electrodes included within the 3-D geometric object, to convey one or more characteristics associated with the 3-D geometric object to the TSD 2910. For example, such one or more characteristics may include the identity, type, shape, form, functionality, function, capabilities, etc. of the 3-D geometric object to the TSD 2910. Such a TX ID signal may be implemented in any number of ways, such as including a particular frequency, signal pattern, packet content, and/or any other one or more characteristics that may be used to inform the TSD 2910 of the one or more characteristics associated with the 3-D geometric object.

Considering embodiment 2901 in the upper left portion of the diagram, as a user is interacting with the 3-D geometric object, the position and/or any motion of the 3-D geometric object may be detected by the TSD 2910. For example, as the user is interacting with the 3-D geometric object, such as placing it in a particular location, moving it in a particular manner, etc., the TSD 2910 is configured to detect the portion of the user's body, such as hand and/or fingers, in accordance with such user interaction. In some examples, the TSD 2910 is configured to detect touch, proximity, etc. of the portion of the user's body based on capacitive coupling of that portion of the user's body to one or more electrodes included within the TSD 2910. In other examples, the TSD 2910 is configured to detect location, movement, etc. of the 3-D geometric object itself, such as based on one or more marker electrodes, other conductive elements, conductive material included within pigment used to form and/or print at least some portions of the 3-D geometric object such as Titanium Oxide or other conductive material, etc. included within the 3-D geometric object. In even other examples, the TSD 2910 is configured to detect location, movement, etc. of the 3-D geometric object based on the 3-D geometric object including TSD functionality, such as with reference to embodiment 2904, where the 3-D geometric object is capable to transmit one or more signals to the TSD 2910.

Considering embodiment 2902 in the lower left portion of the diagram, the location, movement, etc. of an e-pen (e.g., based on being user-controlled) may be determined based on one or more signals being capacitively coupled from the e-pen to the TSD 2910 and/or one or more signals being capacitively coupled from the TSD 2910 to the e-pen. Any of a number of user-controlled effects may be detected by the e-pen and/or the TSD 2910. Examples of such effects may include motion, tilt, pressure, barrel rotation, etc. In addition, as a user controls position, location, movement, etc. of the e-pen, inking may be displayed on one or more display devices based on such user control of the e-pen. In some examples, the TSD 2910 self includes display functionality, and inking is displayed on the display of the TSD 2910 based on user control of the e-pen and interaction of the e-pen with the TSD 2910. In other examples, a display that is a separate element from the TSD 2910 displays inking there on based on communications from the TSD 2910 to the display that is a separate element from the TSD 2910 based on such user control of the e-pen.

Considering embodiment 2903 in the lower right portion of the diagram, multiple 3-D geometric objects are configured to facilitate user interaction with the TSD 2910 simultaneously, concurrently, etc. that is to say, more than one 3-D geometric object, whether the 3-D geometric object includes TSD functionality or not, may be interactive with the TSD 2910 simultaneously, concurrently, etc. such that user interaction with multiple 3-D geometric objects and the TSD 2910 can all be monitored and detected at the same time. For example, consider a user interacting with an e-pen using a left-hand and interacting with a 3-D geometric object in the shape of a cone using a right-hand. Such user interaction with both of the objects may be detected by the TSD 2910 at the same time.

FIG. 30 is a schematic block diagram of an embodiment 3000 of an overlay that is operative with a TSD in accordance with the present invention. In this diagram, and overlay 3020, which may be of any desired form, such as a keyboard, keypad, number pad, etc. and/or any other form, etc. is configured to be placed on a TSD 3010, as shown at the top of the diagram. As can be seen at the bottom of the diagram, consider the surface of the TSD 3010 prior to and after the overlay 3020 being placed thereon. After the overlay 3020 is placed on the surface of the TSD 3010, a first portion of the TSD 3010 is operative for an provision for user interaction with the TSD 3010 based on the overlay 3020. When the overlay 3020 is placed on the surface of the TSD 3010, the touch sensing functionality of that particular portion of the TSD 3010 is then provisioned to operate in accordance with the function associated with the overlay 3020. For example, consider that the overlay 3020 corresponds to that of the keyboard, then the touch sensing functionality of the TSD 3010 that is located under the overlay 3020 is then provisioned to detect user interaction with the TSD 3010 in accordance with operation of the keyboard that corresponds to the physical layout of the overlay 3020.

Any remaining portion of the TSD 3010 that does not include or is not associated with the overlay 3020 may be used for any one or more other purposes. For example, the remaining portion of the TSD 3010 may be operative for non-overlay functionality. For example, touch, proximity, etc. detection of user interaction may be performed using the remaining portion of the TSD 3010. In some examples, the sensitivity of the remaining portion of the TSD 3010 is unchanged after the overlay 3020 is placed on the first portion of the TSD 3010. In other examples, the sensitivity of the remaining portion of the TSD 3010 is modified (e.g., reduced sensitivity, increased sensitivity, disabled, etc.) after the overlay 3020 is placed on the first portion of the TSD 3010. In even other examples, the remaining portion of the TSD 3010 is disabled after the overlay 3020 is placed on the first portion of the TSD 3010.

FIG. 31 is a schematic block diagram of another embodiment 3100 of an overlay that is operative with a TSD in accordance with the present invention. This diagram has some similarities to the previous diagram with at least one difference being that more than one overlay is placed on a TSD 3110. For example, consider two separate overlays 3120 and 3122, which may be of any desired form, such as keyboards, keypads, number pads, etc. and/or any other forms, etc. are configured to be placed on a TSD 3110, as shown at the top of the diagram. Note that the overlays may be of different size, shape, form, function, etc. When the overlays 3120 and 3122 are placed on the surface of the TSD 3110, the touch sensing functionality of those particular portions of the TSD 3110 are then provisioned to operate in accordance with the function associated with the overlays 3120 and 3122. For example, the overlay 3120 may correspond to that of a keyboard, and the overlay 3122 may correspond to that of a number pad. Then, the touch sensing functionality of the TSD 3110 that is located under the overlay 3120 is then provisioned to detect user interaction with the TSD 3110 in accordance with operation of the keyboard that corresponds to the physical layout of the overlay 3120, and the touch sensing functionality of the TSD 3110 that is located under the overlay 3122 is then provisioned to detect user interaction with the TSD 3110 in accordance with operation of the number pad that corresponds to the physical layout of the overlay 3122.

As also described with respect to the previous diagram, any remaining portion of the TSD 3110 that does not include boys not associated with the overlays 3120 and 3122 may be used for one or more other purposes (e.g., non-overlay functionality, changed or unchanged sensitivity, disabled, etc.).

FIG. 32 is a schematic block diagram of an embodiment of 3200 an overlay and a 3-D geometric object, which may or may not include TSD functionality, that are both operative with a TSD in accordance with the present invention. This diagram has some similarities to the previous diagram with at least one difference being that an overlay 3220 as well as a $2^{nd}$ TSD/3-D geometric object 3212 are configured to facilitate user interaction with a TSD 3210. Again, the overlay 3220 may be of any desired form, such as the keyboard, keypad, number pad, etc.

The $2^{nd}$ TSD/3-D geometric object 3212, which may or may not include TSD functionality, is configured to facilitate user interaction with the TSD 3210. In one example, the $2^{nd}$ TSD/3-D geometric object 3212 is an active device that includes one or more electrodes that are coupled to one or more DSCs that service them, and the DSC are coupled to one or more processing modules. Based on user interaction with the $2^{nd}$ TSD/3-D geometric object 3212, the TSD 3210 is configured to detect location, movement, etc. of the $2^{nd}$ TSD/3-D geometric object 3212 based on that user interaction with it based on one or both of one or more signals being coupled and detected between the $2^{nd}$ TSD/3-D geometric object 3212 is an active device and the TSD 3210 and detection of one or more portions of the users body associated with the $2^{nd}$ TSD/3-D geometric object 3212 is an active device.

In another example, the $2^{nd}$ TSD/3-D geometric object 3212 is not an active device (e.g., a passive device), the TSD 3210 is configured to determine location, movement, etc. of the $2^{nd}$ TSD/3-D geometric object 3212 based on detection of one or more portions of the users body associated with the $2^{nd}$ TSD/3-D geometric object 3212.

In addition, the overlay 3220 is configured to facilitate user interaction with the TSD 3220 based on the characteristics of the overlay 3220, such as the type of the overlay 3220, the physical layout of the overlay 3220, the prescribed function of the overlay 3220 in accordance with user interaction therewith, etc.

In an example of operation and implementation, a TSD (e.g., TSD 3210 or any other TSD described herein or their equivalents) includes a plurality of TSD electrodes associated with a surface of the TSD. Also, an overlay that includes one or more marker electrodes also being associated with at least a portion of the surface of the TSD. The TSD also includes a plurality of drive-sense circuits (DSCs) operably coupled to the plurality of TSD electrodes. A DSC of the plurality of DSCs is operably coupled to receive a reference signal and to generate a TSD electrode signal based on the reference signal. For example, when enabled, the DSC operably coupled and configured to provide the TSD electrode signal to a TSD electrode of the plurality of TSD electrodes and simultaneously to sense a change of the TSD electrode signal based on a change of impedance of the TSD electrode caused by capacitive coupling between the TSD electrode and the one or more marker electrodes based on the overlay being associated with the at least a portion of the surface of the TSD. The DSC is also operably coupled and configured to generate a digital signal that is representative of the change of impedance of the TSD electrode.

The TSD also includes and/or is coupled to memory that stores operational instructions. The TSD also includes one or more processing modules operably coupled to the plurality of DSCs and the memory. For example, when enabled, the one or more processing modules is configured to execute the operational instructions to generate the reference signal and to process the digital signal to determine one or more characteristics of the overlay that is associated with the at least a portion of the surface of the TSD.

In certain examples, another DSC of the plurality of DSCs is operably coupled to receive another reference signal and to generate another TSD electrode signal based on the other reference signal. When enabled, the other DSC operably coupled and configured to provide the other TSD electrode signal to another TSD electrode of the plurality of TSD electrodes that is implemented within the at least a portion of the surface of the TSD with which the overlay is associated and simultaneously to sense a change of the other TSD electrode signal based on a change of impedance of the other TSD electrode caused by a proximal touch to the at least a portion of the surface of the TSD with which the overlay is associated. The DSC is also operably coupled and configured generate another digital signal that is representative of the change of impedance of the other TSD electrode.

The one or more processing modules, when enabled, is further configured to execute the operational instructions to generate the other reference signal and to process the other digital signal to determine location of the proximal touch to the at least a portion of the surface of the TSD with which the overlay is associated.

In certain examples, the one or more processing modules, when enabled, is further configured to execute the operational instructions to determine user interaction with a portion of the overlay based on the location of the proximal touch to the at least a portion of the surface of the TSD with which the overlay is associated. Also, the one or more processing modules is further configured to generate an output signal that is representative of the user interaction with the portion of the overlay and transmit the output signal to a computing device to be interpreted by the computing device as user input.

Examples of the one or more characteristics of the overlay may include any one or more of an outline of the overlay, locations of keys of the overlay, a location of the overlay on the surface of the TSD, location of the one or more marker electrodes within the at least a portion of the surface of the TSD, a pattern of the one or more marker electrodes, a function of the overlay, a type of the overlay, and/or an orientation of the overlay.

Also, in certain examples, the TSD is a portable device that includes an internal power source (e.g., such as with respect to FIG. 36).

Also, in some implementations of the TSD, note that the plurality of TSD electrodes includes a first subset of the plurality of TSD electrodes aligned in a first direction and a second subset of the plurality of TSD electrodes that are separated from the first subset of the plurality of TSD electrodes by a dielectric material and are aligned in a second direction.

In addition, in some examples, the TSD includes multiple sections (e.g., such as certain TSDs including depicted in FIGS. 27, 28, 34, 40, among others). The TSD has a first shape when the multiple sections are implemented within a first configuration, and the TSD has a second shape when the multiple sections are implemented within a second configuration. Also, note that certain implementations of the TSD include a non-flat surface and/or curved surface (e.g., such as certain TSDs including depicted in FIG. 27, among others).

In addition, note that the DSC of the plurality of DSCs may be implemented in a variety of ways. In certain examples, the DSC includes a power source circuit operably coupled via a single line to the TSD electrode. When enabled, the power source circuit is configured to provide an analog signal via the single line coupling to the TSD electrode. Note that the analog signal includes at least one of a DC (direct current) component or an oscillating component. The DSC also includes a power source change detection circuit operably coupled to the power source circuit. When enabled, the power source change detection circuit is configured to detect an effect on the analog signal that is based on an electrical characteristic of the TSD electrode and to generate the digital signal that is representative of the change of impedance of the TSD electrode.

Also, in certain particular examples, the power source circuit includes a power source to source at least one of a voltage or a current via the single line to the TSD electrode. Also, the power source change detection circuit includes a power source reference circuit configured to provide at least one of a voltage reference or a current reference, and a comparator configured to compare the at least one of the voltage and the current provided via the single line to the TSD electrode to the at least one of the voltage reference and the current reference to produce the analog signal.

In another example of operation and implementation, a TSD (e.g., TSD 3210 or any other TSD described herein or their equivalents) includes a first plurality of TSD electrodes aligned in a first direction and a second plurality of TSD electrodes aligned in a second direction. Note that the first plurality of TSD electrodes and the second plurality of TSD electrodes associated with a surface of the TSD, and an overlay that includes one or more marker electrodes is also associated with at least a portion of the surface of the TSD.

The TSD includes a plurality of drive-sense circuits (DSCs) operably coupled to the first plurality of TSD electrodes and the second plurality of TSD electrodes. A first DSC of the plurality of DSCs is operably coupled to receive a first reference signal and to generate a first TSD electrode signal based on the first reference signal. When enabled, the first DSC operably coupled and configured to provide the first TSD electrode signal to a first TSD electrode of the first plurality of TSD electrodes and simultaneously to sense a change of the first TSD electrode signal based on a change of impedance of the first TSD electrode caused by capacitive coupling between the first TSD electrode and the one or more marker electrodes based on the overlay being associated with the at least a portion of the surface of the TSD. The first DSC is also operably coupled and configured to generate a first digital signal that is representative of the change of impedance of the first TSD electrode.

A second DSC of the plurality of DSCs is operably coupled to receive a second reference signal and to generate a second TSD electrode signal based on the second reference signal. When enabled, the second DSC operably coupled and configured to provide the second TSD electrode signal to a second TSD electrode of the second plurality of TSD electrodes and simultaneously to sense a change of the second TSD electrode signal based on a change of impedance of the second TSD electrode caused by capacitive coupling between the second TSD electrode and the one or more marker electrodes based on the overlay being associated with the at least a portion of the surface of the TSD. The second DSC is also operably coupled and configured to generate a second digital signal that is representative of the change of impedance of the second TSD electrode.

The TSD also includes and/or is coupled to memory that stores operational instructions. The TSD includes one or more processing modules operably coupled to the plurality of DSCs and the memory. When enabled, the one or more processing modules is configured to execute the operational instructions to generate the first reference signal and the second reference signal, and process the first digital signal and the second digital signal to determine one or more characteristics of the overlay that is associated with the at least a portion of the surface of the TSD.

In certain examples, a third DSC of the plurality of DSCs is operably coupled to receive a third reference signal and to generate a third TSD electrode signal based on the third reference signal. When enabled, the third DSC operably coupled and configured to provide the third TSD electrode signal to a third TSD electrode of the first plurality of TSD electrodes and simultaneously to sense a change of the third TSD electrode signal based on a change of impedance of the third TSD electrode caused by a proximal touch to the at least a portion of the surface of the TSD with which the overlay is associated. The third DSC is also operably coupled and configured to generate a third digital signal that is representative of the change of impedance of the third TSD electrode.

Also, a fourth DSC of the plurality of DSCs is operably coupled to receive a fourth reference signal and to generate a fourth TSD electrode signal based on the fourth reference signal. When enabled, the fourth DSC operably coupled and configured to provide the fourth TSD electrode signal to a fourth TSD electrode of the second plurality of TSD electrodes and simultaneously to sense a change of the fourth TSD electrode signal based on a change of impedance of the fourth TSD electrode caused by the proximal touch to at least a portion of the surface of the TSD with which the overlay is associated. The fourth DSC operably coupled and configured to generate a fourth digital signal that is representative of the change of impedance of the fourth TSD electrode.

The TSD also includes and/or is coupled to memory that stores operational instructions. The TSD includes one or more processing modules operably coupled to the plurality of DSCs and the memory. When enabled, the one or more processing modules is configured to execute the operational instructions to generate the third reference signal and the fourth reference signal and to process the third digital signal and the fourth digital signal to determine location of the proximal touch to the at least a portion of the surface of the TSD with which the overlay is associated.

FIG. 33 is a schematic block diagram of various embodiments 3301, 3302, 3303, and 3304 of overlays and 3-D geometric objects, which may or may not include TSD functionality, including marker electrodes that facilitate identification, location determination, and mapping of the overlays by a TSD in accordance with the present invention.

Generally speaking, marker electrodes implemented in a non-symmetric or asymmetrical manner are preferred as to facilitate easier recognition of the marker electrodes themselves and a pattern that may be differentiated form other patterns, to determine orientation, position, etc.

Generally speaking, with respect to any overlay, 3-D geometric object, etc., one or more characteristics thereof may be used for identification of the overlay, 3-D geometric object, etc. by a TSD. For example, such an overlay, 3-D geometric object, etc. is implemented to include one or more marker electrodes 3310 to be used in accordance with facilitating identification of one or more characteristics of the overlay, 3-D geometric object, etc. Examples of such one or more characteristics of the overlay, 3-D geometric object, etc. may include the identity, type, shape, form, location, position, alignment, functionality, function, capabilities, etc.

For example, based on capacitive coupling between one or more marker electrodes 3310 of the overlay, 3-D geometric object, etc. and one or more electrodes of a TSD, the TSD is configured to identify the location of those one or more marker electrodes 3310 to determine one or more characteristics associated with the overlay, 3-D geometric object, etc. For example, one or more processing modules of the TSD is configured to interpret information provided from one or more DSCs that are coupled to the one or more electrodes of the TSD that experience capacitive coupling with the one or more marker electrodes 3310 of the overlay, 3-D geometric object, etc. Different respective arrangements, patterns, etc. of marker electrodes 3310 may be used to differentiate different respective overlays, 3-D geometric objects, etc. For example, the marker electrodes 3310 may be of any desired shape, length, thickness, etc. In some examples, one of the marker electrodes is a rectangular shaped conductive material. In other examples, a marker electrode is a circular shaped conductive material. And yet another example, a marker electrode is a straight conductor of a particular thickness.

For example, information corresponding to arrangement, pattern, etc. of one or more marker electrodes 3310 associated with various overlays, 3-D geometric objects, etc. is stored within memory, a lookup table, a server, etc., that is accessible by one or more processing modules of a TSD. Based on detection of the particular one or more marker electrodes 3310 associated with the overlay, 3-D geometric object, etc. including their arrangement, pattern, etc., the one or more processing modules of the TSD is operative to determine whether those one or more marker electrodes 3310 compare favorably to the information. Based on favorable comparison, the one or more processing modules of the TSD is configured to determine which particular overlay, 3-D geometric object, etc. is within proximity to the TSD. Based on unfavorable comparison, one or more processing modules the TSD is configured to determine that the overlay, 3-D geometric object, etc. that is within proximity of the TSD may not be properly determined or identified. In some examples, the TSD provides some indication to a user of the TSD, such as via some form of visual output, audio output, error message, etc. that may be interpreted by a user of the TSD indicating that the overlay, 3-D geometric object, etc. has not been properly identified.

Reference numeral 3301 at the upper left-hand portion of the diagram includes an overlay or a portion of a 3-D geometric object and includes marker electrodes 3310. The marker electrodes are arranged at particular locations in such that two of the marker electrodes 3310 are separated by a distance W1, and rows of the marker electrodes 3310 are separated by distances H1 and H2. Based on the particular locations, separations, etc. of these marker electrodes 3310 that are determined based on processing of signals provided from DSCs of the TSD that experience capacitive coupling with the marker electrodes 3310, one or more processing modules of the TSD is configured to perform a number of functions. The TSD is configured to identify the locations of the respective marker electrodes to determine the location of the overlay, 3-D geometric object, etc. that includes the marker electrodes 3310. In addition, the TSD is configured to determine the one or more characteristics of the overlay, 3-D geometric object, etc. (e.g., identity, type, shape, form, location, position, alignment, functionality, function, capabilities, etc.). In addition, in some examples, the TSD is also configured to adapt operation of the TSD appropriately corresponding to the region or regions of the TSD that are within proximity of the overlay, 3-D geometric object, etc.

Generally speaking, note that the marker electrodes 3310 may be implemented in any of a variety of ways. For example, considering reference numeral 3302, marker electrodes 3310 have approximately a similar spatial arrangement to those with respect to reference numeral 3301, with at least one difference being that at least some of the marker electrodes 3310 are of larger size and different shape than other of the marker electrodes 3310. For example, the upper right-hand and lower left-hand marker electrodes 3310 with respect to the reference numeral 3302 are shown as being much larger and oblong in shape. Based on the particular characteristics of the marker electrodes 3310 of this embodiment 3302, the TSD is configured to determine the one or more characteristics of the overlay, 3-D geometric object, etc. (e.g., identity, type, shape, form, location, position, alignment, functionality, function, capabilities, etc.). Note that the particular spatial arrangement of any one or more marker electrodes 3310 may be implemented in any of a variety of ways, including marker electrodes 3310 that form some type of pattern. In addition, note that the particular arrangement of one or more marker electrodes 3310 may be used to determine whether or not an overlay, 3-D geometric object, etc. is appropriately placed on or within appropriate proximity and alignment to a TSD. For example, an overlay, 3-D geometric object, etc. may be intended to have a particular upright position, and an appropriately selected arrangement of marker electrodes 3310 may be used to facilitate determination whether or not the overlay, 3-D geometric object, etc. it is in fact properly placed, align, etc.

For example, consider reference numeral 3303 at the bottom left-hand portion of the diagram, marker electrodes 3310 are arranged forming an asymmetric shape formed by straight and curved conductors substantially located within the middle of the overlay, 3-D geometric object, etc. Note that any desired shape may alternatively be used to facilitate determination of one or more characteristics of the overlay, 3-D geometric object, etc. Examples of alternative shapes may include a star, a circle, square, a FIG. 8 pattern, and/or any other particular shape. Again, generally speaking, marker electrodes implemented in a non-symmetric or asymmetrical manner are preferred as to facilitate easier recognition of the marker electrodes themselves and a pattern that may be differentiated form other patterns, to determine orientation, position, etc. In addition, note that multiple respective shapes of similar word different size, characteristic, etc. made also be used to facilitate determination of the one or more characteristics of the overlay, 3-D geometric object, etc.

In addition, consider reference numeral 3304 at the bottom right-hand portion of the diagram, marker electrodes 3310 may be implemented with respect to any one or more portions of an overlay 3320, which may be of any of a variety of types (e.g., keyboard, keypad, number pad, etc.). For example, one or more marker electrodes 3310 may be implemented corresponding to any one or more of the keys of the overlay 3320. In addition, note that the respective one or more marker electrodes 3310 may be of similar shape, different shape, etc. Also, marker electrodes implemented in a non-symmetric or asymmetrical manner are preferred as to facilitate easier recognition of the marker electrodes themselves and a pattern that may be differentiated form other patterns, to determine orientation, position, etc.

Note that the material conductivity of the overlay 3320 may be selected such that one or more processing modules of the TSD is operative to determine the contour, shape, outline, etc., overlay 3320 that is within proximity to the TSD. For example, certain conductive material may be included within the pigment that is used to color the overlay 3320. For example, titanium dioxide may be included within the pigment to facilitate capacitive coupling of one or more portions of the overlay 3322 one or more electrodes of a TSD. Generally speaking, when one or more of the keys of the overlay 3320 includes one or more elements element to facilitate capacitive coupling between the overlay 3320 and the one or more electrodes of the TSD, the pattern of which particular one or more keys of the overlay 3320 includes one or more elements may take on any desired form. For example, the corners of the overlay 3320 may be used, every other key of the overlay 3320 may include such elements, every third key of the overlay 3320 may include such elements, etc. In addition, as described above with respect to another overlay, the overlay 3320 may be implemented using appropriate means to provide a desired amount of tactile, audio, etc. feedback to the user in accordance with providing a user experience when interacting with the overlay 3320 that is similar to that of an actual keyboard.

Generally speaking, the use of marker electrodes 3310 within an overlay, 3-D geometric object, etc. provides a means by which a TSD is configured to detect the orientation, configuration, position, function, etc. of the overlay, 3-D geometric object, etc. Based on the conductivity of the marker electrodes 3310, including capacitive coupling between them and one or more electrodes of the TSD, a particular impedance (Z) signature that is based on the marker electrodes 3310 may be determined by one or more processing models of the TSD. This Z signature may be used to determine the one or more characteristics of the overlay, 3-D geometric object, etc. (e.g., identity, type, shape, form, location, position, alignment, functionality, function, capabilities, etc.).

FIG. 34 is a schematic block diagram of various embodiments 3401, 3402, 3403, and 3404 of 3-D geometric objects, which may or may not include TSD functionality, including marker electrodes that facilitate identification, location determination, and mapping of the overlays by a TSD in accordance with the present invention.

Reference numeral 3401 at the upper left hand portion of the diagram shows a 3-D geometric object in the shape of a cone that includes marker electrodes 3310 that are aligned vertically along the length of the cone shape. This arrangement of marker electrodes 3310 in this particular manner is a particular Z signature 3411 that may be determined by one or more processing modules of a TSD based on capacitive coupling between these marker electrodes 3310 and one or more electrodes of the TSD.

Reference numeral 3402 at the upper right hand portion of the diagram shows a 3-D geometric object also in the shape of a cone that includes marker electrodes 3310, except the marker electrodes 3310 of this embodiment 3402 are arranged horizontally around the length of the cone shape. This arrangement of marker electrodes 3310 in this particular manner is a particular Z signature 3412 that is different than the Z signature 3411 that may be determined by one or more processing modules of a TSD based on capacitive coupling between these marker electrodes 3310 and one or more electrodes of the TSD and may be used to differentiate between the 3-D geometric objects in the shape of a cone within the embodiments 3401 and 3402. For example, while the shape of the 3-D geometric objects in the embodiments 3401 and 3402 may be of similar shape, they may have different identity, function, etc. For example, a TSD is configured to interpret user interaction with respect to the 3-D geometric objects in the embodiments 3401 and 3402 differently. Consider an example in which the 3-D geometric object of embodiments 3401 is intended to facilitate user interaction based as a joystick, and the 3-D geometric object of embodiments 3402 is intended to facilitate user interaction based as a game piece. Providing a means by which different respective Z signatures can be provided even to similarly shaped 3-D geometric objects provides the ability for a TSD to interact respect to similarly shaped 3-D geometric objects differently and for different functions, purposes, etc.

Reference numeral 3403 at the bottom left hand portion of the diagram shows a 3-D geometric shape including one surface that is substantially square in shape and having a particular thickness. Marker electrodes 3310 are implemented on this surface of the 3-D geometric shape. Depending on the arrangement of the marker electrodes 3310, this 3-D geometric shape has a particular Z signature 3413a when upright, and a different Z signature 3413b when upside down. As can be seen, the Z signature of the 3-D geometric shape is based on the orientation of the 3-D geometric shape based on the arrangement of the marker electrodes 3310.

Reference numeral 3404 at the bottom right hand portion of the diagram shows a multi-section 3-D geometric object including multiple sections (e.g., 2 or more) of the 3-D geometric object shown with reference to reference numeral 3403 that are stacked one on top of each other. Note that different respective marker electrodes 3310 may be included within one or more of the sections of the 3-D geometric object, and they may have same or different arrangements within the different respective sections. This multi-section 3-D geometric shape has a corresponding Z signature 3414 based on the respective marker electrodes 3310 that are included within the multiple sections thereof, their respective arrangement, etc. Note also that this multi-section 3-D geometric shape will have different respective Z signatures based on the multi-section 3-D geometric shape being in different orientations (e.g., upright, upside down, laying on one particular side versus another side, etc.).

FIGS. 35A and 35B are schematic block diagrams of other various embodiments 3501, 3502, 3503, 3504, 3505, 3506, 3507, and 3508 of overlays including marker electrodes that facilitate identification, location determination, and mapping of the overlays by a TSD in accordance with the present invention.

As mentioned above with respect to different embodiments, examples, of overlays, one or more of the keys of the overlay 3320 may be implemented to include one or more elements element to facilitate capacitive coupling between the overlay and the one or more electrodes of the TSD.

These embodiments 3501, 3502, 3503, 3504, 3505, and 3506 illustrate various ways by which such elements may be implemented within the keys of an overlay. Generally speaking, an overlay having a general form of a keyboard is used for illustration in these embodiments 3501, 3502, 3503, 3504, 3505, and 3506. However, note that such an overlay may generally have any desired form including more or fewer keys in similar or different arrangements as shown here.

Reference numeral 3501 at the upper left hand portion of the diagram shows marker electrodes 3310 included within every key of an overlay. Reference numeral 3502 at the upper right hand portion of the diagram shows marker electrodes 3310 being included only within the corner keys of an overlay.

Reference numeral 3503 at the bottom left hand portion of the diagram shows marker electrodes 3310 being included in accordance with a checkerboard pattern of the keys of an overlay. Reference numeral 3504 at the bottom right hand portion of the diagram shows marker electrodes 3310 being included in accordance with another pattern 1 that substantially includes columns of marker electrodes 3310.

Within FIG. 35B, reference numeral 3505 at the upper left hand portion of the diagram shows marker electrodes 3310 being included in accordance with another pattern 2 that includes four marker electrodes 3310 on the left-hand side and the right hand side of the overlay, in the top and bottom rows of keys, and four other marker electrodes 3310 offset with respect to columns of keys substantially located in the center of the overlay. Reference numeral 3506 at the upper right hand portion of the diagram shows marker electrodes 3310 being included around the perimeter of the keys of the overlay.

Reference numeral 3507 at the lower left hand portion of the diagram shows marker electrodes 3310 being implemented using to curved electrodes of a particular thickness arranged as shown. Reference numeral 3508 at the lower right hand portion of the diagram shows marker electrodes 3310 being implemented as rectangular shapes arranged such that one is horizontal and the other is diagonal, each being of different respective thicknesses. These diagrams show examples that include marker electrodes 3310 that are not implemented particularly with respect to the keys of the overlay. Generally speaking, the marker electrodes may be of any shape, style, size, etc. such as any desired mixture of rectangular shape, square shaped, circular shape, triangular shape, etc., including circle-shaped electrodes that have a void in the middle such as in the shape of the doughnut, etc.

In addition, note that if an overlay is implemented as an active device, such as including TSD functionality, the overlay is configured to be programmable such that it can provide signaling that is detected by the TSD on which such an active device overlay is placed. For example, an active device overlay provides very low level voltage signals that are detected by the TSD on which it is placed. In another example, an active device overlay energizes one or more marker electrodes 3310 thereby changing one or more electrical characteristics thereof to effectuate any desired pattern that may be detected by the TSD in which the active device overlay is placed.

In addition, different desired human interface device (HID) protocols may be used for different types of overlays. For example, a first HID protocol is used for keyboard, second HID protocol is used for a touchpad, etc.

In certain embodiments, note that a virtual overlay may be implemented by a TSD with display functionality, such as when the TSD is implemented as a touchscreen, such that a window opens on the touchscreen and displays the virtual overlay, whether it be a keyboard, a number pad, a gameboard, etc., and the user is able to interact with the portion of the touchscreen that displays the virtual overlay. In an example of operation and implementation, when a user interacts with the TSD in a certain manner, such as spreading two fingers apart on the touchscreen, or when the user draws a particular shape on the touchscreen, such a virtual overlay is then displayed within that particular region of the touchscreen.

In another example of operation and implementation, when a TSD is implemented with display functionality, such as when the TSD is implemented as a touchscreen, when an overlay is placed on the surface of the TSD, for certain types of overlays, such as a keyboard, touchscreen will display a virtual operational space at one or more locations near the overlay. Examples of such a virtual operational space may be a virtual keyboard, a virtual touchpad, a virtual number pad, etc. that may be used in conjunction with the overlay.

Consider the overlay being configured to effectuate the function of a keyboard when operating with the TSD. Based on the overlay being placed on the touchscreen, then a virtual operational space, number pad (e.g., a 10 or 12-key number pad) is displayed to the right of the overlay (or alternatively to the left of the overlay if desired, such as to accommodate a left-handed user). In addition, different respective virtual operational spaces, such as different dialog boxes or any of a variety of applications including audio control, brightness control, mute/un-mute, etc., windows for various software operating on the TSD and/or a computing device in communication with the TSD, media players, control bars, touchpad, sliders, function keys, calculators of any desired functionality whether basic functionality or scientific higher capability functionality, etc. may be opened on the touchscreen and implemented to operate cooperatively with such overlays. For example, one or more hotkeys, function keys, etc. could be opened at one or more desired locations around or near the overlay.

Generally speaking, any desired pattern of marker electrodes 3310 may be implemented with respect to one or more keys of the overlay to facilitate identification of one or more characteristics of the overlay by one or more processing modules of a TSD that is within contact to or within proximity of the overlay. Note also that appropriate arrangement of one or more marker electrodes 3310 may be used to determine whether or not the overlay is upright or upside down, based on the orientation and/or configuration of the overlay on or within proximity to the TSD. Also, note that any desired type of overlay may be implemented including various types of keyboards (e.g., QWERTY, AWERTY, AT, Dvorak, and/or any other mapping of keys on a keyboard, etc.), various types of number pads (e.g., numbers 7 8 9 top row, followed by numbers 4 5 6 next from top row, etc.), etc.

Based on the particular pattern of marker electrodes 3310 within a particular overlay, one or more processing modules of the TSD is configured to determine the one or more characteristics of the overlay (e.g., identity, type, shape, form, location, position, alignment, functionality, function, capabilities, etc.). In addition, the one or more processing modules of the TSD is configured to adapt operation of at least a portion of the TSD that is in contact with, in proximity with, or associated with the overlay to facilitate user interaction with the overlay and to interpret the user interaction with the overlay.

For example, when the TSD to determines the one or more characteristics of the overlay (e.g., identity, type, shape, form, location, position, alignment, functionality, function, capabilities, etc.), the TSD is then configured to interpret user interaction with the TSD within the location of the TSD that is associated with the overlay to interpret the user interaction with the overlay. The TSD is configured to detect user interaction with the TSD than the location of the TSD that is associated with the overlay, such as fingers of the user capacitively coupling through the overlay to the one or more electrodes of the TSD and interpreting the locations, timing, sequence, etc. of the capacitive coupling of the fingers of the user in the locations that corresponded to keys based on the physical layout of the overlay to determine which letters, numbers, symbols, characters, functions, etc. are being selected, and in which order, by the user. The one or more processing modules of the TSD is configured to generate output corresponding to the user interaction with the TSD in accordance with the overlay.

For example, considering the overlay to be a keyboard, the TSD is configured to detect capacitive coupling through the overlay to the one or more electrodes of the TSD and interpreting the locations, timing, sequence, etc. of the capacitive coupling of the fingers of the user in the locations that corresponded to keys based on the physical layout of the overlay to determine what particular information the user is typing, and to generate output corresponding to that particular information. Such output corresponding to that particular information may be provided to any one or more output devices such as a display, monitor, television, a smart phone, tablet, a text to audio converter output device, a text to video converter output device, etc., and/or transmitted via one or more communication systems to be stored within memory, a database, a server, etc., and/or provided to one or more other computing devices to undergo processing such as in accordance with normal network processing, machine learning, etc.

FIG. 36 is a schematic block diagram of various embodiments 3501, 3602, 3603, 3604, and 3605 of TSDs including communication functionality, power sourcing, and/or controller functionality in accordance with the present invention.

Reference numeral 3601 at the upper left hand portion of the diagram shows a touch sensor device (TSD) 3610, with or without display functionality, that includes processing modules 42, which may include and/or be coupled to memory that stores one or more operational instructions to be executed by the one or more processing modules 42. The one or more processing modules 42 are coupled to one or more DSCs 28, as shown via a coupling which may have up to x pathways respectively connecting to respective DSCs 28, where x is a positive integer greater than or equal to 1. The one or more DSCs 28 are coupled to one or more electrodes 85, as shown via a coupling which may have up to y pathways respectively connecting to respective DSCs 28, where y is a positive integer greater than or equal to 1. In some examples, x=y, and in other examples, x and y have different values. For example, there may be instances in which a DSC 28 is operative to service more than one electrode 85, such as in accordance with the time multiplex implementation such that a first electrode 85 is serviced by the DSC 28 at a first time, a second electrode 85 the service by the DSC 28 at a second time, and so on. The electrodes 85 of the TSD 3610 may be appointed in accordance with any desired pattern, which may include first electrodes 85 implemented in a first direction and second electrodes 85 implemented in a second direction such that capacitive coupling may be effectuated between the first electrodes 85 in the second electrodes 85 in accordance with cross-point detection to determine location of user interaction with respect to the electrodes 85. For example, one or more DSCs 28 are implemented to mutual signaling such as signals being transmitted from the one or more DSCs 28 via the first electrodes 85 and, after being capacitively coupled into the second electrodes 85, that mutual signaling is detected by one or more DSCs 85 coupled to via the second electrodes 85. In other examples, one or more of the electrodes 85 of the TSD 3610 is implemented as a button, a pad, and/or any other feature that may be used to facilitate proximity, touch, user interaction, etc. of the user with the one or more electrodes 85 based on them being serviced by one or more DSCs 28.

Reference numeral 3602 at the upper middle portion of the diagram shows the TSD 3612 that includes an internal power source 2810, such as a battery. Such a TSD 3612 may be implemented in accordance with the mobile device, such as a laptop computer, smart phone, but tablet, a personal digital assistant (PDS), etc. and/or any other device that includes an internal power source.

Reference numeral 3603 at the upper right hand portion of the diagram shows a TSD 3614 that includes an external power source interface 2812. For example, external power source interface 2812 is implemented to interface with AC power, such as via a wall charging device. In some examples, the TSD 3614 also includes an internal power source 2810, such as a battery. In certain implementations, the external power source interface 2812 is operative to facilitate charging of the internal power source 2810, which may be implemented as a rechargeable internal power source (e.g., a lithium ion battery, some other type of rechargeable battery, an energy storage capacitor, or some other rechargeable internal power source, etc.).

Reference numeral 3604 at the middle right hand portion of the diagram shows a TSD 3616 that is configured to communicate with one or more tethered external controllers via tether(s). Reference numeral 3605 at the bottom left hand portion of the diagram shows a TSD 3618 that is configured to communicate with one or more wireless external controllers via wireless communications. In some examples, note that the one or more tethered external controllers and/or the one or more wireless external controllers are configured to communicate with one or more other computing devices 12 and/or one or more other processing modules 42, such as may be implemented within the one or more computing devices 12 (e.g., via wired, wireless, optical, etc. communication means).

Note that the external controllers, whether tethered or wireless, may be implemented to include one or more DSCs integrated therein to facilitate user interaction with one or more buttons, electrodes, etc. that may be included within the external controllers. In these embodiments 3604 and 3605, the external controllers include communication capability to communicate with the one or more other computing devices 12 and/or the one or more other processing modules 42. However, in certain implementations, note that the TSDs 3616 and 3618 may also include mitigation communication capability to communicate with the one or more other computing devices 12 and/or the one or more other processing modules 42. Examples of TSDs that includes such communication capability are described with respect to certain of the following certain of the following diagrams.

FIG. 37A is a schematic block diagram of an embodiment 3701 of a communication system including a TSD in accordance with the present invention. This diagram shows communication between computing device 12-37a and/or processing module(s) and a touch sensor device (TSD)(with or without display functionality) 3710. A TSD 3710 is in communication with computing device 12-37a (and/or any number of other computing devices) via one or more transmission media. The TSD 3710 includes a communication interface 3760 configured to perform transmitting and/or receiving of at least one signal, symbol, packet, frame, etc. (e.g., using a transmitter (TX) 3762 and a receiver (RX) 3764).

Generally speaking, the communication interface 3760 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the TSD 3710 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the TSD 3710 also includes one or more processing module(s) 42 and either an associated memory that is included within the TSD 3710 or is coupled to the one or more processing module(s) 42 of the TSD 3710, to execute various operations including interpreting at least one signal, symbol, packet, and/or frame transmitted to computing device 12-37a and/or received from the computing device 12-37a. The TSD 3710 and computing device 12-37a may be implemented using at least one integrated circuit in accordance with any desired configuration or combination of components, modules, etc. within at least one integrated circuit. In certain examples, note that the computing device 12-37a includes one or more processing module(s) 42 and included memory and/or that are coupled to memory. Also, in certain examples, the computing device 12-37a also includes a communication interface 3760 providing similar functionality to the communication interface 3760 included in the TSD 3710.

Also, in some examples, note that one or more of the processing module(s) 42, the communication interface 3760 (including the TX 3762 and/or RX 3764 thereof), and/or the memory may be implemented in one or more "processing modules," "processing circuits," "processing circuitry," "processors," and/or "processing units" or their equivalents. Considering one example, a system-on-a-chip (SOC) is implemented to include the processing module(s) 42, the communication interface 3760 (including the TX 3762 and/or RX 3764 thereof), and the memory (e.g., a SOC being a multi-functional, multi-module integrated circuit that includes multiple components therein). Considering another example, a processing-memory circuitry may be implemented to include functionality similar to both the processing module(s) 42 and the memory (e.g., when the memory is included within the processing module(s) 42) yet the communication interface 3760 is a separate circuitry (e.g., processing-memory circuitry is a single integrated circuit that performs functionality of processing circuitry and a memory and is coupled to and also interacts with the communication interface 3760).

Considering even another example, two or more processing circuitries may be implemented to include the processing module(s) 42, the communication interface 3760 (including the TX 3762 and/or RX 3764 thereof), and/or the memory. In such examples, such a "processing circuitry" or "processing circuitries" (or "processor" or "processors") is/are configured to perform various operations, functions, communications, etc. as described herein. In general, the various elements, components, etc. shown within the TSD 3710 may be implemented in any number of "processing modules," "processing circuits," "processing circuitry," "processors," and/or "processing units" (e.g., 1, 2, . . . , and generally using N such "processing modules," "processing circuits," "processors," and/or "processing units", where N is a positive integer greater than or equal to 1).

In some examples, the TSD 3710 includes both processing module(s) 42, the communication interface 3760 configured to perform various operations. In other examples, the TSD 3710 includes a SOC configured to perform various operations. In even other examples, the TSD 3710 includes processing-memory circuitry (e.g., with memory included within the processing module(s) 42) configured to perform various operations. Generally, such operations include generating, transmitting, etc. signals intended for one or more other devices (e.g., computing device 12-37a and/or other processing module(s) 42) and receiving, processing, etc. other signals received for one or more other devices (e.g., computing device 12-37a and/or other processing module(s) 42).

In some examples, note that the communication interface 3760, which is coupled to the processing module(s) 42, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the TSD 3710 may be communicated via any of these types of communication systems.

In addition, the processing module(s) 42 is coupled to one or more drive-sense circuit (DSCs) 28 as described herein. For examples, the processing module(s) 42 is coupled to one or more DSCs 28 via one or more lines, shown as x, where x is a positive integer greater than or equal to 1. The one or more DSCs 28 is implemented to interact with one or more electrodes 85, shown as y, where y is a positive integer greater than or equal to 1. In certain examples, note that x=y. In other examples, x and y are different numbers, such that x and y are positive integers and may be the same or different valued positive integers. In some examples, a single DSC 28 is implemented in a multiplexed fashion to service more than one DSC 28 (e.g., a first DSC 28 at a first time, a second DSC 28 at a second time, etc.). Note that the DSC 28 is configured to perform simultaneous driving and sensing of signals provided to the one or more electrodes 85.

FIG. 37B is a schematic block diagram of another embodiment 3702 of a communication system including a TSD in accordance with the present invention. This diagram is similar to the prior diagram with the exception that a TSD 3712 (that includes similar components as the TSD 3710 of the prior diagram) is implemented to support wireless communications with computing device 12-37b and/or other processing module(s) 42 using a communication interface 3762 implemented to support wireless communications. For example, this diagram shows communication between computing device 12-37b and/or other processing module(s) and TSD 3712 that are implemented as wireless communication devices. Also, the computing device 12-37b and TSD 3712 may each include one or more antennas for transmitting and/or receiving of at least one signal, symbol, packet, frame, etc. (e.g., computing device 12-37b and may include m antennas, and TSD 3712 may include n antennas, such that m and n are positive integers and may be the same or different valued positive integers).

FIG. 38 is a schematic block diagram of another embodiment 3800 of a communication system including a TSD in accordance with the present invention. This diagram shows a touch sensor device (TSD) 3810, with or without display functionality, that is configured to support communications with any of a number of different other devices via wireless and/or wired communication means. For example, the TSD 3810 is configured to support communications with a computing device 12 via wireless and/or wired communication means. For another example, the TSD 3810 is configured to support communications with enterprise equipment 3830 (e.g., a server) via wireless and/or wired communication means.

In addition, in some examples, the TSD 3810 is configured to support wireless communications with a number of other wireless communication devices may include any one or more of a watch 3811, or some other wearable elements that may be worn by a user, a game controller 3832, a personal computer 3024, a laptop 3818, a cellular/smart phone 3828, a personal digital assistant (PDA) 3830, and/or any other type of device configured to support wireless communications.

In an example of operation and implementation, the TSD 3810 is configured to interpret user interaction with the TSD 3810, which may be based on a user interacting with the TSD 3810 in conjunction with an overlay, 3-D geometric object, etc., and to provide that interpreted user interaction to one or more other devices, such as the various wireless communication devices depicted herein, and/or their equivalents. For example, consider an overlay that is implemented to facilitate keyboard interaction with the TSD 3810 based on user interaction there with, the TSD 3810 is configured to interpret that user interaction with the TSD 3810, particularly based on the location, type, etc. of the overlay, it and to provide output corresponding to the user interaction with that overlay and the TSD 3810 to one or more of the various devices, such as to the personal computer 3824. The personal computer 3824, instead of receiving input directly from a traditional keyboard that is connected to it, would then receive input from the TSD 3810 that is interpreted to be and corresponding to be keyboard input from the user that is provided via the TSD 38 and that is associated with the overlay that is implemented to facilitate keyboard interaction with the TSD 3810 based on user interaction there with.

FIG. 39A is a schematic block diagram of another embodiment 3901 of a communication system including a TSD in accordance with the present invention. A TSD 3910 is configured to support communications with a computing device 12 via wireless and/or wired communication means.

One or more network segments 3916 provide communication inter-connectivity for at least two computing devices 12 and 12-1 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 12-2).

The various communication links within one or more network segments 3916 may be implemented using any of a variety of communication media including communication links implemented as wireless, wired, optical, satellite, microwave, and/or any combination thereof, etc. communication links. In general, the one or more network segments 3916 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Note that the one or more network segment 3916 may be implemented in accordance with any one or more of a variety of environments, including the Internet, cellular system, cloud computing environment, etc. Also, in some instances, communication links of different types may cooperatively form a connection pathway between any two communication devices.

Considering one possible example, a communication pathway between the TSD 3910 and the computing device 12 includes some segments of wired communication links, other segments of wireless communication links, and other segments of optical communication links, and/or other communication media. In addition, the various communication pathways of the one or more network segments 3916 may include some segments of wired communication links, other segments of wireless communication links, and other segments of optical communication links, and/or other communication media. Note also that the computing devices 12, 12-1, and 12-2 may be of a variety of types of devices including stationary devices, mobile devices, portable devices, etc. and may support communications for any of a number of services or service flows including data, telephony, television, Internet, media, synchronization, etc.

In an example of operation and implementation, the TSD 3910 is in communication with the computing device 12, and the computing device 12 includes a communication interface to support communications with one or more of the other devices 12-1 through 12-2. For example, the computing device 12 includes a communication interface configured to interface and communicate with a communication network (e.g., the one or more network segments 3916), memory that stores operational instructions, and processing circuitry coupled to the communication interface and to the memory. For example, one or more processing modules of the computing device 12 is configured to execute the operational instructions to perform various functions, operations, etc. Note that the communication supported by the computing device 12 may be bidirectional/to and from the one or more of the other computing devices 12-1 through 12-2 or unidirectional (or primarily unidirectional) from the one or more of the other computing devices 12-1 through 12-2.

In one example, computing device 12 includes one or more processing modules that generates, modulates, encodes, etc. and transmits signals via a communication interface of the computing device 12 and also receives and processes, demodulates, decodes, etc. other signals received via the communication interface of the computing device 12 (e.g., received from other computing devices such as computing device 12-1, computing device 12-2, etc.).

In some examples, note that the computing device 12 is configured to support receipt of user input (e.g., via a touchscreen, from the TSD 3910 that is associated with an overlay 3920 implemented with the TSD 3910 to facilitate operation of a keyboard, from the TSD 3910 that is associated with another TSD, such as a 3-D geometric object configured to facilitate user interaction with it and/or with the TSD 3910, etc.) to facilitate user interaction with one or more users of the TSD 3910 and to communicate such information to one or more of the other devices 12-1 through 12-2 via the computing device 12. In even other examples, note that the TSD 3910 itself is configured to communicate directly with the one or more network segments 3916 to communicate such information to one or more of the other devices 12-1 through 12-2 (e.g., not necessarily via the computing device 12).

In an example of operation and implementation, the TSD 3910 is configured to support communications with computing device 12 (e.g., via at least one communication interface of the TSD 3910), and the computing device 12 is configured to support communications with a communication system, such as including one or more network segments 3916, to support transmission of output to one or more of the other devices 12-1 through 12-2. Note that the communication system may include any or any combination of and/or any one or more of a satellite communication system, a wireless communication system, a wired communication system, a fiber-optic communication system, and/or a mobile communication system, etc. Note also that the TSD 3910 is configured to support communications directly with a communication system (e.g., one or more network segments 3916) directly in some examples, such as via at least one communication interface of the TSD 3910.

FIG. 39B is a schematic block diagram of another embodiment 3902 of a communication system including a TSD in accordance with the present invention. The TSD 3910 is configured to support communications with one or more other devices via wireless and/or wired communication means. Examples of such other devices may include one or more wireless communication devices 3960-3966.

The wireless communication system includes one or more base stations and/or access points 3950, wireless communication devices 3960, 3964, 3966 (e.g., wireless stations (STAs)), and a network hardware component 1396. The wireless communication devices 3960-3966 may be laptop computers, or tablets, 3960, personal digital assistants (PDAs) 3962, personal computers 3964 and/or cellular telephones 3966 (and/or any other type of wireless communication device). Other examples of such wireless communication devices 3960-3966 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 3950 are operably coupled to the network hardware 3956 via local area network connection 3952. The network hardware 3956, which may be a router, switch, bridge, modem, system controller, etc., provides a wide area network connection 3954 for the communication system. Each of the one or more base stations or access points 3950 has an associated antenna or antenna array to communicate with the wireless communication devices in its area. Typically, the wireless communication devices register with a particular base station or access point 3950 to receive services from the communication system. For direct connections (i.e., point-to-point communications), wireless communication devices communicate directly via an allocated channel.

Any of the various wireless communication devices (WDEVs) 3960-3966 and one or more BSs or APs 3950 may include a processing circuitry and/or a communication interface to support communications with any other of the wireless communication devices 3960-3966 and one or more BSs or APs 3950. In an example of operation, a processing circuitry and/or a communication interface implemented within one of the devices (e.g., any one of the WDEVs 3960-3966 and one or more BSs or APs 3950) is/are configured to process at least one signal received from and/or to generate at least one signal to be transmitted to another one of the devices (e.g., any other one of the one or more WDEVs 3960-3966 and one or more BSs or APs 3950).

Note that general reference to a communication device, such as a wireless communication device (e.g., WDEVs) 3960-3966 and one or more BSs or APs 3950 in FIG. 39D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 3960-3966 and one or more BSs or APs 3950, may be configured to support communications with any other of the various devices, WDEVs 3960-3966 and one or more BSs or APs 3950. Such communications may be uni-directional or bi-directional between devices. Also, such communications may be uni-directional between devices at one time and bi-directional between those devices at another time.

In an example, a device (e.g., any one of the WDEVs 3960-3966 and one or more BSs or APs 3950) includes a communication connection interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 3960-3966 and one or more BSs or APs 3950) includes a processing circuitry to support communications with one or more of the other wireless communication devices (e.g., any other of the WDEVs 3960-3966 and one or more BSs or APs 3950). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 3960-3966 and one or more BSs or APs 3950) includes a processing circuitry, a communication interface, and a memory configured to support communications with one or more of the other wireless communication devices (e.g., any other of the WDEVs 3960-3966 and one or more BSs or APs 3950).

In an example of operation and implementation, the TSD 3910 is in communication with one or more of the one of the WDEVs 3960-3966, and the one of the WDEVs 3960-3966 includes a communication interface to support communications with one or more other devices via the one or more BSs or APs 3950, the local area network connection 3952, the network hardware 3956, and/or the wide area network connection 3954. This diagram shows yet another implementation of the communication system in which user interaction with the TSD 3910, such as may be in accordance with an overlay, a 3-D geometric object, etc. that is associated with the TSD 3910, may be communicated to one or more other devices via one or more communication means, pathways, communication media, systems, etc. such user interaction with the TSD 3910 may be provided to any one or more other devices for processing thereby, for storage therein, for analysis thereby such as in accordance with artificial intelligence, pattern recognition, etc. for machine learning, and/or for any other purposes. Also, note that the TSD 3910 is configured to support communications directly with the one or more BSs or APs 3950 directly in some examples, such as via at least one wireless communication interface of the TSD 3910.

FIG. 40 is a schematic block diagram of various embodiments 4001, 4002, 4003, and 4004 of TSDs that are configurable in accordance with the present invention. In this diagram, a 3-D geometric object or TSD 4010 includes multiple sections. Note that such 3-D geometric objects may or may not include TSD functionality such as 3-D geometric object may be a passive device, such as including one or more electrodes, which may include one or more marker electrodes. In other examples, such as 3-D geometric object is an active device that is operative to support the TSD functionality, such as including one or more electrodes, one or more DSCs servicing those one or more electrodes, and one or more processing modules in communication with the one or more DSCs that are configured to operate cooperatively to support TSD functionality.

For example, the 3-D geometric object or TSD 4010, shown in the upper left-hand portion of the diagram, includes three sections. As shown by embodiment 4001, the respective sections are capable to be folded with respect to one another, as shown by section 1, section 2, and section 3. Traversing to the right at the top of the diagram, the 3-D geometric object or TSD 4010 is transformed from a first configuration to a second configuration based on the folding of the respective sections. For example, as section 3 is folded towards section 2, and as section 1 is folded towards section 2, as shown in the diagram, the 3-D geometric object or TSD 4010 is transformed from a first configuration to a second configuration.

With respect to this diagram and any others herein that include one or more TSDs, note that one or more marker electrodes may be included within any one or more portions of a 3-D geometric object or TSD, including the different respective sections of the multiple section 3-D geometric object or TSD. Note also that the marker electrodes may have the same or different patterns within the different respective sections, as may be desired in various examples.

Considering another example, the 3-D geometric object or TSD 4020, as shown in the middle left of the diagram, includes four respective sections. As can be seen by the embodiment 4002, based on folding of section 4 toward section 3, section 3 toward section 2, and section 1 toward second 2, the 3-D geometric object or TSD 4020 is transformed from a first configuration to a second configuration.

Considering yet another example with respect to the 3-D geometric object or TSD 4020, as can be seen by the embodiment 4003, based on folding of section 3 toward section 2, the 3-D geometric object or TSD 4020 is transformed from a first configuration to a third configuration that is different from the second configuration. As can be seen, with respect to a 3-D geometric object or TSD, such as 3-D geometric object or TSD 4020, having multiple sections, that same 3-D geometric object or TSD may be transformed into different respective configurations based on the capability by which the 3-D geometric object or TSD may be modified. In this example, the 3-D geometric object or TSD 4020 includes different respective sections that may be folded onto one another thereby forming different respective configurations based on the same 3-D geometric object or TSD 4020.

Considering another example, consider embodiment 4004 that includes a variant of the TSD 3-D geometric object or 4020, which is similar in format but includes differently sized sections, such as sections 2 and 4 are larger than shown with respect to 3-D geometric object or TSD 4020. Consider similar folding within embodiment 4004 as is performed with respect to them by about 4002, then the variant of the 3-D geometric object or TSD 4020 is transformed from a first configuration to a fourth configuration such that a void is included within the center of the 3-D geometric object or TSD after being transformed into the fourth configuration.

Generally speaking, different respective 3-D geometric objects or TSDs may be implemented in any of a variety of ways having capability to be transformed into any of a variety of configurations; the embodiments of this diagram show 3-D geometric objects or TSDs having multiple respective sections of 3-D geometric objects being substantially rectangular in shape having a particular thickness.

As can be seen, not only can a particular 3-D geometric object or TSD be transformed into different respective configurations such as for different respective uses, but such a 3-D geometric object or TSD may also be configured to interact with another TSD differently based on the particular configuration is then. For example, consider such a 3-D geometric object or TSD as including one or more marker electrodes within one or more of the sections of the 3-D geometric object or TSD. Based on the configuration in which the 3-D geometric object or TSD has been transformed, the one or more marker electrodes will provide different respective Z signatures that may be detected by another TSD. For example, different respective 3-D geometric objects or TSDs will have different respective Z signatures that facilitate another TSD to identify and differentiate them one from another.

Also, based on any one or more other considerations, such as configuration, position, orientation, and/or other considerations of a given 3-D geometric object or TSD may be used to provide different respective Z signatures that may be detected by another TSD and used to select between different respective functions of the very same 3-D geometric object or TSD when interacting with the other TSD. For example, based on any one or more such considerations (e.g., configuration, position, orientation, etc.) of the 3-D geometric object or TSD, that 3-D geometric object or TSD may be configured to support different functionality when interacting with the other TSD.

FIG. 41 is a schematic block diagram of various embodiments 4101, 4102, 4103, 4104, 4105, and 4106 of TSDs that are configurable and operative with TSDs in accordance with the present invention. These various embodiments 4101, 4102, 4103, 4104, 4105, and 4106 show different ways in which a 3-D geometric object or TSD is configured to interact with the TSD 4110 based on one or more characteristics of the 3-D geometric object or TSD.

Embodiment 4101 shows the 3-D geometric object or TSD 4112 that is implemented in a first configuration and in contact with or proximity to TSD 4110. The TSD 4110 is configured to detect the 3-D geometric object or TSD 4112 based on a first Z signature corresponding to the 3-D geometric object or TSD 4112 being in the first configuration. The TSD 4110 then interacts with the 3-D geometric object or TSD 4112 based on a first function that corresponds to the 3-D geometric object or TSD 4112 being in this first configuration.

Embodiment 4102 shows the 3-D geometric object or TSD 4112 that is implemented in a second configuration and in contact with or proximity to TSD 4110. The TSD 4110 is configured to detect the 3-D geometric object or TSD 4112 based on a second Z signature corresponding to the 3-D geometric object or TSD 4112 being in the second configuration. The TSD 4110 then interacts with the 3-D geometric object or TSD 4112 based on a second function that corresponds to the 3-D geometric object or TSD 4112 being in this second configuration.

Embodiments 4101 and 4102 operate such that the TSD 4110 interacts with the 3-D geometric object or TSD 4112 differently based on the particular configuration in which the 3-D geometric object or TSD 4112 is currently implemented.

Embodiment 4103 shows the 3-D geometric object or TSD 4114 that is implemented in a first orientation and in contact with or proximity to TSD 4110. The TSD 4110 is configured to detect the 3-D geometric object or TSD 4114 based on a first Z signature corresponding to the 3-D geometric object or TSD 4114 being in the first orientation. The TSD 4110 then interacts with the 3-D geometric object or TSD 4114 based on a first function that corresponds to the 3-D geometric object or TSD 4114 being in this first orientation.

Embodiment 4103 shows the 3-D geometric object or TSD 4114 that is implemented in a second orientation and in contact with or proximity to TSD 4110. The TSD 4110 is configured to detect the 3-D geometric object or TSD 4114 based on a second Z signature corresponding to the 3-D geometric object or TSD 4114 being in the second orientation. The TSD 4110 then interacts with the 3-D geometric object or TSD 4114 based on a second function that corresponds to the 3-D geometric object or TSD 4114 being in this second orientation.

Embodiments 4103 and 4104 operate such that the TSD 4110 interacts with the 3-D geometric object or TSD 4114 differently based on the particular orientation in which the 3-D geometric object or TSD 4114 is currently implemented. In these embodiments for 103 and 4104, the interaction between the TSD 4110 and the 3-D geometric object or TSD 4114 is selected based on the orientation of the 3-D geometric object or TSD 4114 with respect to the TSD 4110. In such examples, such orientation-based function change is the same whether or not the 3-D geometric object or TSD 4114 is upright or upside down. That is to say, the TSD 4110 is configured to detect the a first corresponding Z signature of the 3-D geometric object or TSD 4114 when upright and a second corresponding Z signature of the 3-D geometric object or TSD 4114 when upside down and is also configured to select the same function for both of those instances. In other alternative examples, such orientation-based function change is the different based on whether or not the 3-D geometric object or TSD 4114 is upright or upside down. That is to say, the TSD 4110 is configured to detect the a first corresponding Z signature of the 3-D geometric object or TSD 4114 when upright and a second corresponding Z signature of the 3-D geometric object or TSD 4114 when upside down and is also configured respectively to select different respective functions, such as a first function and a second function, for both of those instances.

Embodiment 4105 shows the 3-D geometric object or TSD 4116 that is implemented in a first location and in contact with or proximity to TSD 4110. The TSD 4110 is configured to detect the 3-D geometric object or TSD 4116 based on a first Z signature corresponding to the 3-D geometric object or TSD 4116 being in the first location. The TSD 4110 then interacts with the 3-D geometric object or TSD 4116 based on a first function that corresponds to the 3-D geometric object or TSD 4116 being in this first location.

Embodiment 4106 shows the 3-D geometric object or TSD 4116 that is implemented in a second location and in contact with or proximity to TSD 4110. The TSD 4110 is configured to detect the 3-D geometric object or TSD 4116 based on a second Z signature corresponding to the 3-D geometric object or TSD 4116 being in the second location. The TSD 4110 then interacts with the 3-D geometric object or TSD 4116 based on a second function that corresponds to the 3-D geometric object or TSD 4116 being in this second location.

Embodiments 4105 and 4106 operate such that the TSD 4110 interacts with the 3-D geometric object or TSD 4116 differently based on the particular location with respect to the TSD 4110 at which the 3-D geometric object or TSD 4116 is currently located.

These embodiments 4101, 4102, 4103, 4104, 4105, and 4106 show variability and select ability of different respective functions of a 3-D geometric object or TSD when interacting with the TSD 4110 based on configuration, orientation, and position. Note also that, and other examples, combinations of configuration, orientation, and position made be used to select among an even larger number of different respective functions of a 3-D geometric object or TSD when interacting with the TSD 4110.

For example, consider a 3-D geometric object or TSD in a first configuration and a first orientation may be to select a first function when interacting with the TSD 4110. The 3-D geometric object or TSD in the first configuration and a second orientation may be to select a second function when interacting with the TSD 4110. The 3-D geometric object or TSD in a second configuration and the first orientation may be to select a third function when interacting with the TSD 4110. The 3-D geometric object or TSD in the second configuration and the second orientation may be to select a fourth function when interacting with the TSD 4110.

For yet another example, consider a 3-D geometric object or TSD in a first configuration and a first location may be to select a first function when interacting with the TSD 4110. The 3-D geometric object or TSD in the first configuration and a second location may be to select a second function when interacting with the TSD 4110. The 3-D geometric object or TSD in a second configuration and the first location may be to select a third function when interacting with the TSD 4110. The 3-D geometric object or TSD in the second configuration and the second location may be to select a fourth function when interacting with the TSD 4110.

For even yet another example, consider a 3-D geometric object or TSD in a first configuration, a first orientation, and a first location may be to select a first function when interacting with the TSD 4110. The 3-D geometric object or TSD in the first configuration, the first orientation, and a second location may be to select a second function when interacting with the TSD 4110. The 3-D geometric object or TSD in the first configuration, a second orientation, and the first location may be to select a third function when interacting with the TSD 4110. The 3-D geometric object or TSD in the first configuration, the second orientation, and the second location may be to select a fourth function when interacting with the TSD 4110.

Similar variability in selection of different other functions may be made based on the 3-D geometric object or TSD being in a second configuration and having different respective orientations and/or locations to select different respective functions when interacting with the TSD 4110.

Examples of different respective functions corresponding to the interaction of the TSD 4110 with different respective 3-D geometric objects or TSDs may be performed in a variety of ways. Generally speaking, a respective 3-D geometric object or TSD may be implemented to operate in accordance with different respective functionalities at different times based on any one of configuration, orientation, position, and or other characteristics associated with the respective 3-D geometric object or TSD when interacting with the TSD 4210.

For example, a first function may correspond to a 3-D geometric object or TSD operating as a remote control for the television. A second function may correspond to the 3-D geometric object or TSD operating as a remote control for a digital video recorder (DVR). A second function may correspond to the 3-D geometric object or TSD operating as a garage door opener. The fourth function may correspond to the 3-D geometric object or TSD operating as a heating, ventilation, air conditioning (HVAC) controller. The fifth function may correspond to the 3-D geometric object or TSD operating as an appliance controller interface (e.g., such as for an oven, microwave, etc.). Also, note that such a 3-D geometric object or TSD, when implemented as an active device, may be implemented to include display functionality to provide indication of which portions of the 3-D geometric object or TSD correspond to buttons or touch sections that correspond to operation in accordance with various operations for various functions. In some examples, such display functionality is implemented using one or more of touchscreen display, an liquid crystal display (LCD) operable display, a light emitting diode (LED) operable display, and/or other visual output component, that is configured to provide indication to the a user of where particularly to touch the 3-D geometric object or TSD.

In other examples, the 3-D geometric object or TSD includes no such display functionality, and user interaction in accordance with the 3-D geometric object or TSD with respect to different surfaces, portions, etc. of the 3-D geometric object or TSD effectuates the different functions. The user then interacts with the 3-D geometric object or TSD based on information known to the user regarding where and how to interact with the 3-D geometric object or TSD to effectuate the different respective functions.

In even other examples, the 3-D geometric object or TSD is implemented to include different respective patterns, colors, text, description, printing, etc. and/or other differentiating and indicating means on one or more portions of one or more surfaces of the 3-D geometric object or TSD. The user then interacts with the 3-D geometric object or TSD based on information known to the user regarding where and how to interact with the 3-D geometric object or TSD with respect to the different one or more portions of one or more surfaces of the 3-D geometric object or TSD to effectuate the different respective functions. For example, the user interacts with a first portion of a first surface of the 3-D geometric object or TSD that is facing upwards to effectuate a first function, with a second portion of the first surface of the 3-D geometric object or TSD that is facing upwards to effectuate a second function, and so on. The different differentiating and indicating means associated with the first and second portions of the first surface of the 3-D geometric object or TSD provide indication to the user of where to interact with the 3-D geometric object or TSD to effectuate the different respective functions (e.g., first printing on the first portion of the first surface of the 3-D geometric object or TSD to indicate that portion may be used to effectuate the first function, second printing on the second portion of the second surface of the 3-D geometric object or TSD to indicate that particular portion may be used to effectuate the second function, and so on). The different respective portions of the first surface include different respective patterns, colors, text, description, printing, etc. and/or other differentiating and indicating means.

For another example, the user interacts with a first surface of the 3-D geometric object or TSD when that first surface of the 3-D geometric object or TSD is facing upwards to effectuate a first function, with a second surface of the 3-D geometric object or TSD when that second surface of the 3-D geometric object or TSD is facing upwards to effectuate a second function, and so on. The different respective surfaces include different respective patterns, colors, text, description, printing, etc. and/or other differentiating and indicating means. For example, depending on the orientation of the 3-D geometric object or TSD with respect to the TSD 4110, different respective surfaces will be facing upwards and are then available to facilitate user interaction therewith.

Note that such different respective patterns, colors, text, description, printing, etc. and/or other differentiating and indicating means on one or more portions of one or more surfaces of the 3-D geometric object or TSD may also be implemented with respect to different respective sections of a multiple section 3-D geometric object or TSD so as to provide information to a user regarding the what functionality is associated with the 3-D geometric object or TSD depending on its orientation, configuration, etc. For example, consider that a multiple section 3-D geometric object or TSD is implemented in a first orientation and/or configuration, then a first pattern, color, text, description, printing, etc. and/or other differentiating and indicating means is visible to a user providing information to the user regarding a first function associated with that first orientation and/or configuration. Then, when the multiple section 3-D geometric object or TSD is implemented in a second orientation and/or configuration, then a second pattern, color, text, description, printing, etc. and/or other differentiating and indicating means is visible to the user regarding a second function associated with that second orientation and/or configuration.

In yet other examples, user interaction accordance with the 3-D geometric object or TSD with respect any of surfaces, portions, etc. of the 3-D geometric object or TSD effectuates a given function. For example, consider the 3-D geometric object or TSD configured to operate as a button that operates generally as a very simple, toggle switch (e.g., such as garage door opener such that a first touch of the button starts the garage door to move, and a second touch of the button stops the garage door at its current position and/or reverses the direction of movement of the garage door), then any user interaction with the 3-D geometric object or TSD effectuates the operation of such the toggle switch. In addition, depending on the orientation, configuration, etc. of the -D geometric object or TSD, different respective portions or surfaces of the 3-D geometric object or TSD may be implemented to effectuate different simple, toggle switches. In one example, the first and second functions may be very simple/toggle type functions such the first function being that of a garage door opener, the second function being that of door lock/unlock mechanism, etc.

In even other examples, the first and second functions are more complex functions such the first function being that of a TV and/or DVR remote control, the second function being that of an HVAC control console to effectuate heating and/or cooling operations of a building, etc.

Generally speaking, the number of different respective functions corresponding to the interaction of the TSD 4110 with different respective 3-D geometric objects or TSDs are myriad. These are examples and do not constitute an exhaustive list of the countless variety of functions for that may be implemented corresponding to the interaction of the TSD 4110 with different respective 3-D geometric objects or TSDs.

FIG. 42 is a schematic block diagram of other various embodiments 4201, 4202, 4203, and 4204 of 3-D geometric objects or TSDs that are configurable and operative with TSDs in accordance with the present invention. This diagram shows a 3-D geometric object or TSD 4220 as including four respective sections and is configurable based on those four respective sections. A 3-D geometric object or TSD 4220 is operative to interact with the TSD 4210. Based on the configuration of these the 3-D geometric object or TSD 4220, the TSD 4210 is configured to interact differently with the 3-D geometric object or TSD 4220.

As can be seen with respect to embodiment 4201, based on the 3-D geometric object or TSD 4220 being implemented within a first configuration, the TSD 4210 interacts with the 3-D geometric object or TSD 4220 based on the first function. For example, the first configuration corresponds to the four respective sections of the 3-D geometric object or TSD 4220 being aligned together in the same plane, or corresponding to a flat configuration.

In embodiment 4202, based on the 3-D geometric object or TSD 4220 being implemented within a second configuration, the TSD 4210 interacts with the 3-D geometric object or TSD 4220 based on a second function. The second configuration corresponds to the four sections of the 3-D geometric object or TSD 4220 being folded together, and also with the 3-D geometric object or TSD 4220 being any particular orientation with respect to the TSD 4210. For example, the two larger sections of the four sections of the 3-D geometric object or TSD 4220 are located on the top and bottom within this second configuration.

In embodiment 4203, based on the 3-D geometric object or TSD 4220 being implemented within a third configuration, the TSD 4210 interacts with the 3-D geometric object or TSD 4220 based on a third function. The third configuration also corresponds to the four sections of the 3-D geometric object or TSD 4220 being folded together, and also with the 3-D geometric object or TSD 4220 being any particular orientation with respect to the TSD 4210 that is different than within the embodiment 4202. For example, the two larger sections of the four sections of the 3-D geometric object or TSD 4220 are located on the left and right within this third configuration, such that the 3-D geometric object or TSD 4220 is oriented within the embodiment 4203 after having undergone a 90° rotation relative to the embodiment 4202.

In embodiment 4204, based on the 3-D geometric object or TSD 4220 being implemented within a fourth configuration, the TSD 4210 interacts with the 3-D geometric object or TSD 4220 based on a fourth function. The fourth configuration also corresponds to the four sections of the 3-D geometric object or TSD 4220 being folded together, and also with the 3-D geometric object or TSD 4220 being any particular orientation with respect to the TSD 4210 that is different than within the embodiment 4202 or embodiment 4203. For example, the two larger sections of the four sections of the 3-D geometric object or TSD 4220 are located on the top and bottom within this fourth configuration, such that the 3-D geometric object or TSD 4220 is oriented within the fourth 4203 after having undergone a 90° rotation relative to the embodiment 4203 or after having undergone a 180° rotation relative to the embodiment 4202.

As can be seen with respect to these embodiments, different functionality of a 3-D geometric object or TSD 4220 may be performed based on its interaction with a TSD 4210 based not only on the configuration and manner in which the 3-D geometric object or TSD 4220 is particularly configured, but also based on its orientation with respect to the TSD 4210.

FIG. 43A is a schematic block diagram of other various embodiments 4301, 4302, 4303, and 4304 of 3-D geometric objects or TSDs that are configurable and operative with TSDs in accordance with the present invention. These embodiments show orientation-based function change with respect to a 3-D geometric object or TSD 4314 when interacting with a TSD 4310. For example, embodiment 4301 shows a first orientation such that the 3-D geometric object or TSD 4314 is inverted relative to the orientation as is shown in the middle of the diagram.

In embodiment 4301, based on the 3-D geometric object or TSD 4314 being implemented within a first orientation, the TSD 4310 interacts with the 3-D geometric object or TSD 4314 based on a first function.

Embodiment 4302 shows a second orientation such that the 3-D geometric object or TSD 4314 is rotated clockwise 90° relative to the orientation as is shown in the middle of the diagram. In embodiment 4302, based on the 3-D geometric object or TSD 4314 being implemented within a second orientation, the TSD 4310 interacts with the 3-D geometric object or TSD 4314 based on a second function.

Embodiment 4303 shows a third orientation such that the 3-D geometric object or TSD 4314 is similarly oriented as is shown in the middle of the diagram. In embodiment 4303, based on the 3-D geometric object or TSD 4314 being implemented within a third orientation, the TSD 4310 interacts with the 3-D geometric object or TSD 4314 based on a third function.

Embodiment 4304 shows a second orientation such that the 3-D geometric object or TSD 4314 is rotated counterclockwise 90° relative to the orientation as is shown in the middle of the diagram. In embodiment 4302, based on the 3-D geometric object or TSD 4314 being implemented within a second orientation, the TSD 4310 interacts with the 3-D geometric object or TSD 4314 based on a second function.

In some examples, such selectivity between different respective functions is made based on only the orientation of the 3-D geometric object or TSD 4314 with respect to the TSD 4310. For example, one or more processing modules of the TSD 4310 is implemented to interpret signals provided from DSCs that are coupled to electrodes of the TSD 4310 and to facilitate selectivity between different respective functions based on only the orientation of the 3-D geometric object or TSD 4314 with respect to the TSD 4310.

FIG. 43B is a schematic block diagram of other various embodiments 4305 and 4206 of 3-D geometric objects or TSDs that are configurable and operative with TSDs in accordance with the present invention. These embodiments show position-based function change with respect to a 3-D geometric object or TSD 4314 when interacting with a TSD 4310.

Embodiment 4305 shows a first location of the 3-D geometric object or TSD 4314 with respect to the TSD 4310. For example, the first location corresponds to the 3-D geometric object or TSD 4314 being located to the left of the top surface of with respect to the TSD 4310. In embodiment 4305, based on the 3-D geometric object or TSD 4314 being located within this first location, the TSD 4310 interacts with the 3-D geometric object or TSD 4314 based on a first function.

Embodiment 4306 shows a second location of the 3-D geometric object or TSD 4314 with respect to the TSD 4310. For example, the second location corresponds to the 3-D geometric object or TSD 4314 being located to the right of the top surface of with respect to the TSD 4310. In embodiment 4305, based on the 3-D geometric object or TSD 4314 being located within this second location, the TSD 4310 interacts with the 3-D geometric object or TSD 4314 based on a second function.

In some examples, such selectivity between different respective functions is made based on only the location of the 3-D geometric object or TSD 4314 with respect to the TSD 4310. For example, one or more processing modules of the TSD 4310 is implemented to interpret signals provided from DSCs that are coupled to electrodes of the TSD 4310 and to facilitate selectivity between different respective functions based on only the location of the 3-D geometric object or TSD 4314 with respect to the TSD 4310.

FIG. 44 is a schematic block diagram of other various embodiments 4401, 4402, 4403, 4404, 4405, 4406, 4407, and 4408 of 3-D geometric objects or TSDs that are configurable and operative with TSDs in accordance with the present invention. These embodiments show combined position-based and orientation-based function change with respect to a 3-D geometric object or TSD 4412 when interacting with a TSD 4410. Providing selectivity between different respective functions using more than one consideration or dimensions, in this case both position and orientation, and even greater number of different respective functions may be supported based on a 3-D geometric object or TSD 4412 interacting with a TSD 4410. Generally speaking, any of a number of different considerations or dimensions such as configuration, position, orientation, and/or other considerations may be used to select between different respective functions.

Embodiment 4401 shows a first orientation such that the 3-D geometric object or TSD 4412 is inverted relative to the orientation as is shown in the top middle of the diagram. In embodiment 4401, based on the 3-D geometric object or TSD 4314 being implemented within a first orientation and also within a first location, such as corresponding to the left hand portion of the top surface of the TSD 4410, the TSD 4410 interacts with the 3-D geometric object or TSD 4412 based on a first function.

Embodiment 4402 also shows the first orientation such that the 3-D geometric object or TSD 4412 is inverted relative to the orientation as is shown in the top middle of the diagram. In embodiment 4402, based on the 3-D geometric object or TSD 4314 being implemented within the first orientation yet within a second location, such as corresponding to the right hand portion of the top surface of the TSD 4410, the TSD 4410 interacts with the 3-D geometric object or TSD 4412 based on a second function.

Embodiment 4403 shows a second orientation such that the 3-D geometric object or TSD 4412 is similarly oriented as is shown in the top middle of the diagram. In embodiment 4403, based on the 3-D geometric object or TSD 4314 being implemented within the second orientation yet within the first location, such as corresponding to the left hand portion of the top surface of the TSD 4410, the TSD 4410 interacts with the 3-D geometric object or TSD 4412 based on a third function.

Embodiment 4404 shows the second orientation such that the 3-D geometric object or TSD 4412 is similarly oriented as is shown in the top middle of the diagram. In embodiment 4404, based on the 3-D geometric object or TSD 4314 being implemented within the second orientation yet within a second location, such as corresponding to the right hand portion of the top surface of the TSD 4410, the TSD 4410 interacts with the 3-D geometric object or TSD 4412 based on a fourth function.

Embodiment 4405 shows a third orientation such that the 3-D geometric object or TSD 4412 is rotated clockwise 90° compared to the orientation of the 3-D geometric object or TSD 4412 as is shown in the top middle of the diagram. In embodiment 4405, based on the 3-D geometric object or TSD 4314 being implemented within the third orientation yet within the first location, such as corresponding to the left hand portion of the top surface of the TSD 4410, the TSD 4410 interacts with the 3-D geometric object or TSD 4412 based on a fifth function.

Embodiment 4406 also shows the third orientation such that the 3-D geometric object or TSD 4412 is rotated clockwise 90° compared to the orientation of the 3-D geometric object or TSD 4412 as is shown in the top middle of the diagram. In embodiment 4406, based on the 3-D geometric object or TSD 4314 being implemented within the third orientation yet within the second location, such as corresponding to the right hand portion of the top surface of the TSD 4410, the TSD 4410 interacts with the 3-D geometric object or TSD 4412 based on a sixth function.

Embodiment 4407 shows a fourth orientation such that the 3-D geometric object or TSD 4412 is rotated counter-clockwise 90° compared to the orientation of the 3-D geometric object or TSD 4412 as is shown in the top middle of the diagram. In embodiment 4407, based on the 3-D geometric object or TSD 4314 being implemented within the fourth orientation yet within the first location, such as corresponding to the left hand portion of the top surface of the TSD 4410, the TSD 4410 interacts with the 3-D geometric object or TSD 4412 based on a seventh function.

Embodiment 4408 also shows the fourth orientation such that the 3-D geometric object or TSD 4412 is rotated counter-clockwise 90° compared to the orientation of the 3-D geometric object or TSD 4412 as is shown in the top middle of the diagram. In embodiment 4408, based on the 3-D geometric object or TSD 4314 being implemented within the fourth orientation yet within the second location, such as corresponding to the right hand portion of the top surface of the TSD 4410, the TSD 4410 interacts with the 3-D geometric object or TSD 4412 based on an eighth function.

In some examples, such selectivity between different respective functions is made based on both the location and the orientation of the 3-D geometric object or TSD 4414 with respect to the TSD 4410. For example, one or more processing modules of the TSD 4410 is implemented to interpret signals provided from DSCs that are coupled to electrodes of the TSD 4410 and to facilitate selectivity between different respective functions based on both the location and the orientation of the 3-D geometric object or TSD 4414 with respect to the TSD 4410.

As described above with respect to various embodiments, examples, etc., a TSD is configured to detect various characteristics including the presence, location, orientation, and/or position, etc. of any another component or device, such as another TSD, a 3-D geometric object, an overlay, a 3-D geometric object including TSD functionality, etc. and to operate appropriately based on the presence, location, orientation, and/or position, etc. of the other component or device with respect to the TSD. Various embodiments, examples, etc., are described below with respect to operation of a TSD in accordance with region of interest processing (ROIP) with respect to one or more portions of the TSD. In certain implementations, such ROIP is performed with respect to adapting sensitivity of one or more portions of the TSD based on presence, location, orientation, and/or position, etc. of the other component or device with respect to the TSD. In even other alternative implementations, such ROIP is performed with respect to adapting operation entirely, such as enabling/disabling operation of one or more portions of the TSD based on presence, location, orientation, and/or position, etc. of the other component or device with respect to the TSD.

FIG. 45 is a schematic block diagram of an embodiment 4500 of an overlay that is operative with a TSD that is configured to perform sensitivity based region of interest processing (ROIP) in accordance with the present invention. In this diagram, and overlay 4520 is placed on a first portion of a surface of a TSD 4510. The TSD 4510 is shown as having row and column electrodes, but with respective the TSD 4510 of this diagram as well as any other TSD in any other embodiment, example, diagram, etc., note that electrodes implemented therein may be implemented in accordance with any desired pattern, arrangement, configuration, etc. In addition, note that the overlay 4520 of this diagram as well as any other overlay in any other embodiment, example, diagram, etc. may be implemented to include one or more electrodes in one or more keys thereof such as to facilitate improved capacitive coupling with one or more electrodes of the TSD 4510.

The first portion of the service of the TSD 4510 is provision for the overlay 4520. The remaining portion of the surface of the TSD 4510 is available for any of a number of other functions that may include any one or more of non-overlay functionality, as having unchanged sensitivity, being disabled, etc.

As can be seen in the projection of the first portion of the surface of the TSD 4510 and the overlay 4520 there on in the middle left of the diagram, based on the TSD 4510 detecting the location, position, identity, etc. of the overlay 4520, the TSD 4510 is configured to adapt operation of the first portion of the surface of the TSD 4510 that is associated with the overlay 4520. Moving from left to right, as can be seen, a different level of sensitivity is operated with respect to the electrodes associated with the first portion of the surface of the TSD 4510 that is associated with the overlay 4520. For example, as can be seen at the bottom of the diagram, moving left right, the first portion of the TSD 4510 is shown without the overlay 4520 there on to provide better illustration of adaptation of the sensitivity of the first portion of the TSD 4510.

On the bottom left of the diagram, the first portion of the TSD 4510 is operated based on a first sensitivity, such as may be associated with using all the available electrodes within the first portion of the TSD 4510. On the bottom right of the diagram, the first portion of the TSD 4510 is operated based on the second sensitivity, which corresponds to a different sensitivity than the first sensitivity. For example, the second sensitivity is implemented using a subset of the electrodes within the first portion of the TSD 4510. In one implementation, this corresponds to using every other electrode in the first portion of the TSD 4510. In another implementations corresponds to using every third electrode in the first portion of the TSD 4510. This may correspond to using every other electrode, every third electrode, etc. corresponding to relevant column electrodes of the first portion of the TSD 4510 that is associated with the overlay 4520.

Generally speaking, based on the TSD 4510 detecting the location, position, identity, etc. the overlay 4520, the TSD 4510 is configured to adapt operation of the first portion of the TSD 4510 that is associated with the overlay 4520. Consider the overlay 4520 having keys that are of much greater size than the pitch, spacing, etc. of the electrodes of the TSD 4510. In such an instance, every electrode passing underneath the keys of the overlay 4520 need not be used to detect user interaction with the overlay 4520 that is associated with the TSD 4510. Consider an example in which n (a positive integer greater than or equal to) electrodes pass underneath a key of the overlay 4520, yet based on the spacing of those electrodes being Y millimeters, where X is some number such as 1, 1.5, 2, etc., and consider that the width of a key of the overlay 40 is Y centimeters, where Y is some number such as 1, 1.5, 2, etc. Then also consider that X is much less than Y, then fewer than all of the n electrodes that pass underneath a key of the overlay 4520 may be used and still detect user interaction with that key of the overlay 4520 that is associated with the TSD 4510 while still detecting and discriminating with which particular key or keys of the overlay 4520 that the user is interacting. In such instances, the TSD 4510 is configured to operate based on a sensitivity that is less than the full sensitivity of the first portion of the TSD 4510.

FIG. 46 is a schematic block diagram of another embodiment 4600 of an overlay that is operative with a TSD that is configured to perform sensitivity based ROIP in accordance with the present invention. This diagram is similar to the prior diagram with the difference being that the first portion of the TSD 4510 is operated using a third sensitivity that is less than a second sensitivity used in the prior diagram. For example, the TSD 4510 is initially operated using every other electrode in the first portion of the TSD 4510. Based on acceptable operation and performance in accordance with the second sensitivity, the TSD 4510 is subsequently operated using every third electrode of the first portion of the TSD 4510 in accordance with the third sensitivity that is less than the second sensitivity. As may be desired, the TSD 4510 is further adapted in terms of operation using fewer and fewer electrodes in the first portion of the TSD 4510 until the operation and performance fails to meet one or more performance criteria. When operation and performance of the TSD 4510 in cooperation with the overlay 4520 compares unfavorably with the one or more performance criteria, the TSD 4510 is configured to adapt operation to increase sensitivity within the first portion of the TSD 4510. Then, based on this increasing sensitivity within the first portion of the TSD 4510, when operation and performance of the TSD 4510 in cooperation with the overlay 4520 compares favorably with the one or more performance criteria, the TSD 4510 is configured to continue operation within this acceptable level of sensitivity within the first portion of the TSD 4510.

Note that adapting the sensitivity of operation of the TSD 4510 can provide for many improvements in the operation of the TSD 4510 when interacting with the overlay 4520 including sensitivity optimization, power management which may include power savings, reduced power consumption, optimize power consumption, etc., adaptive sensitivity for improved detection of user interaction with the overlay 4520 that is associated with the TSD 4510, etc., among other improvements.

FIG. 47 is a schematic block diagram of an embodiment 4700 of an overlay and a 3-D geometric object, which may or may not include TSD functionality, that are both operative with a TSD that is configured to perform sensitivity based ROIP in accordance with the present invention. This diagram has certain similarities to the previous two diagrams with at least one difference being that a second TSD or 3-D geometric object 4712 is interactive with a TSD 4710 and allocation that is different than an overlay 4720. Similar to previous diagrams, the first portion of the surface of the TSD 4710 is provisioned for operation based on the overlay 4720, however, the second TSD or 3-D geometric object 4712 is operative within another location of the TSD 4710. The remaining portion of the surface of the TSD 4710 that is not included within the first portion of the service of the TSD 4710 that is provisioned for the overlay 4720, and particularly any portion of this remaining portion of the service of the TSD 4710 that is not associated with the second TSD or 3-D geometric object 4712 is available for any of a number of other functions that may include any one or more of non-overlay functionality, as having unchanged sensitivity, being disabled, etc.

In this diagram, the TSD 4710 is configured to adapt the sensitivity associated with the first portion of the surface of the TSD 4710 that is provisioned for the overlay 4720 and/or that portion included within the remaining portion of the service of the TSD 4710 that is associated with the second TSD or 3-D geometric object 4712. For example, the sensitivity within these portions of the surface of the TSD 4710 may be increased, decreased, etc.

While certain embodiments, examples, diagrams, etc. described herein correspond to situations where sensitivity of different respective portions of a TSD may be adapted or modified based on the TSD being implemented and operative in accordance with any one or more of another TSD, and overlay, a 3-D geometric object, etc., Other embodiments, examples, diagrams, etc. are described below where sensitivity or touch sensing capability is enabled or disabled for different respective portions of a TSD so implemented.

In an example of operation and implementation, a TSD (e.g., TSD 4710 or any other TSD described herein or their equivalents) includes a plurality of TSD electrodes associated with a surface of the TSD. Also, an overlay that includes one or more marker electrodes also being associated with a region of the surface of the TSD.

The TSD also includes a plurality of drive-sense circuits (DSCs) operably coupled to the plurality of TSD electrodes. A DSC of the plurality of DSCs is operably coupled to receive a reference signal and to generate a TSD electrode signal based on the reference signal. When enabled, the DSC operably coupled and configured to provide the TSD electrode signal to a TSD electrode of the plurality of TSD electrodes and simultaneously to sense a change of the TSD electrode signal based on a change of impedance of the TSD electrode caused by capacitive coupling between the TSD electrode and the one or more marker electrodes based on the overlay being associated with the at least a portion of the surface of the TSD. The DSC is also operably coupled and configured to generate a digital signal that is representative of the change of impedance of the TSD electrode.

The TSD includes or is coupled to memory that stores operational instructions. The TSD also includes one or more processing modules operably coupled to the plurality of DSCs and the memory. When enabled, the one or more processing modules is configured to execute the operational instructions to generate the reference signal and to process the digital signal generated by the DSC of the plurality of DSCs and a plurality of other digital signals generated by other DSCs of the plurality of DSCs to determine the region of the surface of the TSD that is associated with the overlay. Also, the one or more processing modules is configured to execute the operational instructions to adapt sensitivity of the TSD within the region of the surface of the TSD that is associated with the overlay including to change a number operational electrodes of the plurality of TSD electrodes that are implemented to service the region of the surface of the TSD that is associated with the overlay in accordance with detecting user interaction with the overlay.

In certain examples, when enabled, the one or more processing modules is configured to execute the operational instructions to adapt the sensitivity of the TSD within the region of the surface of the TSD that is associated with the overlay including to operate fewer than all of a subset of the plurality of TSD electrodes that are implemented to service the region of the surface of the TSD that is associated with the overlay in accordance with detecting user interaction with the overlay.

In other examples, when enabled, the one or more processing modules is configured to execute the operational instructions to adapt the sensitivity of the TSD within the region of the surface of the TSD that is associated with the overlay including to increase the number operational electrodes of the plurality of TSD electrodes that are implemented to service the region of the surface of the TSD that is associated with the overlay in accordance with detecting user interaction with the overlay.

In even other examples, when enabled, the one or more processing modules is configured to execute the operational instructions to process the digital signal generated by the DSC of the plurality of DSCs to determine one or more characteristics of the overlay that is associated with the region of the surface of the TSD.

Examples of the one or more characteristics of the overlay may include any one or more of an outline of the overlay, locations of keys of the overlay, a location of the overlay on the surface of the TSD, location of the one or more marker electrodes within the at least a portion of the surface of the TSD, a pattern of the one or more marker electrodes, a function of the overlay, a type of the overlay, and/or an orientation of the overlay.

Also, in certain examples, the TSD is a portable device that includes an internal power source (e.g., such as with respect to FIG. 36).

Also, in some implementations of the TSD, note that the plurality of TSD electrodes includes a first subset of the plurality of TSD electrodes aligned in a first direction and a second subset of the plurality of TSD electrodes that are separated from the first subset of the plurality of TSD electrodes by a dielectric material and are aligned in a second direction.

In addition, in some examples, the TSD includes multiple sections (e.g., such as certain TSDs including depicted in FIGS. 27, 28, 34, 40, among others). The TSD has a first shape when the multiple sections are implemented within a first configuration, and the TSD has a second shape when the multiple sections are implemented within a second configuration. Also, note that certain implementations of the TSD include a non-flat surface and/or curved surface (e.g., such as certain TSDs including depicted in FIG. 27, among others).

In addition, note that the DSC of the plurality of DSCs may be implemented in a variety of ways. For example, in one implementation, the DSC of the plurality of DSCs includes a power source circuit operably coupled via a single line to the TSD electrode. When enabled, the power source circuit is configured to provide an analog signal via the single line coupling to the TSD electrode. Note that the analog signal includes at least one of a DC (direct current) component or an oscillating component. The DSC also includes a power source change detection circuit operably coupled to the power source circuit. When enabled, the power source change detection circuit is configured to detect an effect on the analog signal that is based on an electrical characteristic of the TSD electrode and to generate the digital signal that is representative of the change of impedance of the TSD electrode.

In certain particular examples, the power source circuit includes a power source to source at least one of a voltage or a current via the single line to the TSD electrode. The power source change detection circuit also includes a power source reference circuit configured to provide at least one of a voltage reference or a current reference, and a comparator configured to compare the at least one of the voltage and the current provided via the single line to the TSD electrode to the at least one of the voltage reference and the current reference to produce the analog signal.

In another example of operation and implementation, a TSD (e.g., TSD 4710 or any other TSD described herein or their equivalents) includes a plurality of TSD electrodes associated with a surface of the TSD. Also, an overlay that includes one or more marker electrodes is also associated with a region of the surface of the TSD. Note that the plurality of TSD electrodes includes a first subset of the plurality of TSD electrodes aligned in a first direction and a second subset of the plurality of TSD electrodes that are separated from the first subset of the plurality of TSD electrodes by a dielectric material and are aligned in a second direction.

The TSD also includes a plurality of drive-sense circuits (DSCs) operably coupled to the plurality of TSD electrodes. A DSC of the plurality of DSCs is operably coupled to receive a reference signal and to generate a TSD electrode signal based on the reference signal. When enabled, the DSC is operably coupled and configured to provide the TSD electrode signal to a TSD electrode of the plurality of TSD electrodes and simultaneously to sense a change of the TSD electrode signal based on a change of impedance of the TSD electrode caused by capacitive coupling between the TSD electrode and the one or more marker electrodes based on the overlay being associated with the at least a portion of the surface of the TSD. The DSC is also operably coupled and configured to generate a digital signal that is representative of the change of impedance of the TSD electrode.

The TSD includes and/or is coupled to memory that stores operational instructions. The TSD also includes one or more processing modules operably coupled to the plurality of DSCs and the memory When enabled, the one or more processing modules is configured to execute the operational instructions to generate the reference signal and to process the digital signal generated by the DSC of the plurality of DSCs and a plurality of other digital signals generated by other DSCs of the plurality of DSCs to determine the region of the surface of the TSD that is associated with the overlay to determine one or more characteristics of the overlay that is associated with the region of the surface of the TSD. The one or more processing modules is also configured to execute the operational instructions to adapt sensitivity of the TSD within the region of the surface of the TSD that is associated with the overlay including to change a number operational electrodes of the plurality of TSD electrodes that are implemented to service the region of the surface of the TSD that is associated with the overlay in accordance with detecting user interaction with the overlay.

In certain examples, when enabled, the one or more processing modules is configured to execute the operational instructions to adapt the sensitivity of the TSD within the region of the surface of the TSD that is associated with the overlay including to operate fewer than all of another subset of the plurality of TSD electrodes that are implemented to service the region of the surface of the TSD that is associated with the overlay in accordance with detecting user interaction with the overlay.

In certain other examples, when enabled, the one or more processing modules is configured to execute the operational instructions to adapt the sensitivity of the TSD within the region of the surface of the TSD that is associated with the overlay including to increase the number operational electrodes of the plurality of TSD electrodes that are implemented to service the region of the surface of the TSD that is associated with the overlay in accordance with detecting user interaction with the overlay.

FIG. 48 is a schematic block diagram of an embodiment 4800 of an overlay that is operative with a TSD that is configured to perform enable/disable based ROIP in accordance with the present invention. In this diagram has some similarities to certain of the previous diagrams in that a first portion of the surface of a TSD 4810 that is provisioned for an overlay 4820 that is placed thereon operates in accordance with user interaction with the TSD 4810 in the location of the first portion of the surface of the TSD 4810 that includes the overlay 4020. However, in this embodiment 4800, touch sensing functionality within your regions other than the overlay 4820 are disabled when the overlay 4820 is implemented to facilitate user interaction in accordance with the TSD 4810.

In this diagram, the sensitivity within the region of the overlay 4820 operates based on knee based on the typical operational sensitivity of the TSD 4810. That is to say, the sensitivity within the region of the overlay 4820 corresponding to the first portion of the surface of the TSD 4810 remains unchanged in this diagram.

FIG. 49 is a schematic block diagram of another embodiment 4900 of an overlay that is operative with a TSD that is configured to perform enable/disable based ROIP in accordance with the present invention. This diagram includes some similarities to the previous diagram such that sensitivity or touch sensing capability is disabled within regions of the remaining portion of the surface of the TSD 4810 other than where the overlay 4820 is located. However, in this diagram, sensitivity or touch sensing capability within the region of the overlay 4820 corresponding to the first portion of the surface of the TSD 4810 is modified or adapted. The sensitivity within this first portion of the surface of the TSD 4810 that is provisioned for the overlay 4820 may be increased, decreased, etc.

For example, as described above with respect to other embodiments, examples, etc., fewer than all of the electrodes implemented within a TSD 4810 and specifically within the first portion of the surface of the TSD 4810 may be used while still facilitating user interaction with the overlay 4820 and the TSD 4810. In general, the sensitivity within the first portion of the surface of the TSD 4810 may be modified differently at different times, such as increased at a first time, decreased at a second time, etc.

FIG. 50 is a schematic block diagram of an embodiment 5000 of an overlay and a 3-D geometric object, which may or may not include TSD functionality, that are both operative with a TSD that is configured to perform enable/disable based ROIP in accordance with the present invention. This diagram has some similarities to the previous diagrams with at least one difference being that a second 3-D geometric object or TSD 5012 is also operative with the TSD 4810 as is the overlay 4820.

In this diagram, sensitivity or touch sensing capability is disabled in the remaining regions of the surface of the TSD 4810 that are not associated with the overlay 4824 the second 3-D geometric object or TSD 5012.

FIG. 51 is a schematic block diagram of another embodiment 5100 of an overlay and a 3-D geometric object, which may or may not include TSD functionality, that are both operative with a TSD that is configured to perform enable/disable based ROIP in accordance with the present invention. This diagram includes some similarities to the previous diagram such that sensitivity or touch sensing capability is disabled in the remaining regions of the surface of the TSD 4810 that are not associated with the overlay 4824 the second 3-D geometric object or TSD 5012. However, in this diagram, sensitivity or touch sensing capability within the region of the overlay 4820 corresponding to the first portion of the surface of the TSD 4810 and/or within the region corresponding to the location of the second 3-D geometric object or TSD 5012 is modified or adapted. The sensitivity within this first portion of the surface of the TSD 4810 that is provisioned for the overlay 4820 and/or within the region corresponding to the location of the second 3-D geometric object or TSD 5012 may be increased, decreased, etc.

Certain diagrams described below provide various embodiments, examples, etc. of interfaceable devices that include at least interfaceable TSD and one or more other devices. In some implementations, this includes two or more fully independent and interfaceable TSDs. In other implementations, this includes one or more fully independent and interfaceable TSDs and one or more fully dependent and interfaceable devices. In yet other implementations, this includes one or more fully independent and interfaceable TSDs and one or more partially dependent and interfaceable devices. In even other implementations, this includes one or more fully independent and interfaceable TSDs, one or more fully dependent and interfaceable devices, and one or more partially dependent and interfaceable devices. Generally speaking, various implementations may be performed using interfaceable devices that include at least interfaceable TSD to operate in a variety of ways and to provide scalability of the operational area that may be serviced by TSD functionality (e.g., by providing more than one device thereby extending the useful operational area of the system).

FIG. 52 is a schematic block diagram of various embodiments 5201, 5202, 5203, and 5204 of TSDs that are configured to interface with one or more other TSD and/or one or more other devices that include one or more electrodes in accordance with the present invention. In the upper left-hand portion of the diagram, embodiment 5201 shows multiple DSCs that couple via multiplexers to the respective row and column electrodes of a TSD. This provides MUX DSC servicing of the electrodes of the TSD such that a given DSC is configured to drive and simultaneously to sense one or more signals, including detecting any change(s) thereof, that is/are provided to one or more electrodes based on the selection of the MUX (e.g., regarding to which electrodes the DSC is coupled to via the MUX at a given time).

In an example of operation and implementation, a first DSC is configured to drive and simultaneously to sense a first one or more signals, including detecting any change(s) thereof, that is/are provided to a first one or more electrodes at a first time, and that first DSC is configured to drive and simultaneously to sense a second one or more signals provided to a second one or more electrodes at a second time. Also, a second DSC is configured to drive and simultaneously to sense a third one or more signals, including detecting any change(s) thereof, that is/are provided to a third one or more electrodes at a third time, and that second DSC is configured to drive and simultaneously to sense a fourth one or more signals, including detecting any change(s) thereof, that is/are provided to a fourth one or more electrodes at a fourth time. In some examples, the first time and the third time are the same, and the second time in the fourth time are the same. In other examples, the first time and the fourth time are the same, and the second time and the third time are the same.

In another example of operation and implementation, a DSC that is configured coupled to certain electrodes via a MUX is operative such that the MUX is implemented to connect two or more electrodes together electrically such that those two or more electrodes effectively operate as a single electrode. For example, in accordance with other embodiments, examples, diagrams, etc. described herein, including implementations in which a TSD operates based on varying precision, sensitivity, etc., by electrically tying two or more electrodes together, multiple electrodes may be driven and simultaneously sense together, such that they are not driven and simultaneously sensed individually.

In some examples, a first DSC is configured to drive and simultaneously to sense a first signal provided to a first electrode at a first time, and that first DSC is configured to drive and simultaneously to sense a second signal, including detecting any change thereof, that is provided to a second electrodes at a second time. Also, a second DSC is configured to drive and simultaneously to sense a third signal, including detecting any change thereof, that is provided to a third electrode at a third time, and that second DSC is configured to drive and simultaneously to sense a fourth signal, including detecting any change thereof, that is provided to a fourth electrode at a second fourth time. In some examples, the first time and the third time are the same, and the second time in the fourth time are the same. In other examples, the first time and the fourth time are the same, and the second time and the third time are the same.

In the upper right-hand portion of the diagram, embodiment 5202 shows multiple DSCs that couple on a one-to-one basis to the respective row and column electrodes of the TSD.

Also, with respect to the embodiment 5201 and/or the embodiment 5202, note that servicing of the respective electrodes of the TSD may be performed from more than two sides of the TSD. For example, similar implementations of DSCs with multiplexers may be implemented on the right hand side and/or bottom of the TSD of the embodiment 5201 in addition to the DSCs with multiplexers that are implemented on the left-hand side and top of the TSD of the embodiment 5201. That is to say, any one or more electrodes of the TSD may be driven from both directions or both electrode ends as desired in certain alternative embodiments.

For another example, similar implementations of DSCs implemented on a one-to-one basis may be implemented on the right hand side and/or bottom of the TSD of the embodiment 5202 in addition to the DSCs implemented on a one-to-one basis on the left-hand side and top of the TSD of the embodiment 5202. That is to say, any one or more electrodes of the TSD may be driven from both directions or both electrode ends as desired in certain alternative embodiments.

Note that the use of DSCs that are coupled via multiplexers to electrodes facilitates adaptive operation of the TSD, such as in accordance with an implementation shown with respect to embodiment 5201. For example, any one or more of the electrodes that are coupled to the one or more DSCs via the multiplexers may be selected in accordance with enabling or disabling operation of a portion of the TSD, adapting the sensitivity of any portion of the TSD including increasing or decreasing the sensitivity of any portion of the TSD, etc. With respect to an implementation in which DSCs are coupled to electrodes on a one-to-one basis, such as in accordance with an implementation shown with respect to embodiment 5202, selectivity of which of those DSCs is functional and operational may be performed in accordance with enabling or disabling operation of a portion of the TSD, adapting the sensitivity of any portion of the TSD including increasing or decreasing the sensitivity of any portion of the TSD, etc. For example, those electrodes that are to be enabled or disabled, turned on or turned off, etc., in accordance with such operations, the desired one or more DSCs may be enabled or disabled, etc.

In the lower left-hand portion of the diagram, embodiment 5203 shows a vertical stack up or side view of DSCs that are coupled to row and column electrodes. As can be seen, the DSCs are implemented below the row and column electrodes in this embodiment 5203. One or more DSCs are coupled to one or more row electrodes, such as in accordance with the embodiment 5201 using multiplexers or embodiment 5202 on a one-to-one basis, Also, one or more other DSCs are coupled to one or more column electrodes, such as in accordance with the embodiment 5201 using multiplexers or embodiment 5202 on a one-to-one basis. Note that one or more dielectric layers may be implemented between the row and column electrodes to keep them from coming in direct contact with one another, yet facilitating capacitive coupling between them so that one or more signals from the one or more row electrodes may be coupled into the one or more column electrodes, and vice versa.

With respect to interface-ability of the various TSDs described within this diagram, in certain examples, the top and right-hand sides of the TSD are implemented to include male connector sides, and the left and bottom sides of the TSD are implemented to include female connector sides. As such, different respective TSDs may be interfaced with one another based on the male/female connector interfaces (I/Fs) of those different respective TSDs, such that a male connector side interfaces with female connector side. Alternatively, in other examples, the top and right-hand sides of the TSD are implemented to include female connector sides, and the left and bottom sides of the TSD are implemented to include male connector sides. Generally speaking, any desired interface that facilitates connection, coupling, and/or capacitive coupling between electrodes of different respective TSDs may be used to interface-ability of TSDs to provide scalability of the operational area that may be serviced by TSD functionality (e.g., by providing more than one device thereby extending the useful operational area of the system).

As shown with respect embodiment 5204, note that the embodiments 5201, 5202, and 5203, note that one or more respective electrodes are coupled respectively to one or more DSCs, which may be on a one to one basis such as with respect to embodiment 5202, or via a multiplexed implementation such as with respect embodiment 5201. Also, the one or more DSCs are coupled to one or more processing modules 42 that includes and/or is coupled to memory in accordance with other embodiments, examples, diagrams, etc. as described herein. A DSC is configured to drive and simultaneously to sense a signal, including detecting any change thereof, that is provided to an electrode. The DSC is configured to provide a signal to the one or more processing modules 42 corresponding to at least one electrical characteristic of the electrode and/or the signal that is provided to the electrode, including any change of the signal. The one or more processing modules 42 is configured to process that signal received from the DSC to determine the at least one electrical characteristic of the electrode and/or the signal.

FIG. 53A is a schematic block diagram of an embodiment 5301 of TSDs that are interfaced in accordance with the present invention. In this diagram, two separate TSDs are interfaced together to form a touch sensor operative system that is larger than any one of the TSDs. In this diagram, the two separate TSDs are similar in size and shape, but note that they may be of different size and shape in other embodiments, examples, etc.

Within this diagram, two respective TSDs are interfaced, such as based on a male/female connector interface. Again, with respect to this diagram and any other diagram herein that shows two or more devices interfaced together, such interfacing may be implemented in any of a variety of ways including male/female connector interfaces (I/Fs) and generally any desired interface that facilitates connection, coupling, and/or capacitive coupling between electrodes of different respective devices.

With respect to the first TSD on the left-hand side, multiple DSCs couple via multiplexers to the respective column electrodes of the first TSD, and other multiple DSCs couple via multiplexers to certain of the respective row electrodes of the first TSD. With respect to the second TSD on the right-hand side, multiple DSCs couple via multiplexers to the respective column electrodes of the second TSD, and other multiple DSCs couple via multiplexers to certain of the respective row electrodes of the second TSD.

Being this diagram, the row electrodes of the first TSD and the second TSD interface together, as can be seen by the red and blue colored row electrodes. The column electrodes of the first TSD and the second TSD are colored black. The column electrodes of the first TSD and the second TSD did not interface together. They are serviced by the multiple DSCs that are coupled via multiplexers to the column electrodes of the first TSD in the second TSD, respectively.

In the implementation of this diagram, the row electrodes are shown as being serviced from both the DSCs on the left-hand side of the diagram colored blue and the DSCs on the right-hand side of the diagram colored red, both respectively coupled via multiplexers to the row electrodes of the first TSD and the second TSD, respectively. That is to say, the DSCs on the left-hand side of the diagram and the right-hand side of the diagram, colored blue and red, respectively, both operate to drive and simultaneously sense signals via the respective row electrodes from the respective ends of the row electrodes to the left of the first TSD and to the right of the second TSD, respectively.

In certain alternative implementations, note that the column electrodes may be serviced from both ends of a device, such that one or more additional DSCs, such as coupled via multiplexers, may be implemented at the bottom of the first TSD in the second TSD, respectively, such that the column electrodes of the first TSD and the second TSD are serviced from both ends.

Within this diagram and others that operate by servicing electrodes from both ends of a device, whether that is left and right, or top and bottom, note that different channels, frequencies, signals, etc. are driven from the two ends of the device. For example, in this diagram, the signals provided from the blue colored DSCs on the left-hand side of the diagram operate using different channels, frequencies, signals, etc. then the red colored DSCs on the right-hand side of the diagram when servicing the same electrodes.

FIG. 53B is a schematic block diagram of an embodiment 5302 of TSDs that are interfaced in accordance with the present invention. This diagram is similar to the previous diagram with at least one difference being that DSCs on the left-hand side of the diagram that are colored blue only service the blue colored row electrodes of the first TSD on the left-hand side of the diagram, and the DSCs on the right-hand side of the diagram that are red colored only service the red colored row electrodes of the second TSD on the right-hand side of the diagram. Again, the respective row electrodes, both blue colored in red colored, are interfaced together such that the DSCs that are implemented to service the blue or red colored row electrodes of one of the TSDs also services those same colored row electrodes of the other TSD via the interface between the first TSD and the second TSD.

For example, the blue colored DSCs on the left-hand side of the diagram that service the blue colored row electrodes of the first TSD on the left-hand side of the diagram also service the blue colored row electrodes of the second TSD on the right-hand side of the diagram via the interface between the first TSD and the second TSD. Similarly, the red colored DSCs on the right-hand side of the diagram that serviced the red colored row electrodes of the second TSD on the right-hand side of the diagram also service the red colored row electrodes of the first TSD on the left-hand side of the diagram via the interface between the first TSD and the second TSD.

FIG. 54A is a schematic block diagram of another embodiment 5401 of TSDs that are interfaced in accordance with the present invention. In this diagram, four separate TSDs are interfaced together to form a touch sensor operative system that is larger than any one of the TSDs. In this diagram, a first two of the TSDs are similar in size and shape, and the two other of the TSDs are similar in size and shape yet of different size and shape than the first two of the TSDs.

In this diagram, the row and column electrodes of the interfaced TSDs are driven and simultaneously sensed from both ends such that a first group of DSCs. For example, black colored DSCs are coupled via multiplexers to the column electrodes of the top left and the top right TSDs, and green colored DSCs are coupled via multiplexers to the column electrodes of the bottom left in the bottom right TSDs. Similarly, blue colored DSCs are coupled via multiplexers to the row electrodes of the top left and the bottom left TSDs, and red colored DSCs a couple via multiplexers to the top right and bottom right TSDs.

Also, within this diagram and others that operate by servicing electrodes from both ends of a device (e.g., FIG. 53A), whether that is left and right, or top and bottom, note that different channels, frequencies, signals, etc. are driven from the two ends of the device. For example, in this diagram, the signals provided from the blue colored DSCs on the left-hand side of the diagram operate using different channels, frequencies, signals, etc. then the red colored DSCs on the right-hand side of the diagram when servicing the same electrodes. Similarly, the signals provided from the black colored DSCs on the top of the diagram operate using different channels, frequencies, signals, etc. then the green colored DSCs on the bottom side of the diagram when servicing the same electrodes.

FIG. 54B is a schematic block diagram of another embodiment 5402 of TSDs that are interfaced in accordance with the present invention. This diagram is similar to the previous diagram with at least one difference being that DSCs on the left-hand side of the diagram that are colored blue only service the blue colored row electrodes of the top left TSD and the bottom left TSD, and the DSCs on the right-hand side of the diagram that are red colored only service the red colored row electrodes of the top right TSD and the bottom right TSD. Also, DSCs on the top of the diagram that are black blue only service the black colored column electrodes of the top left TSD and the top right TSD, and the DSCs on the bottom of the diagram that are green colored only service the green colored column electrodes of the bottom left TSD and the bottom right TSD.

Again, the respective row electrodes, both blue colored in red colored, are interfaced together such that the DSCs that are implemented to service the blue or red colored row electrodes of one of the TSDs (e.g., top left and bottom left TSDs and top right and bottom right TSDs) also services those same colored row electrodes of the other TSDs via the interfaces between the TSDs. Similarly, the respective column electrodes, both black and green colored, are interfaced together such that the DSCs that are implemented to service the black or green colored column electrodes of one of the TSDs (e.g., top left and top right TSDs and bottom left and bottom right TSDs) also services those same colored row electrodes of the other TSDs via the interfaces between the TSDs.

For example, the blue colored DSCs on the left-hand side of the diagram that serviced the blue colored row electrodes of the top left and bottom left TSDs on the left-hand side of the diagram also service the blue colored row electrodes of the top right and bottom right TSDs on the right-hand side of the diagram via the interfaces between the top left TSD and the top right TSD as well as the bottom left TSD and the bottom right TSD, respectively. Similarly, the red colored DSCs on the right-hand side of the diagram that serviced the red colored row electrodes of the top right and bottom right TSDs on the right-hand side of the diagram also service the red colored row electrodes of the top left and bottom left TSDs on the left-hand side of the diagram via the interfaces between the top left TSD and the top right TSD as well as the bottom left TSD and the bottom right TSD, respectively.

Similarly, the black colored DSCs on the top of the diagram and the green colored DSCs on the bottom of the diagram service respectively the black colored column electrodes and the green colored column electrodes including the black colored column electrodes in the green colored column electrodes of the TSDs to which they are not particularly coupled via the interfaces between the top left TSD and the bottom left TSD as well as the top right TSD and the bottom right TSD, respectively.

FIG. 55 is a schematic block diagram of various embodiments 5501, 5502, 5503, 5504, and 5505 of TSDs that are interfaced in accordance with the present invention. This diagram shows various ways in which TSDs may be interfaced together to form a touch sensor operative system that is larger than any one of the TSDs. In this diagram, the different respective TSDs are shown as having a similar size and shape, yet different respective TSDs, devices, etc. may be of different size and shape and other examples.

Embodiment 5501 shows two TSDs implemented side-by-side, on left and right. Alternatively, two TSDs could be implemented side-by-side, on top and bottom.

In addition, while many of the embodiments, examples, etc. herein show interfacing of two or more TSDs such that they align with one another along a particular edge, such as to TSDs having the same with and height for having the same width only, etc., note that an alternative implementation of interfacing two or more TSDs may be made such that only a portion of the TSDs are aligned with one another along a particular edge. For example, less than a portion of a first TSD and the second TSD may be aligned along a given edge, such that only some, fewer than all, of the row or column electrodes of the first TSD and the second TSD interface with one another and the other row or column electrodes do not interface with one another. For example, there may be instances in which a non-symmetric touch sensor operative system is desired. For example, consider embodiment 5502 in which fewer than all of the row electrodes of the first TSD in the second TSD interface with one another. This is one possible manner by which a non-symmetric touch sensor operative system may be implemented.

Embodiment 5503 shows four TSDs implemented in a 2×2 pattern formed a touch sensor operative system. Embodiment 5504 shows four TSDs implemented in a cross pattern touch sensor operative system to form a touch sensor operative system. Embodiment 5505 shows two implementations of touch sensor operative systems. For example, one implementation includes three TSDs (TSD 1, 2, and 3) aligned in a row with respect to one another to form a first touch sensor operative system, and another implementation includes six TSDs (TSD 1, 2, 3, 4, 5, and 6) aligned in two rows and three columns with respect to one another to form a second touch sensor operative system. Generally speaking, any number of rows and columns of TSDs may be implemented. Embodiment 5506 shows 8 TSDs implemented in an alternative cross pattern to that of embodiment 5504 to form a touch sensor operative system.

FIG. 56 is a schematic block diagram of other various embodiments 5601, 5602, 5603, 5604, 5605, 5606, and 5607 of TSDs that are configured to interface with one or more other TSD and/or one or more other devices that include one or more electrodes in accordance with the present invention.

In the upper left-hand portion of the diagram, embodiment 5601 shows DSCs that couple via multiplexers to the respective row and column electrodes, respectively, of a TSD. This provides MUX DSC servicing of the electrodes of the TSD such that a given DSC is configured to drive and simultaneously to sense one or more signals, including detecting any change(s) thereof, that is/are provided to one or more electrodes based on the selection of the MUX (e.g., regarding to which electrodes the DSC is coupled via the MUX at a given time). For example, this diagram shows a TSD with three row electrodes and four column electrodes service respectively by two DSCs that couple via multiplexers to the respective row and column electrodes, respectively, of a TSD.

In the upper right-hand portion of the diagram, embodiment 5602 shows multiple DSCs that couple on a one-to-one basis to the respective row and column electrodes of the TSD. For example, this diagram shows a TSD with three row electrodes and four column electrodes serviced respectively by seven DSCs.

Note that certain implementations of TSDs include more row electrodes and/or more column electrodes then shown in the embodiments 5601 and 5602 as well as other diagrams included herein. These relatively small number of row and column electrodes (e.g., three row electrodes and four column electrodes) implemented within TSDs are used for illustration. In certain examples, a TSD includes tens, hundreds, thousands, etc. or an even larger number of row electrodes and/or tens, hundreds, thousands, etc. or an even larger number of column electrodes.

In the bottom left-hand portion of the diagram, embodiment 5603 shows a device that includes electrodes only. This is a fully dependent device that can be interfaced with one or more other devices such as a fully independent TSD, a partially dependent TSD, or another device that includes electrodes only. The device shown in the embodiment 5603 provides yet another option for scalability of a touch sensor operative system including using components that are not individually active or independent, yet when interfaced with an active device, either directly or via an interface with one or more other devices, is operative to provide a touch sensor operative system.

Embodiment 5604 shows a partially dependent TSD such that row electrodes are serviced by a DSC that is coupled via a multiplexer. The column electrodes of the partially dependent TSD of the embodiment 5604 are dependent and operative to facilitate scaling of a touch sensor capable work area when interfaced with an active device, either directly or via an interface with one or more other devices.

Embodiment 5605 shows another partially dependent TSD such that the row electrodes are serviced by multiple DSCs that couple on a one-to-one basis to the respective row electrodes of the partially dependent TSD. Similar to the embodiment 5604, the column electrodes of the partially dependent TSD of the embodiment 5605 are dependent and operative to facilitate scaling of a touch sensor capable work area when interfaced with an active device, either directly or via an interface with one or more other devices.

Embodiments 5606 and 5607 are similar to the embodiments 5604 and 5605, respectively, with the difference being that the column electrodes are serviced by one or more DSCs, and the row electrodes of these partially dependent TSDs of the embodiments 5606 and 5607 are dependent and operative to facilitate scaling of a touch sensor operative system when interfaced with an active device, either directly or via an interface with one or more other devices.

Generally speaking, a touch sensor operative system may be implemented in any of a variety of configurations using the various building blocks shown in this diagram of independent TSDs, dependent TSDs including fully dependent or partially dependent TSDs. In an example of operation and implementation, at least one independent TSD is implemented within the system to facilitate active operation of a touch sensor operative system. That is to say, the at least one independent TSD is configured to facilitate TSD operation and functionality for any one or more electrodes of a dependent or partially dependent TSD via coupling of signals from the at least one independent TSD to the one or more electrodes of the dependent or partially dependent TSD.

FIG. 57 is a schematic block diagram of various embodiments 5701, 5702, and 5703 of TSDs and/or one or more other devices that include one or more electrodes that are interfaced in accordance with the present invention.

This diagram shows various possible ways in which the various building blocks shown in the previous diagram may be implemented to provide a touch sensor operative system of any desired size based on the scalability of their respective building blocks of the prior diagram.

For example, embodiment 5701 shows an implementation that includes a TSD selected from the embodiment 5601 or 5602 that is interfaced to the left of a TSD that is selected from the embodiment 5606 or 5607. For example, the respective electrodes of the TSDs may be serviced by one or more DSCs the coupled to the electrodes via one or more multiplexers or using multiple DSCs that couple on a one-to-one basis to the electrodes of the TSDs.

Embodiment 5702 shows an implementation that includes four respective TSDs. In the upper left hand corner of embodiment 5702 is a TSD selected from the embodiment 5601 or 5602. In the upper right-hand corner of the embodiment 5702 is a TSD selected from the embodiment 5606 or 5607. In the lower left hand corner of the embodiment 5702 is a TSD selected from the embodiment 5604 or 5605. In the lower right-hand corner of the embodiment 5702 is a TSD selected from the embodiment 5603. Note that the TSD selected from the embodiment 5603 is a fully dependent device that includes electrodes only, yet is operational when interfaced with one or more of the other TSDs shown in the embodiment 5702.

Embodiment 5703 shows additional scalability of a touch sensor operative system using various building blocks as shown in the prior diagram. In embodiment 5703, the upper left-hand corner includes a TSD selected from the embodiment 5601 or 5602. To the right of this TSD is another TSD selected from embodiment 5606 or 5607. Note that any number of one or more additional TSDs selected from embodiment 5606 or 5607 may be implemented to the right to extend the touch sensor operative system to any desired size. Extending down the left-hand most column of the embodiment 5703 or one or more TSDs selected from the embodiment 5604 or 5605. Note that any number of one or more additional TSDs selected from embodiment 5604 or 5605 may be implemented down the left-hand most column of the embodiment 5703 to extend the touch sensor operative system to any desired size. The lower right-hand portion of the embodiment 5703 includes any desired number of TSDs selected from the embodiment 5603. Again, note that the TSD selected from the embodiment 5603 is a fully dependent device that includes electrodes only, yet is operational when interfaced with one or more of the other TSDs shown in the embodiment 5703.

Note that such embodiments, examples, etc. as shown herein with respect to the interfacing of different respective devices in accordance with generating a touch sensor operative system are not exhaustive of all possible combinations, and the principles described herein a be used to generate other tech sensor operative systems of any desired size, configuration, shape, etc.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch sensor device (TSD) comprising:
   a plurality of TSD electrodes associated with a surface of the TSD;
   a plurality of drive-sense circuits (DSCs) operably coupled to the plurality of TSD electrodes, wherein a DSC of the plurality of DSCs is operably coupled to a TSD electrode, wherein, when enabled, the DSC configured to:
      generate a TSD electrode signal based on a reference signal;
      provide the TSD electrode signal, via a single line, to a TSD electrode of the plurality of TSD electrodes and simultaneously to sense, via the single line, a change of the TSD electrode signal based on a change of impedance of the TSD electrode; and
      generate a digital signal that is representative of the change of impedance of the TSD electrode;
   a communication interface;
   memory that stores operational instructions; and
   one or more processing modules operably coupled to the plurality of DSCs, the memory, and the communication interface, wherein, when enabled, the one or more processing modules is configured to execute the operational instructions to:
      process the digital signal to determine the change of impedance of the TSD electrode; and
      facilitate communication with a computing device via the communication interface.

2. The TSD of claim 1, wherein, when enabled, the one or more processing modules is configured to execute the operational instructions to:
   generate the reference signal; and
   provide the reference signal to the DSC.

3. The TSD of claim 1, wherein the plurality of DSCs, the communication interface, the memory, and the one or more processing modules are implemented as a system-on-a-chip (SOC).

4. The TSD of claim 1, wherein the TSD includes an internal power source.

5. The TSD of claim 1, wherein the change of impedance of the TSD electrode is based on user interaction with the surface of the TSD.

6. The TSD of claim 1, wherein the DSC of the plurality of DSCs further comprises:
a power source circuit operably coupled via the single line to the TSD electrode, wherein, when enabled, the power source circuit is configured to provide an analog signal via the single line coupling to the TSD electrode, and wherein the analog signal includes at least one of a DC (direct current) component or an oscillating component; and
a power source change detection circuit operably coupled to the power source circuit, wherein, when enabled, the power source change detection circuit is configured to:
detect an effect on the analog signal that is based on an electrical characteristic of the TSD electrode; and
generate the digital signal that is representative of the change of impedance of the TSD electrode.

7. The TSD of claim 6 further comprising:
the power source circuit including a power source to source at least one of a voltage or a current via the single line to the TSD electrode; and
the power source change detection circuit including:
a power source reference circuit configured to provide at least one of a voltage reference or a current reference; and
a comparator configured to compare the at least one of the voltage or the current provided via the single line to the TSD electrode to the at least one of the voltage reference or the current reference to produce the analog signal.

8. A touch sensor device (TSD) comprising:
a plurality of TSD electrodes associated with a surface of the TSD;
a plurality of drive-sense circuits (DSCs) operably coupled to the plurality of TSD electrodes, wherein a DSC of the plurality of DSCs is operably coupled to a TSD electrode, wherein, when enabled, the DSC configured to:
generate a TSD electrode signal based on a reference signal;
provide the TSD electrode signal, via a single line, to a TSD electrode of the plurality of TSD electrodes and simultaneously to sense, via the single line, a change of the TSD electrode signal based on a change of impedance of the TSD electrode that is based on user interaction with the surface of the TSD; and
generate a digital signal that is representative of the change of impedance of the TSD electrode;
a communication interface;
memory that stores operational instructions; and
one or more processing modules operably coupled to the plurality of DSCs, the memory, and the communication interface, wherein, when enabled, the one or more processing modules is configured to execute the operational instructions to:
generate the reference signal;
provide the reference signal to the DSC;
process the digital signal to determine the change of impedance of the TSD electrode; and
facilitate communication with a computing device via the communication interface.

9. The TSD of claim 8, wherein the plurality of DSCs, the communication interface, the memory, and the one or more processing modules are implemented as a system-on-a-chip (SOC).

10. The TSD of claim 8, wherein the TSD includes an internal power source.

11. The TSD of claim 8, wherein the DSC of the plurality of DSCs further comprises:
a power source circuit operably coupled via the single line to the TSD electrode, wherein, when enabled, the power source circuit is configured to provide an analog signal via the single line coupling to the TSD electrode, and wherein the analog signal includes at least one of a DC (direct current) component or an oscillating component; and
a power source change detection circuit operably coupled to the power source circuit, wherein, when enabled, the power source change detection circuit is configured to:
detect an effect on the analog signal that is based on an electrical characteristic of the TSD electrode; and
generate the digital signal that is representative of the change of impedance of the TSD electrode.

12. The TSD of claim 11 further comprising:
the power source circuit including a power source to source at least one of a voltage or a current via the single line to the TSD electrode; and
the power source change detection circuit including:
a power source reference circuit configured to provide at least one of a voltage reference or a current reference; and
a comparator configured to compare the at least one of the voltage or the current provided via the single line to the TSD electrode to the at least one of the voltage reference or the current reference to produce the analog signal.

* * * * *